US011144855B2

(12) United States Patent
Stefik et al.

(10) Patent No.: US 11,144,855 B2
(45) Date of Patent: Oct. 12, 2021

(54) SYSTEM AND METHOD FOR MANAGING COVERAGE OF PARKING ENFORCEMENT FOR A NEIGHBORHOOD WITH THE AID OF A DIGITAL COMPUTER

(71) Applicant: Conduent Business Services, LLC, Florham Park, NJ (US)

(72) Inventors: Mark J. Stefik, Portola Valley, CA (US); Mudita Singhal, Santa Clara, CA (US); Kevin Albanese, Tarrytown, NY (US); Farrukh Ali, Los Angeles, CA (US); Eric A. Bier, Palo Alto, CA (US); Daniel G. Bobrow, Palo Alto, CA (US); Eduardo Cardenas Sanchez, Austin, TX (US); Matthew T. Darst, Chicago, IL (US); Hoda Eldardiry, San Carlos, CA (US); Gaurang Gavai, San Francisco, CA (US); Robert T. Krivacic, San Jose, CA (US)

(73) Assignee: Conduent Business Services, LLC, Florham Park, NJ (US)

( * ) Notice: Subject to any disclaimer, the term of this patent is extended or adjusted under 35 U.S.C. 154(b) by 1021 days.

(21) Appl. No.: 15/249,301

(22) Filed: Aug. 26, 2016

(65) Prior Publication Data
US 2018/0060797 A1 Mar. 1, 2018

(51) Int. Cl.
*G06Q 10/06* (2012.01)
*G07B 15/02* (2011.01)

(52) U.S. Cl.
CPC ...... *G06Q 10/063116* (2013.01); *G07B 15/02* (2013.01)

(58) Field of Classification Search
None
See application file for complete search history.

(56) References Cited

U.S. PATENT DOCUMENTS 6,081,206 A   6/2000 Kielland
6,408,304 B1  6/2002 Kumhyr
(Continued)

OTHER PUBLICATIONS

Mark Stefik, "Hunters to Collaborators: Transitioning to Agile Organizations," http://www.markstefik.com/?p=1643, Jun. 19, 2014.
(Continued)

*Primary Examiner* — Eric W Stamber
*Assistant Examiner* — George H Walker, III
(74) *Attorney, Agent, or Firm* — Krista A. Wittman

(57) ABSTRACT

A system and method for managing coverage of parking enforcement for a neighborhood with the aid of a digital computer is provided. A time-based active representational model of the city is created by fusing sensory data collected from various sources around a city with numerical data gleaned from historical and on-going activities, including parking regulation citation and warning numbers, resource allocations, and so on. The model can be used to form quantitative predictions of expected violations, revenue stream, and so forth, that can then be used as recommendations as to where to enforce and when, so as to maximize the utilization of the limited resources represented by the officers on the street. Moreover, the performance of the officers can be weighed against expectations of performance postulated from the quantitative predictions.

15 Claims, 29 Drawing Sheets

(56) References Cited

U.S. PATENT DOCUMENTS

| | | | |
|---|---|---|---|
| 6,493,676 B1* | 12/2002 | Levy | G06Q 30/0284 705/13 |
| 6,578,005 B1 | 6/2003 | Lesaint et al. | |
| 9,285,232 B2* | 3/2016 | Dong | G01C 21/3461 |
| 9,552,734 B2* | 1/2017 | Zlojutro | G08G 1/20 |
| 9,674,357 B1 | 6/2017 | Pycko et al. | |
| 10,013,459 B2 | 7/2018 | Stefik et al. | |
| 2002/0008639 A1 | 1/2002 | Dee | |
| 2002/0010615 A1 | 1/2002 | Jacobs | |
| 2002/0109611 A1 | 8/2002 | Howard et al. | |
| 2003/0026608 A1 | 2/2003 | Malloy | |
| 2003/0026609 A1 | 2/2003 | Parulski | |
| 2003/0140021 A1 | 7/2003 | Ryan et al. | |
| 2004/0044554 A1 | 3/2004 | Bull et al. | |
| 2004/0068433 A1 | 4/2004 | Chatterjee et al. | |
| 2004/0111454 A1 | 6/2004 | Sorensen | |
| 2004/0133464 A1 | 7/2004 | Erskine | |
| 2004/0193566 A1 | 9/2004 | Kothuri | |
| 2004/0210548 A1 | 10/2004 | Ketcherside et al. | |
| 2004/0215503 A1 | 10/2004 | Allpress et al. | |
| 2005/0168352 A1* | 8/2005 | Tomer | G06Q 30/0284 340/932.2 |
| 2006/0043176 A1 | 3/2006 | Meyerhofer et al. | |
| 2006/0059037 A1 | 3/2006 | Ivey et al. | |
| 2006/0106504 A1* | 5/2006 | Carpenter | G08G 1/017 701/1 |
| 2006/0187027 A1 | 8/2006 | Smith | |
| 2006/0200374 A1 | 9/2006 | Nelken | |
| 2006/0282284 A1 | 12/2006 | Daniel et al. | |
| 2007/0016539 A1 | 1/2007 | Groft et al. | |
| 2007/0046484 A1 | 3/2007 | Bucholz et al. | |
| 2007/0116189 A1 | 5/2007 | Clawson | |
| 2007/0285281 A1* | 12/2007 | Welch | G07B 15/02 340/932.2 |
| 2008/0129548 A1* | 6/2008 | Firestone | G07B 15/063 340/993 |
| 2008/0291054 A1* | 11/2008 | Graft | G06Q 30/0284 340/932.2 |
| 2009/0024430 A1* | 1/2009 | Marcus | G01C 21/3407 705/7.13 |
| 2009/0031006 A1 | 1/2009 | Johnson | |
| 2009/0051686 A1 | 2/2009 | Legaut et al. | |
| 2009/0204466 A1 | 8/2009 | Nielsen et al. | |
| 2010/0039254 A1 | 2/2010 | Cooper et al. | |
| 2010/0205032 A1 | 8/2010 | Nielsen et al. | |
| 2010/0250318 A1 | 9/2010 | Paramoure et al. | |
| 2010/0265104 A1* | 10/2010 | Zlojutro | G07C 5/008 340/990 |
| 2011/0099126 A1* | 4/2011 | Belani | G08G 1/14 705/418 |
| 2011/0276370 A1* | 11/2011 | Agrait | G07B 15/02 705/13 |
| 2012/0253548 A1 | 10/2012 | Davidson | |
| 2012/0285790 A1 | 11/2012 | Jones et al. | |
| 2012/0323690 A1 | 12/2012 | Michael | |
| 2013/0039542 A1* | 2/2013 | Guzik | G11B 27/034 382/103 |
| 2013/0090969 A1* | 4/2013 | Rivere | G06Q 10/06 705/7.19 |
| 2013/0111357 A1 | 5/2013 | McCormack et al. | |
| 2013/0211959 A1 | 8/2013 | Marusyk et al. | |
| 2013/0317742 A1 | 11/2013 | Ulloa et al. | |
| 2014/0039956 A1 | 2/2014 | Cicio | |
| 2014/0140497 A1 | 5/2014 | Ripa et al. | |
| 2014/0195106 A1 | 7/2014 | McQuade et al. | |
| 2014/0214499 A1* | 7/2014 | Hudson | G07F 17/246 705/13 |
| 2014/0279628 A1 | 9/2014 | Straznitskas | |
| 2014/0335897 A1* | 11/2014 | Clem | G08G 1/0112 455/456.3 |
| 2015/0066557 A1* | 3/2015 | Lichti | G08G 1/20 705/7.15 |
| 2015/0086003 A1 | 3/2015 | Khalil et al. | |
| 2015/0106491 A1 | 4/2015 | Gardner | |
| 2015/0142494 A1 | 5/2015 | Yap et al. | |
| 2015/0161554 A1 | 6/2015 | Sweeney et al. | |
| 2015/0178640 A1* | 6/2015 | Balakrishnan | G06Q 50/30 705/13 |
| 2015/0363518 A1 | 12/2015 | Edgington | |
| 2016/0148507 A1 | 5/2016 | Pittman et al. | |
| 2016/0179900 A1 | 6/2016 | Stefik et al. | |
| 2016/0247247 A1 | 8/2016 | Scicluna | |
| 2016/0274770 A1 | 9/2016 | Lovati et al. | |
| 2016/0275151 A1 | 9/2016 | Lovati et al. | |
| 2016/0284154 A1 | 9/2016 | Schraga | |
| 2016/0300178 A1 | 10/2016 | Perry et al. | |
| 2016/0371607 A1 | 12/2016 | Rosen et al. | |
| 2017/0091350 A1 | 3/2017 | Bauer et al. | |
| 2017/0098181 A1 | 4/2017 | Herman et al. | |
| 2017/0186317 A1* | 6/2017 | Franklin | G08G 1/149 |
| 2017/0255894 A1 | 9/2017 | Witkin | |
| 2017/0278311 A1 | 9/2017 | Vespia et al. | |
| 2017/0293874 A1 | 10/2017 | Asaf | |
| 2017/0307754 A1 | 10/2017 | Skibinski | |
| 2018/0350229 A1* | 12/2018 | Yigit | G08G 1/017 |
| 2019/0171200 A1* | 6/2019 | Celestin | G07C 5/085 |

OTHER PUBLICATIONS

Stefik et al., "Ganging Up on Big Data: Computer-Intermediated Collaborative Analysis," Collaborative Analysis and Reasoning Workshop at CTS 2014, http://www.markstefik.com/?page_id=657, 2014.

Wikipedia, URL https://en.wikipedia.org/wiki/Computer-aided_dispatch, web page cached on Sep. 21, 2017.

W. Tobler, "Experiments in Migration Mapping by Computer," The American Cartographer, 14(2):155-163, 1987.

W. Tobler, "Display and Analysis of Migration Tables," http://www.colorado.edu/ibs/pop/ccemconf/tobler_display_analysis.pdf, 2005.

Bak et al., "Algorithmic and Visual Analysis of Spatiotemporal Stops in Movement Data," in Proceedings of the 20th International Conference on Advances in Geographic Information Systems (Sigspatial '12), ACM, New York, NY, USA, 2012, 462-465.

Kim et al., "Bristle Maps: A Multivariate Abstraction Technique for Geovisualization," IEEE Transactions on Visualization and Computer Graphics 19, 9, Sep. 2013, 1438-1454.

Andrienko et al., "Spatio-Temporal Aggregation for Visual Analysis of Movements," in Proceedings of the IEEE Symposium on Visual Analytics Science and Technology (VAST '08), IEEE, 2008, 51-58.

D.H. Pink, "Drive: The Surprising Truth About What Motivates Us," Riverhead Books, Apr. 5, 2011.

Zhixian Yan et al., Semantic Trajectories: Mobility Data Computation and Annotation, ACM Trans. Intell. Syst. Technol. 4, 3, Article 49 (Jul. 2013), 38 pages. DOI: https://doi.org/10.1145/2483669.2483682.

Yan Z. et al., 2010. A Hybrid Model and Computing Platform for Spatio-Semantic Trajectories. In: Aroyo L. et al. (eds) the Semantic Web: Research and Applications. ESWC 2010. Lecture Notes in Computer Science, vol. 6088. Springer, Berlin, Heidelberg. DOI https://doi.org/10.1007/.

Christine Parent et al., 2013. Semantic Trajectories Modeling and Analysis, ACM Computing Surveys. 45, 4, Article 42, Aug. 2013.

Peng Lin et al., 2013. Real-Time Monitoring System for Labourers' Behaviour Analysis on a Large-Dam Construction Site, International Journal of Distributed Sensor Networks. DOI https://doi.org/10.1155/2013/509423.

* cited by examiner

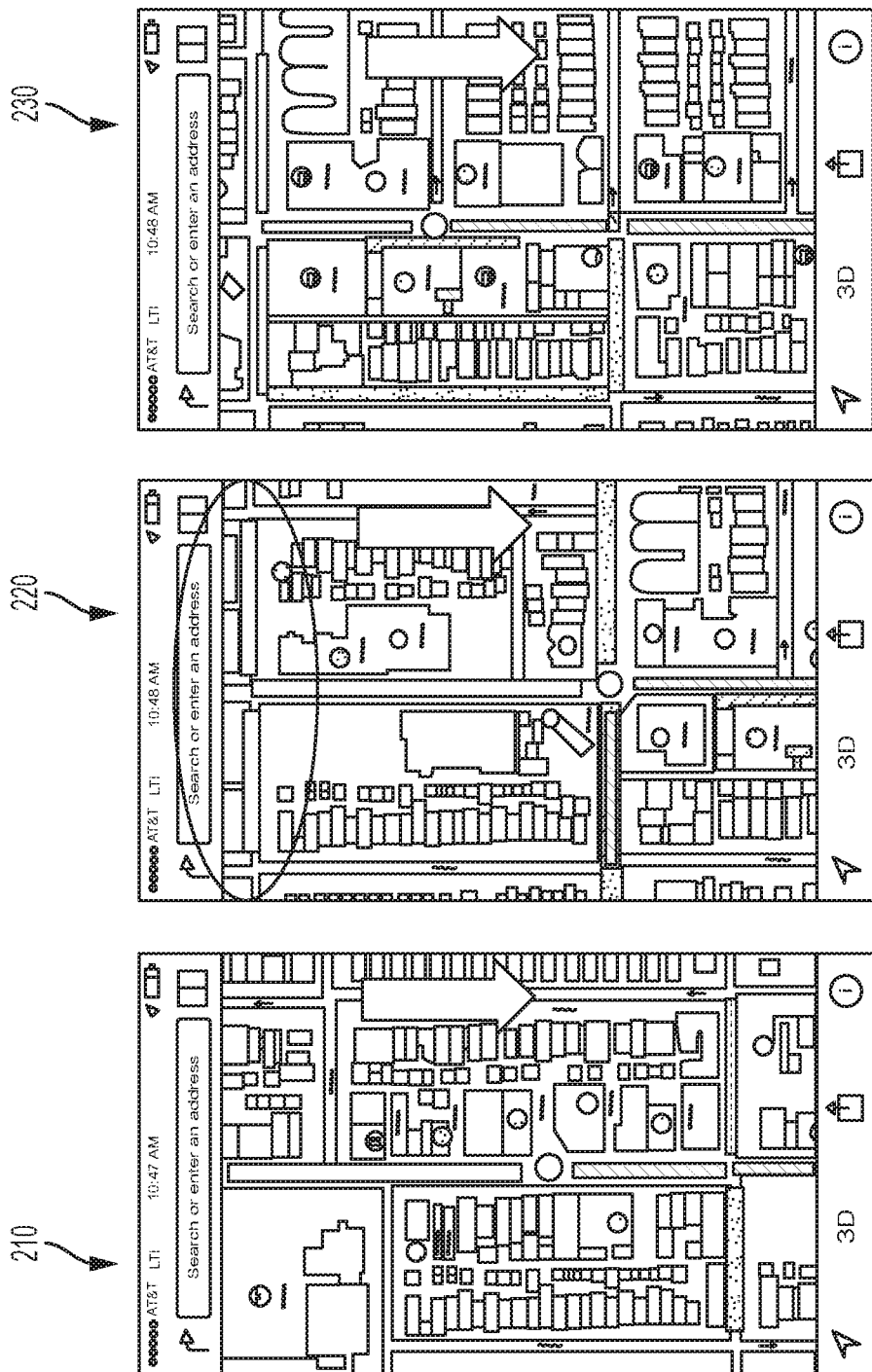

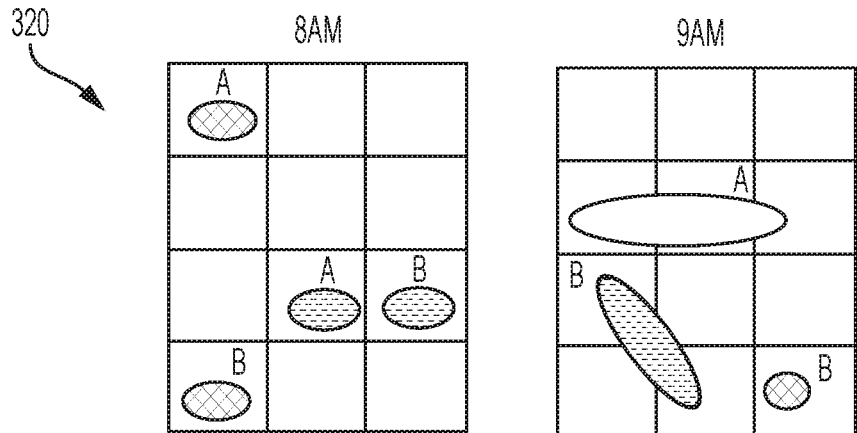
FIG. 18
FIG. 19
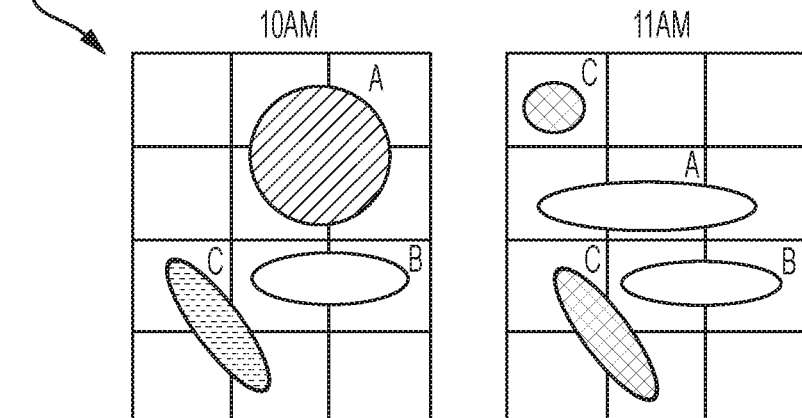
FIG. 20

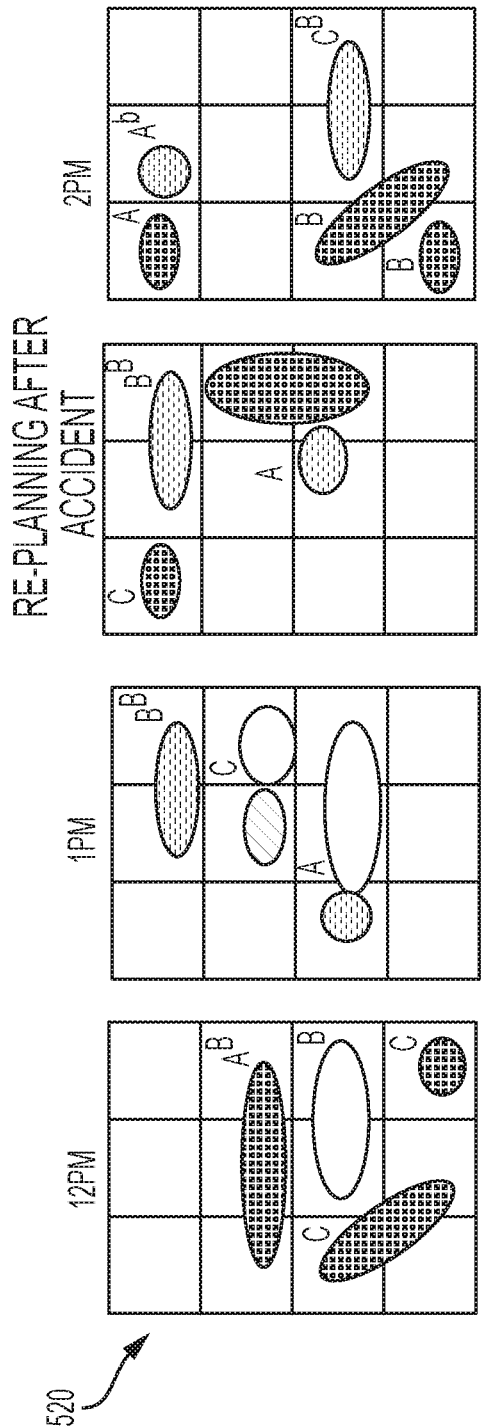
FIG. 39
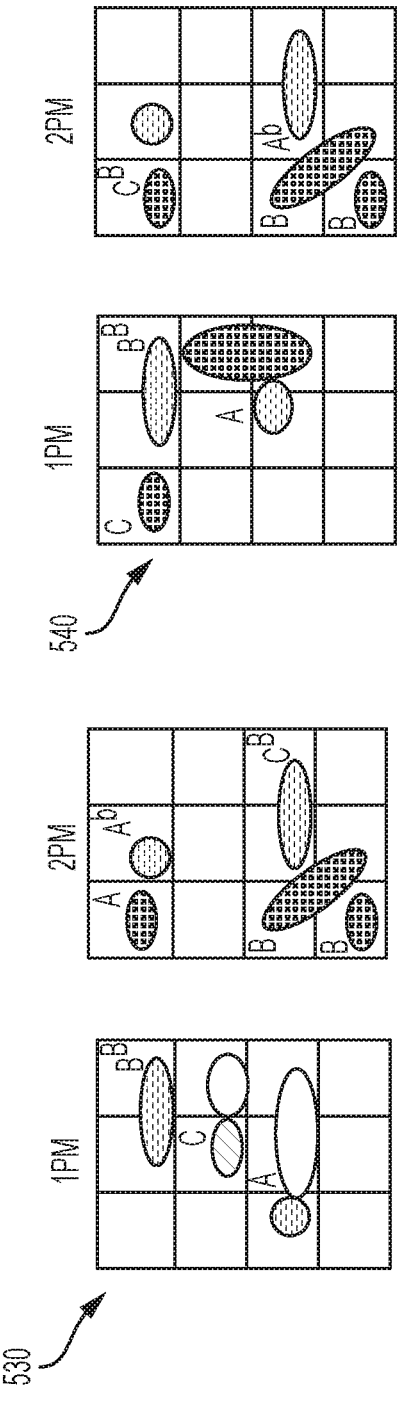
FIG. 40
FIG. 41

FIG. 48

SYSTEM AND METHOD FOR MANAGING COVERAGE OF PARKING ENFORCEMENT FOR A NEIGHBORHOOD WITH THE AID OF A DIGITAL COMPUTER

FIELD

This application relates in general to parking enforcement, and in particular to a system and method for managing coverage of parking enforcement for a neighborhood with the aid of a digital computer.

BACKGROUND

Parking enforcement organizations for a municipality, whether a city, town or other governmental subunit (henceforth, simply "city"), are typically charged with managing the city's parking resources, directing traffic, and promoting the public welfare, although some cities retain private contractors to handle parking enforcement or may reserve traffic direction duties to police officers. Parking enforcement organizations generate revenue from the issuing of citations (ticketing of non-moving violations) for non-compliance with parking regulations, including regulations governing where and when parking on the streets or other city-regulated zones or spaces is permitted, restricted, prohibited, or controlled.

Although revenue from parking fines serves as a societal recompense for the harm that illegal parking causes, parking enforcement also helps further three public welfare objectives. The first objective is promoting public safety and health, including providing access for persons with disabilities. Obstructing a fire hydrant, blocking an alley, parking in a fire lane and similar parking infractions put lives and property at risk, while illegally parking in a space reserved for persons with disabilities wrongfully deprives the disabled of parking. The second objective is promoting the free flow of traffic and the regularity of parking turnover. Meter violations and overstaying a posted time limit wastes motorists' time and fuel and increases pollution if motorists are forced to search for other parking. The third objective is improving livability. Cities strive to promote the quality of life for its citizenry and visitors and some parking regulations are intended to punish motorists who park in ways that are a nuisance or detract from a city's beauty or aesthetic.

Parking enforcement organizations are often formed as a part of the police force, or may be organized separately along similar lines, with an administrative hierarchy that includes, from the top down, managers, supervisors, dispatchers, and parking enforcement officers (PEOs). Managers are responsible for organizational performance, policy, and long-term trends. Supervisors oversee the performance and assignments of squads or groups of officers. Dispatchers orchestrate responses to unplanned events reported through emergency services or other communications channels. Last, while on beats, officers perform revenue-producing enforcement activities and handle planned events, plus perform public safety-promoting service activities and handle unplanned events assigned by dispatch.

The day-to-day operation of a parking enforcement organization requires making countless operational decisions in a prompt manner based upon limited data. Largely, parking enforcement officers work in virtual isolation from their peers; real time activities information is not shared between parking enforcement officers. This information vacuum can be problematic. Often, parking enforcement officers returning from responding to unplanned events will issue citations to parking violators encountered while returning to their own beat, while the parking enforcement officer on whose beat the parking violators were ticketed could end up unnecessarily patrolling those areas, thereby wasting time and energy. Similarly, dispatchers need to know the status of parking enforcement officers at all times, so as to be able to assign appropriate resources to an event response, yet generally lack such knowledge. Gaining situation awareness would require contacting each parking enforcement officer whenever an unplanned event arose, yet that approach would impose constant dispatcher interruptions.

The lack of knowledge includes gaps in or unavailable sensor data, an absence of predictive models, and insufficient analyses of historical performance. Thus, optimal recommendations for next activities remain infeasible. Notwithstanding, urgent situations require fast actions and sometimes overriding organizational policy.

Therefore, a need remains for a providing the personnel working in a parking enforcement organization with the tools and information necessary to optimize performance in both compliance- and service-related activities.

SUMMARY

A parking enforcement organization includes a hierarchy of personnel that include parking enforcement officers working on the streets at the lowest tier, supervisors who manage the officers and dispatchers who handle unplanned events and emergencies at the next tier, and managers responsible for policy and overall performance at the top. These individuals must work collaboratively, yet the work of parking enforcement is inherently two-fold. Revenue-producing enforcement activities and public safety-promoting service activities are at odds because they place conflicting time demands on the same people.

A time-based active representational model of the city is created by fusing sensory data collected from various sources around a city with numerical data gleaned from historical and on-going activities, including parking regulation citation and warning numbers, resource allocations, and so on. The model can be used to form quantitative predictions of expected violations, revenue stream, and so forth, that can then be used as recommendations as to where to enforce and when, so as to maximize the utilization of the limited resources represented by the officers on the street. Moreover, information evaluated in the model can be the basis for finer-grained recommendations and alerts to officers than a supervisor reasonably could. In addition, since officers have an immediate awareness of street conditions and other factors not visible to supervisors, officers are provided with a level of detail that is useful, but not overwhelming at an abstract or detailed level.

One embodiment provides a system and method for managing coverage of parking enforcement for a neighborhood with the aid of a digital computer. A parking policy for a neighborhood of a city is defined. The parking policy specifies a level of coverage of the neighborhood. Activities of parking enforcement officers in the neighborhood are tracked while performing enforcement activities on different days and at different times. Coverage data for the neighborhood for each different day and each different time is extracted from the officers' tracked activities and the extracted coverage data is added to a time-based active representational model of the city. A level of compliance of the parking regulations in the neighborhood within the active representational model is identified. Assigning the officers to the neighborhood is recommended when the level of compliance of the parking regulations falls below the level of coverage.

A further embodiment provides a system and method for managing parking policy compliance with the aid of a digital computer. An organizational goal of acceptable non-compliance with a parking policy for a neighborhood of a city is defined. Activities of parking enforcement officers in the neighborhood are tracked while performing enforcement activities on different days and at different times. Coverage data for the neighborhood for each different day and each different time is extracted from the officers' tracked activities and the extracted coverage data is added to a time-based active representational model of the city. A level of compliance of the parking regulations in the neighborhood within the active representational model is identified. Assigning the officers to the neighborhood is recommended when the level of compliance of the parking regulations falls below the organizational goal of acceptable non-compliance.

A still further embodiment provides a system and method for estimating parking policy compliance with the aid of a digital computer. A parking policy for a neighborhood of a city is defined. The parking policy specifies a level of coverage of the neighborhood. The issuing of parking citations by parking enforcement officers in the neighborhood on different days and at different times is tracked. Coverage data for the neighborhood for each different day and each different time from issued parking citations is extracted and the extracted coverage data is added to a time-based active representational model of the city that comprises estimates of parking violations expected to occur within the neighborhood. A level of compliance of the parking regulations in the neighborhood within the active representational model is identified. Adding more officers to the neighborhood is recommended when the level of compliance of the parking regulations falls below the estimates of parking violations expected to occur within the neighborhood.

The foregoing system and method address obstacles in optimizing organizational performance by:
 Providing data and recommendations in real time to officers, supervisors, and dispatchers to guide their decision-making.
 Combining real time situation and operational data from sensors and human observers with data from databases about past activities.
 Making recommendations to guide enforcement decisions and optimize performance by generating options, predicting and comparing outcomes, and recommending optimal responses.
 Presenting combined space/time/work information for activities and operational choices in meaningful visual representations.
 Combining human and computer cognition to take advantage of differences in human and computer capabilities and blind spots.
 Providing computer partners (c-partners) to efficiently coordinate activities at all levels. The c-partners across the organization connect to system elements for monitoring, alerting, planning and recommending, and intermediate communications between people.
 Using computer intermediation and conditional autonomous messaging to reduce the overhead of the communication and negotiation needed for team coordination.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIGS. 8-10 are diagrams respectively showing, by way of examples, an officer activity interface presenting recommendations for probable parking violations along a patrol route as updated based upon parking enforcement officer movement.

FIG. 18 is diagram showing, by way of example, visual encodings for the parking enforcement tasks.

FIGS. 19-22 are pairs of diagrams showing, by way of examples, prioritized parking enforcement tasks for the time periods of Scenario 1.

FIG. 39 is a set of diagrams showing, by way of examples, changes in duty shift task assignments for Adams, Baker and Cooper.

FIGS. 40-41 are sets of diagrams showing, by way of examples, planned team assignments respectively before and after an accident in a region of the beat.

FIGS. 48-49 are diagrams showing, by way of examples, the situation assessment interface of the real time monitoring application of FIG. 46.

DETAILED DESCRIPTION

Glossary

Figure 1:
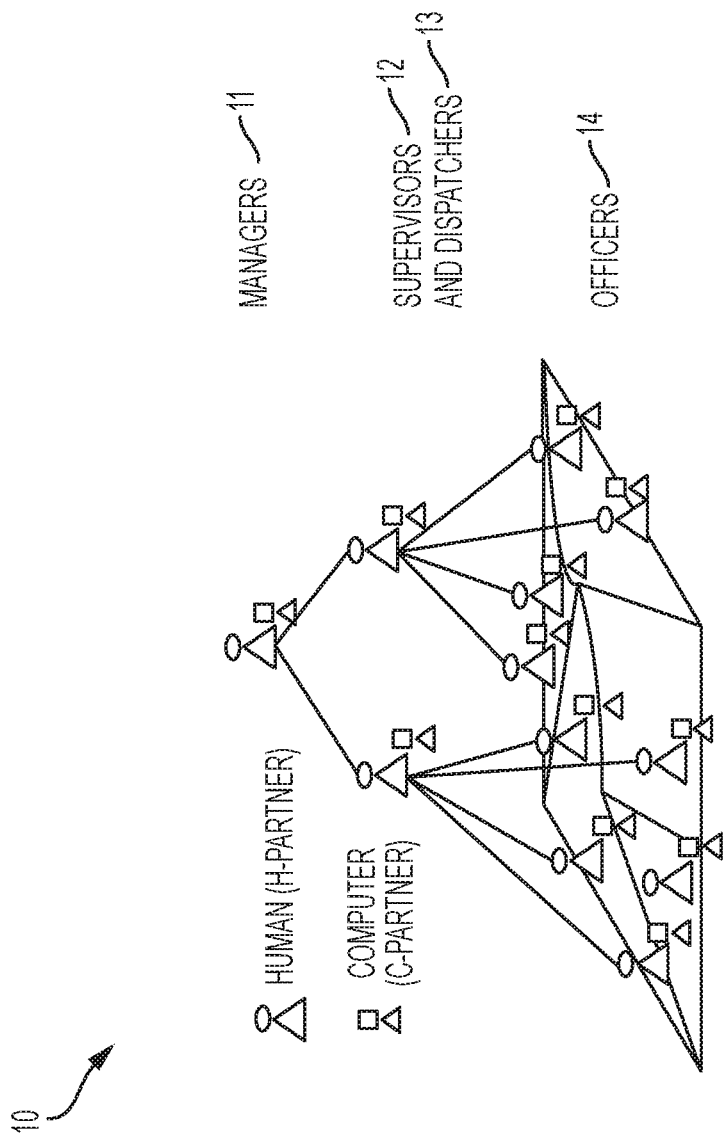
FIG. 1 is an organizational chart showing, by way of example, the managerial hierarchy of a parking enforcement organization.

Organizational resources—the resources used by an organization charged with enforcing parking regulations through enforcement activities and promoting public safety through service activities. Such resources can include funding, materials, staff, vehicles, and other assets that can be drawn on by the parking enforcement organization to function effectively. For simplicity, an organization charged with enforcing parking regulations and promoting public safety parking will henceforth be called a "parking enforcement organization" or just "organization," regardless of whether the organization provides parking regulation enforcement, traffic direction, public safety promotion, or some combination of the foregoing duty activities. Similarly, officers charged with performing duties on behalf of an organization will be called a "parking enforcement officer" or just "officer," regardless of whether the officer duties that include enforcing parking regulations, directing traffic, promoting public safety, or some combination of the foregoing duty activities.

Organizational performance—performance analytics that measure how on parking enforcement organization fulfills its mission and goals as reflected by the activities performed and resources consumed.

Squads and teams—a squad refers to a group of officers reporting to a single supervisor; a team refers to smaller groups of officers who coordinate the performance of their respective duty activities during a duty shift.

Performance analytics—quantitative and qualitative measures that convey levels and quality of parking enforcement organizational performance.

Performance tracking and evaluation—collecting and reporting data of how a parking enforcement organization performs duty activities over time. Performance tracking and evaluation involves comparing metrics of actual performance to predictions or expectations of performance.

Events—happenings in a city bounded in time (when they occur) and space (where they occur), such as a fire downtown, a winter storm is an event, or a holiday parade.

Violation and citation—a violation is an action that violates (non-complies with) city parking regulations, ordinances, or directives (henceforth, simply "regulations"), while a citation is a notice (ticket) of a violation issued by a parking enforcement officer that typically identifies the city parking regulation violated, documents the time and place of the violation, indicates the fine levied, and provides a notice to appear in court if the violator wants to contest the violation.

Compliance—refers to the degree to which people, that is, drivers, tourists, and so forth, adhere to the city regulations.

Violation lifecycle—the process whereby a violation arises, persists, and ends. For example, a violation for parking in a two-hour residential zone occurs once a vehicle is parked for more than two hours. The vehicle may be cited if a parking enforcement officer observes the violation. The violation ends when the vehicle is either moved away or the driver pays for more time, if allowed. Other violations, such as parking in a prohibited zone, begin as soon as a vehicle is impermissibly parked.

Modeling—refers to creating computational models of how systems work. Models provide information about the state of a system by keeping track of the state in terms of parameters and characterizing how output parameters change in response to other parameters. Real time models are updated according to real time data feeds about a system. Predictive models predict present or future state. For example, traffic speed varies according to the amount of traffic and the capacity of the roads. Herein, models of enforcement organizational processes, models of city situations and activities, and models of violations are discussed.

City modeling—refers to creating computational models for aspects of a municipality. Through time-based active representational modeling, city models may be updated by real time information about city events and activities, while specific predictive models of violations make use of information from sensors, including locational data from GPS receivers in officers' vehicles or mobile computing devices, traffic loop sensors, parking meter payment data, car marking information from ALPR-equipped vehicles, and traffic flow sensor information, and probabilistic predictions based upon historical and current data. For example, a city traffic model could predict the amount of traffic in different parts of a city based upon sensor and historical and current data. A parking violations model could predict the probabilities or likelihoods of violations in parts of a city based upon historical citation data, including spatially sampled or temporally sampled historical citation data, additional factors, including categories or characteristics of neighborhoods, data from parking enforcement officers in the field as they issue citations, violation life-cycle models, or through predictive algorithms.

Organizational modeling—refers to models of how organizations can respond and act in a situation, given available resources, known constraints, and organizational priorities.

Policy parameters and priorities—refer to variables that represent different aspects and goals of enforcement policy. For example, a city may want to prioritize enforcement of safety-related violations, balance enforcement resources to provide different levels of coverage for different neighborhoods, or guarantee response times to emergency events at some level. By setting priority values, managers can express relative trade-offs for enforcement.

Zones and beats—geographically-bounded areas of a city where parking enforcement officers perform their duty shifts while on patrol.

Super-beats—a parking enforcement region in a city that is larger than a regular beat. Typically, a super-beat combines several regular-sized beats and is staffed by several parking enforcement officers who operate collaboratively as a team to carry out revenue-producing parking enforcement enforcement activities and public safety-promoting service activities.

Activity plan—recommends duty activities to a parking enforcement officer at either an abstract or detailed level in terms of "what," "where," and "when." An officer may be judged by whether he adheres to or departs from an activity plan without good reason. An activity plan can be presented textually or displayed visually through annotated maps. Descriptions involve three things, space (region), time (a time interval), and activities (violations to cite or services to perform). Descriptions can be at an abstract level by identifying regions that are neighborhoods or quadrants of a beat, or at a detailed level by specifying specific directions and locations to patrol at one or more of a street- or block-face level, for instance, patrolling on the left side of Main Street between 4th and $5^{th}$ Avenues. Similarly, descriptions can be at an abstract level by providing timing based upon periods of the day, such as which activities ought to be performed in the morning or afternoon, or at a detailed level by providing timings in an ordered specific fashion, by which activities ought to be performed before other activities, or by which activities to perform during specific time slots, for instance, between 3 p.m. and 4 p.m. Activity descriptions within an activity plan can include patrolling, expectations of citations to be found, services to be performed, and so forth. Thus, the activity plan is not just a minute-by-minute schedule; rather the activity plan can be an abstract plan with constraints, such as requiring the officer to complete a task by a particular time of day.

Duty shift—a period of time when a parking enforcement officer works. A typical duty shift is eight hours long, which includes time for patrol, duty activities, and breaks.

Hard and soft constraints. Hard constraints are constraints that must be satisfied in any proposed solution. Soft constraints can have associated "costs" for violating them, so that solutions that minimize the cost of violated constraints are preferred, although solutions that satisfy soft constraints are preferred over solutions that do not satisfy soft constraints.

Parking meters, parking kiosks and vehicle occupancy sensors. Parking meters and parking kiosks are city-managed curbside devices that allow a motorist to purchase the right to park a vehicle in a specific location for a limited amount of time; additional parking time must be purchased upon the expiry of the meter, when permitted. Vehicle occupancy sensors are sensors that determine whether vehicles are parked in parking spaces.

ALPR-equipped vehicles. An ALPR-equipped vehicle are is a vehicle that is equipped with an automatic license plate reader. Some readers can read residential parking permits directly or are able to look up residential parking permits from license plate numbers. Vehicles equipped with ALPRs can drive down the street at normal speeds and read and record license plates. The location and time of day corresponding to each vehicle identified is stored. Some ALPR-equipped vehicles can alert the operator to certain types of violations, for instance, "scofflaw vehicles" with several unpaid parking tickets. The stored records of identified vehicles can be sent to a centralized database and downloaded to other parking enforcement vehicles. ALPR-equipped vehicles are increasingly being used to reduce the labor costs of enforcing parking time limits in areas that do not have vehicle occupancy sensors.

Foreword

The performance of parking enforcement organizations is optimized by creating joint human and computer teams. The system and method described in detail infra exploits differences in human versus computer program-implemented cognition and accessible information to create such high performing human and computer program teams. The following sections describe salient characteristics of human cognition, considerations for efficient teaming through modeling and coordination, and an analysis for combining complementary computer and human capabilities.

Both humans and computers use cognitive models to guide their reasoning. People learn from practice. With practice, performance improves and response time decreases. The effect is called the Power Law of Practice. The curve relating performance to time and repetition is called a learning curve. The actual results depend upon the characteristics of the task being mastered, but generally, the power law of practice states that the logarithm of the reaction time for a particular task decreases linearly with the logarithm of the number of practice trials taken. Using the power law of practice, differences in performance between junior parking enforcement officers and seasoned parking enforcement officers can be predicted. The system and method described herein can use these differences, for example, to advise officers depending upon the context and their experience through the dynamic route predictor 74 component of the planner and recommender layer 62, as further discussed infra with reference to FIG. 4.

Human performance also depends upon several factors. For example, when people perform multiple tasks ("multi-task") at the same time, they are more likely to forget things and to make mistakes. Conversely, when they focus intensely on just one thing, they have little attention left for other things and can lose track of time. Target fixation refers to a phenomenon observed in airplane pilots who become so focused on a target when diving their aircraft that they crash by having overestimated how much time they have left to pull up. Here, parking enforcement officers patrolling a city multitask between driving, activity and route planning, and looking for parking violations. Depending upon the situation, officers predictably exhibit diminished performance related to multitasking, target fixation, and stress. The system and method described herein can adjust amounts and types of advice according to estimated levels of priority and multitasking through the opportunity predictor 75 component of the planner and recommender layer 62, as further discussed infra with reference to FIG. 4.

Traditionally, parking enforcement officers work mostly alone with each officer assigned to a separate beat. Each officer travels mainly within his assigned beat, unless he is working on a special assignment. Although this divide-and-conquer type of approach keeps officers out of each other's way, achieving optimal overall performance is precluded. For example, the traditional individual officer approach does not cover situations in which there are multiple high-priority needs within a single beat at the same time.

For optimal overall performance, parking enforcement officers should be able to dynamically be deployed where they are most needed, irrespective of beat boundaries. The system and method described herein can predict and evaluate where officers are most needed and can keep officers aware of overlapping work done by other officers through the resource allocator 75 component of the planner and recommender layer 62, as further discussed infra with reference to FIG. 4, so that the officers do not waste time traveling needlessly to try to do work that has already been done.

In addition, supervisors are supported in making optimal plans ahead of time, while dispatchers are assisted with managing reassignments during the course of a duty day to optimally handle unplanned events and emergencies. The status of activities and workload are tracked and used to model the organization's overall needs dynamically to thereby find optimal responses and recommendations. One approach to optimization uses multi-officer "super-beats." Suppose that a parking enforcement officer on a super-beat team ("super-team") needs to respond to an event while leaving their current work unfinished. The system can recommend rebalancing the assignments among other officers to minimize the loss of revenue through the coverage planner 78 component of the planner and recommender layer 62, as further discussed infra with reference to FIG. 4.

High performance teams of parking enforcement personnel need to coordinate and collaborate. Coordination is the timing and synchronization of actions for effectiveness. Collaboration refers to work where different people carry out different parts of a joint task. Xenospection refers to the practice of observing and understanding the work of others. Coordination and collaboration require communication. To collaborate, people engage in xenospection and need to understand activity being shared. This understanding enables them to predict when certain steps will be completed, to identify when help is needed, and to detect when someone is in trouble.

Conventionally, communication creates attentional overhead, as people need to direct their attention to understand and respond to communications. The system and method described herein can provide autonomous communications capabilities to support coordination and collaboration using computers as virtual partners in parking enforcement activities. For example, the computer partner of each parking enforcement officer has a model of the officer's assignments, priorities and the state of their duty activities and tasks. These models enable the computer partner to handle some of the communications directed to the officer without interrupting the officer in the performance of his duties or requiring the officer's actual involvement in messaging between the computer partner and a centralized system that mediates parking enforcement operations. This capability is called "conditional autonomous messaging," which is provided through the message director 71 and conditional autonomous messaging 73 components of the computer partner and communications layer 63, as further discussed infra with reference to FIG. 4.

Due to differences in their respective cognitive architectures, humans and specialized computers typically have different capabilities and also different blind spots and failure modes. Cognitive models from psychology, such as described in D. Kahneman, "Thinking, Fast and Slow," Farrar, Straus and Giroux (2011), the disclosure of which is incorporated by reference, help to explain the differences. Consider an artificial intelligence computer system that is designed to solve problems or recommend solutions. Such a computer system is programmed to carry out symbolic searches over a space of candidate solutions. For example, a chess playing computer system maintains a model of a virtual chess world with a representation of a chessboard, a rule base specifying the permissible moves of the game, and state representing the current status of gameplay in terms of the current positions of the chess pieces and moves having been played. The computer system plays chess by manipulating simulated pieces on a virtual game board, evaluating the results of the simulated gameplay, and presenting gameplay recommendations.

Per Kahneman, cited supra, such systematic step-by-step cognition corresponds to System 2 thinking for humans and is characterized as the slow and careful part of human thinking that is invoked when the fast part of human cognition, System 1 thinking, fails. This style of cognition is much faster and more systematic for computers than for humans. A generate-and-test type of artificial intelligence computer system for symbolic problem solving shares many of the same qualities of System 2 thinking in that the approach taken is deliberate and systematic. However, generate-and-test machines can be blindsided when there are real world facts or constraints that are not represented in its world model.

Humans use System 1 thinking, "intuitive" thinking, for most cognition. System 1 thinking is a memory-based style of associative thinking, where a major part of cognition is working from previous experiences. Intuitive thinking returns relevant information from memories about similar events from the past. The machinery of System 1 thinking includes ways of storing memories of experience and ways of retrieving memories, given features or relationships. The workings of System 1 thinking help to explain how chess masters can walk down an aisle in a chess tournament, glance at ongoing chess games, and correctly predict an outcome, such as a "checkmate in five moves." Tens of thousands of hours playing chess create the experience to be able to recognize patterns of play and immediately recognize an answer, without all of the step-by-step work of a System 2 thinking-style approach.

System 1 thinking also has known biases in its logic. For example, when people are asked to make predictions of what might happen based upon past experience, they recall memories to mind and reflect on them. This process is known to create biases because the recalled memories tend to be those memories that are most memorable, as opposed to other memories. This bias means that the recalled memories of experiences do not provide not a good sample. Memory bias distorts the ability to make valid predictions.

In humans, System 1 thinking draws on all sorts of varied experiences. Although not strictly logical, System 1 provides a great repository of what is colloquially called, "common sense." Where System 2 thinking is logical but narrow, System 1 thinking is illogical but general. System 1 thinking does not use a model to predict how things work and simply memorizes what happens. Thus, System 1 thinking finds the closest matching memory and may return the wrong answer or the answer to the wrong problem.

Computer programs have definite advantages of speed for many kinds of information processing and are also much faster at mining large databases of potentially relevant information to uncover correlations in data and to create predictive models. In freestyle human versus computer chess games, the chess programs operate in ways analogous to System 2 thinking by reasoning step-by-step. However, computer programs also have weaknesses. Computer programs are programmed to use certain abstractions, representations and reasoning methods and generally make mistakes on "open world" problems when the abstractions, representations, and reasoning methods fail to account for something about that open world.

These human versus computer chess examples suggest possibilities for synergistically uniting the capabilities of humans and computer programs to combine different forms of cognition and different kinds of information. In the chess game example, the humans provide oversight and attention management for the computers as they search the game solution tree. In open world settings, humans also have access to different kinds of information based upon life experience. For example, whereas a computer program can generate and present options efficiently, the ultimate selection of a plan can often be improved by including a human because the human has access to (System 1 thinking-based) common sense and real world knowledge not available to the computer. On the other hand, a computer program can potentially make findings that a human would be unable to make based upon the computer program's ability to build statistical models from large databases. Further, humans make predictable errors when they need to reason in a hurry or are multitasking. In such cases and analogous to freestyle chess, a computer program can readily spot errors or violated constraints and find optimal solutions because they are systematic and tireless.

Architecture

During practically every hour of every day, countless operational decisions are made by the individuals working together as part of a parking enforcement organization, whether managers, supervisors, dispatchers, parking enforcement officers, or other personnel in the organization. FIG. 1 is an organizational chart showing, by way of example, the managerial hierarchy 10 of a parking enforcement organization. At all levels of the organizational hierarchy, parking enforcement personnel are interlinked through virtual computer partners ("c-partners"). These c-partners communicate with their human partners ("h-partners") and with each other to support coordinated parking enforcement teams. Typically, a parking enforcement organization's managerial hierarchy 10 includes managers 11, supervisors 12 and dispatchers 13, and parking enforcement officers 14, although most organizations also include administrative and support personnel.

Managers 11 (or captains) are responsible for organizational performance over an entire city or region and are mainly concerned with formulating policy, identifying long-term trends and setting priorities. In large cities, management may be divided into multiple levels with one or more assistant managers (or lieutenants) and can include dedicated analysts.

Supervisors 12 (or sergeants) oversee the performance of their squads, including assigning individual parking enforcement officers to beats and service tasks and reviewing officer performance. Supervisors 12 are also responsible for balancing workload between planned events, such as traffic control, and ongoing enforcement activities, such as parking enforcement.

Dispatchers 13 are primarily responsible for supporting public safety by orchestrating responses to unplanned events reported through emergency services, such as 9-1-1 and 3-1-1 calls, or other communications channels. Dispatchers 13 are expected to quickly identify the best personnel to deploy and to monitor the execution of tasks while assigning or freeing resources, as appropriate.

Parking enforcement officers 14 are deployed on the streets to carry out their duties along their respective beats. Their duties fall into two main groups. First, officers 14 carry out planned events and perform enforcement activities, including issuing citations (tickets) or warnings to enforce parking regulations. Second, officers 14 carry out unplanned events and perform service activities, such as directing traffic at public events, school drop-off and pick-up, sports games, fires, accidents, and so on, in response to dispatch. In addition, they report their on-the-scene observations to dispatch and receive information that helps them to plan and carry out their work.

Figure 2:
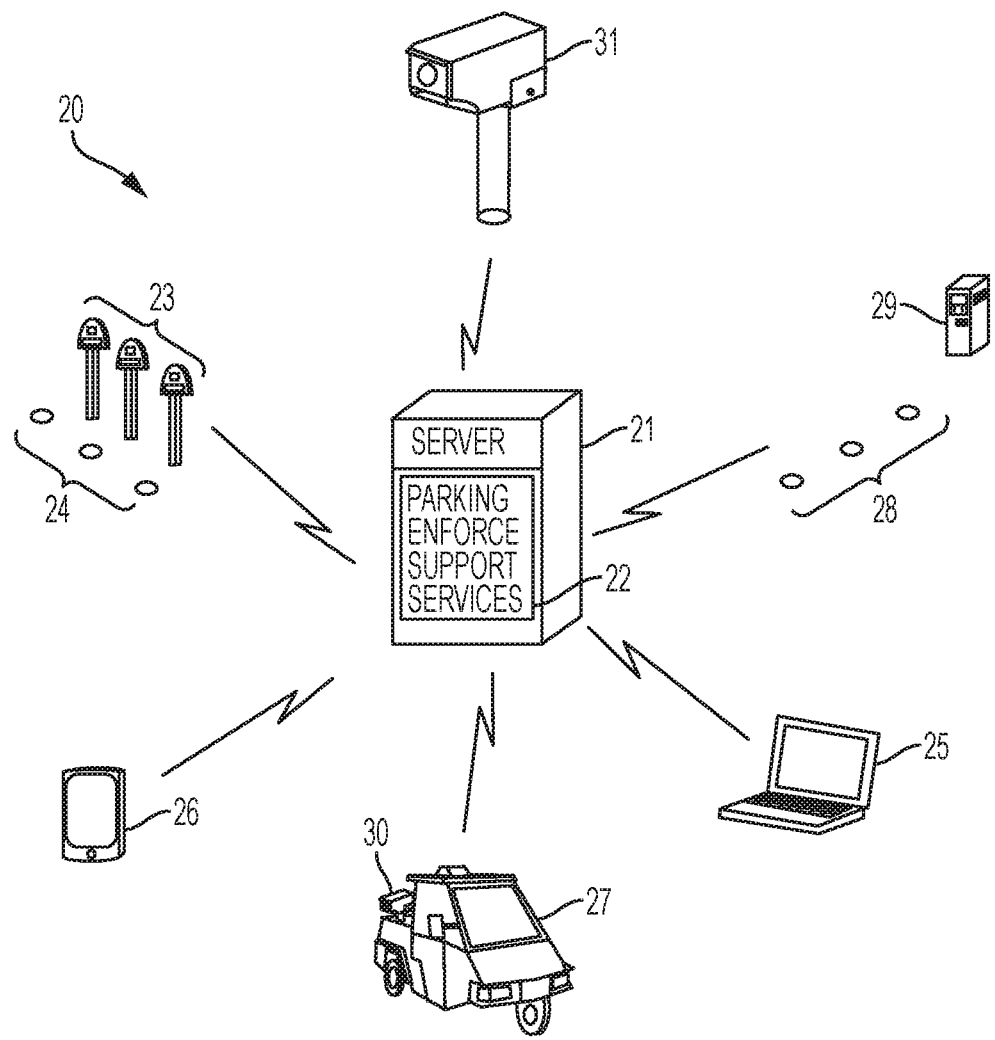
FIG. 2 is a block diagram showing a system for managing coverage of parking enforcement for a neighborhood with the aid of a digital computer in accordance with one embodiment.

Parking enforcement officers 14 on the beat enforce the city's parking regulations, direct traffic and ensure public safety. FIG. 2 is a block diagram showing a system 20 for managing coverage of parking enforcement for a neighborhood with the aid of a digital computer in accordance with one embodiment. For simplicity, parking, whether controlled by parking meters or kiosks, posted signage, or city ordinances, and regardless of whether curbside, within a parking lot, or in other physical locations, will henceforth be called "parking."

While on duty, officers 14 remain in remote wireless communications with their supervisors 12, dispatchers 13, fellow officers 14, and other personnel within the parking enforcement organization through conventional forms of communications (not shown), including radio- and cellular phone-types of devices. In addition, a suite of parking enforcement support services 22 is provided in part through one or more servers 21, which are located over a digital communications network that is wireless-capable. The specific modules of the parking enforcement support services 22 will be discussed in detail infra.

Supervisors 12, dispatchers 13, officers 14, and other personnel communicate and remotely interface with the parking enforcement support services server 21 over the network using mobile devices that include wirelessly-connectable digital computing devices 25, such as personal, notebook and tablet computers, and so-called "smart" mobile computing devices 26, such as smartphones and the like. Still other types of communications and remote interfacing devices are possible. The supervisors 12, dispatchers 13, managers, and other personnel who are typically located in situ in the organization's physical office spaces likewise interface with the parking enforcement support services server 21 over the network using the same types of wireless digital computing devices, albeit without the continual movement on the streets as occasioned by officers 14 in the performance of their duties, through wired digital computing devices, or both. The digital computing devices, whether wireless or wired, constitute the c-partners of the parking enforcement personnel.

Physically, the wireless digital computing devices may be integrated into the officers' patrol vehicles, if applicable, or could be discrete standalone computing devices. As well, locational data, such as geolocation coordinates, are sensed and continually relayed to the parking enforcement support services server 21; the locational data can be provided through GPS, Wi-Fi address tables, or other location sensing devices, either integrated into the officers' wireless digital computing or devices patrol vehicles, or through dedicated GPS or similar receivers. Still other ways to sense and relay the officers' locational data are possible.

The servers 21, personal, notebook and tablet computers 25, mobile devices 26 can each include one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components, and each of the client and server can act as a specialized computer. For instance, when the modules are implemented as hardware, that particular hardware is specialized to perform the data quality assessment and other computers cannot be used. Additionally, when the modules are burned into read-only memory components, the computer storing the read-only memory becomes specialized to perform the data quality assessment that other computers cannot. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

If a patrol vehicle 27 is so equipped, an officer's ALPR 30 will read the license plates and record the locations of parked vehicles along the officer's patrol route within a beat. The ALPR 30 interfaces with the parking enforcement support services server 21 to create records of the license plates of vehicles scanned as the officer 14 drives by; in turn, the server 21 will recognize whether the vehicle corresponding to the license plate is parked in a manner in violation of applicable parking regulations, such as over-time or abandoned parking. For instance, if the same vehicle's license plate is scanned by the ALPR 30 twice and the vehicle's location has not changed, the vehicle could be in violation of parking regulations if the vehicle's parking location is subject to a time restriction. The officer 14 can then be alerted to the violation by the parking enforcement support services server 21 and the officer 14 could issue a citation or warning.

Within the city, individual parking meters 23 and centralized parking kiosks 29 may be provided to allow a motorist to purchase the right to park a vehicle in a specific location for a limited amount of time; additional parking time must be purchased upon the expiry of the parking meter 23 or parking kiosk 29, when permitted. Parking meters 23 are generally paired with a specific parking space, whereas parking kiosks 29 may cover a range of parking spaces, such as along a block face. The parking meters 23 and parking kiosks 29 can be remotely connected over the network to the parking enforcement support services server 22, or both, whether wirelessly or wired, which can use the parking meter payment data in track expired parking and, when paired with vehicle occupancy sensors 24, 28, discussed below, to identify parking violations that can be provided to officers 14 through their mobile computing devices.

Other types of sensors can help create a comprehensive picture of the streets from a parking enforcement perspective. For instance, one or more of the parking spaces may be equipped with vehicle occupancy sensors 24, 28 that determine whether the parking space is occupied by a motor vehicle. Typically, these sensors are magnetic field sensors embedded in the street, but fixed and mobile video cameras, license plate readers, and other similar kinds of sensing devices can also be used to detect vehicles, read license plates and otherwise determine that a parking space is occupied or vacant. The vehicle occupancy sensors 24, 28 can be directly interfaced with a parking meter 23 or parking kiosk 29, remotely connected over the network to the parking enforcement support services server 22, or both, whether wirelessly or wired. As well, camera sensors 31 posted on the streets can supplement the vehicle occupancy sensors 24, 28 and ALPRs 30 to track where and what vehicles are parked and at what times of the day, as well as providing electronic "eyes" on the streets that can be used by dispatchers 13, supervisors 12, and other personnel who need to see on-the-street conditions in real time, such as traffic flow or how a response to an emergency is progressing. Finally, information is continually gathered from other types of sensors, including locational data from GPS receivers or Wi-Fi transceivers in officers' vehicles or mobile computing devices, traffic loop sensors, parking meter payment data from parking meters 23 and parking kiosks 29, car marking information from ALPR-equipped vehicles 27, camera sensors 31, and traffic flow sensor information.

The parking enforcement support services 22, parking meters 23 and parking kiosks 29, vehicle occupancy sensors 24, 28, ALPR 27, camera sensors 31, and other deployed parking regulation enforcement devices and sensors can implement network security protocols to ensure secure communications. As necessary, different secure communications schemes and levels can be applied over all communications. For example, public key cryptography could be used in various secure protocols to protect communications between all system elements.

Most situations that the parking enforcement organization's personnel encounter each day are complicated and making decisions that are optimal is difficult because time is short and relevant data is not always available to every decision maker involved. In addition, fulfilling the competing needs of promoting public safety (through service activities) and producing revenue (through enforcement activities) both require that work be performed by the same set of people, that is, the parking enforcement officers 14, at the same time. Under some circumstances, this type of competition for limited resources can force an organization to have to divide its efforts between revenue-producing compliance (ticketing) activities and non-revenue-producing service (public safety) activities in ways that are ineffective and suboptimal.

These concerns can be resolved by providing parking enforcement organization personnel with real time information coupled with operational managerial and situation assessment tools to thereby facilitate optimal performance at all levels of the organization. The c-partners have access to elements that provide information services, such as monitoring, alerting, planning, and recommending. The organization's personnel are thus empowered with the information and tools necessary to making the decisions that guide the organization's activities in an optimal fashion.

Figure 3:
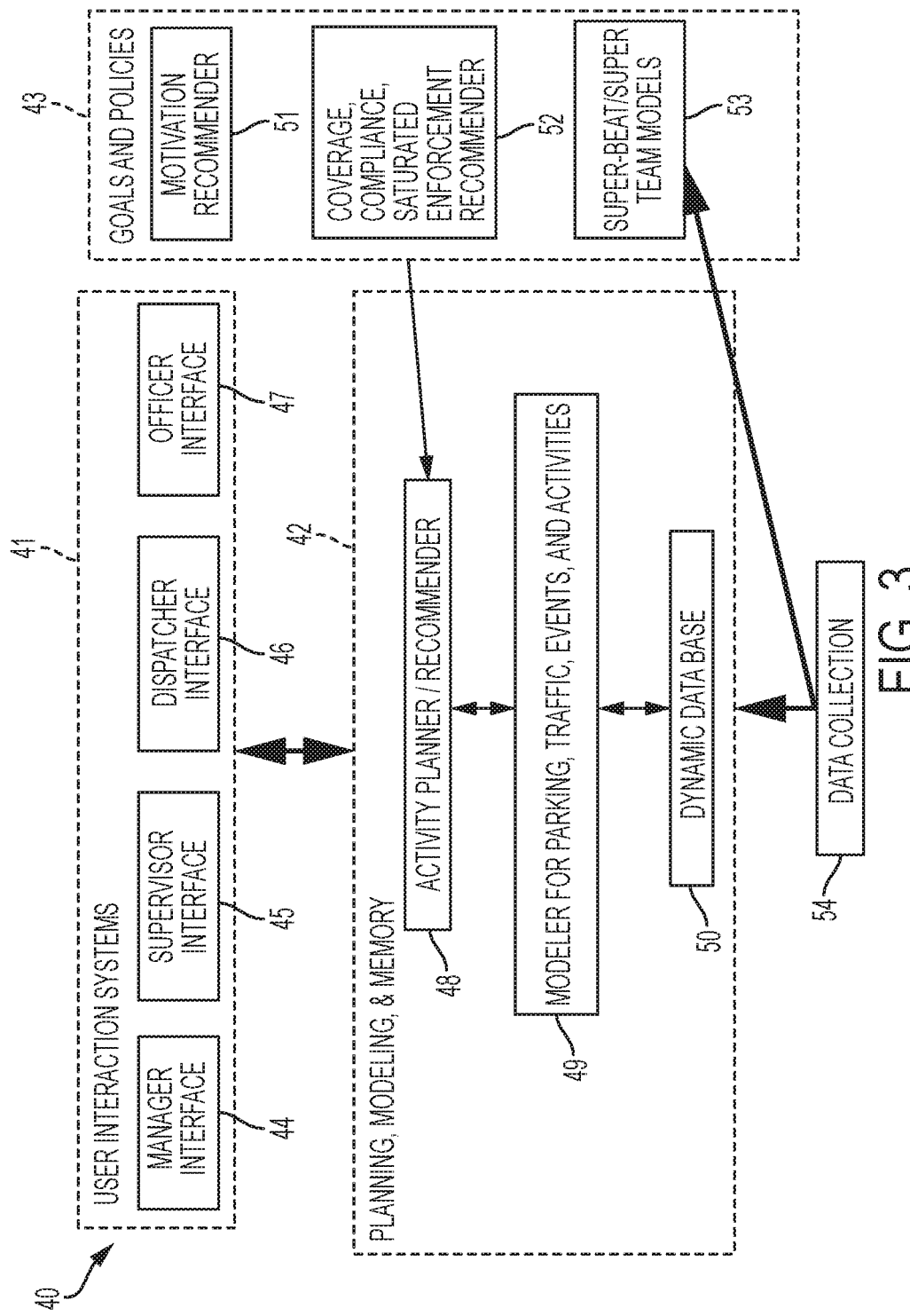
FIG. 3 is a functional block diagram showing a method for managing coverage of parking enforcement for a neighborhood with the aid of a digital computer in accordance with one embodiment.

The needs of the personnel manning a parking enforcement organization can be effectively met by creating fast OODA (Observe-Orient-Decide-Act) loops that are more comprehensive, data-driven, and faster than what is currently available to parking enforcement personnel through conventional approaches and which exploit the complementary capabilities of human and computer cognition in an empowering and synergistic fashion. FIG. 3 is a functional block diagram showing a method 40 for managing coverage of parking enforcement for a neighborhood with the aid of a digital computer in accordance with one embodiment. Parts of the method 40 is implemented in software and execution of the salient portions of the software is performed as a series of process or method modules or steps by a combination of computer hardware, including servers 21, personal, notebook and tablet computers 25, mobile computing devices 26, communications network infrastructure, parking meters 23 and kiosks 29, vehicle occupancy sensors 24, 28, ALPR 27, and other kinds of sensors, including GPS receivers in officers' vehicles or mobile computing devices, traffic loop sensors, and traffic flow sensors, as described infra.

By way of overview, the method 40 can be divided into three functional facets, user interaction systems 41, planning, modeling and memory components 42, and goal and policies tools 43, all of which rely, to some degree, on information obtained through data collection sources 54. These three functional facets are revisited in depth infra with reference to FIG. 4. The user interaction systems 41 provide interactive user interfaces that serve as windows into the system 20 for the parking enforcement organization's personnel, including managers 11 (manager interface 44), supervisors 12 (supervisor interface 45), dispatchers 13 (dispatcher interface 46), and parking enforcement officers 14 (officer interface 47). The user interfaces may be hosted on a traditional personal or notebook computer 25, such as would be used in an office environment, or on a mobile computing device 26, such as a tablet computer or smartphone with which a parking enforcement officer may be equipped while out on patrol. Still other user interfaces and types of user interface hosting platforms are possible.

The planning, modeling and memory components 42 includes an activity planner and recommender 48 that generates activity plans of upcoming duty activity recommendations for parking enforcement officers 14, including predicting enforcement activities along beats and super-beats and service activities that are expected to be performed. In determining recommendations for upcoming duty activities, the activity planner and recommender 48 considers inputs from a modeler for parking, traffic, events, and activities 49 that uses a time-based active representational model for a city situation, enforcement activities, estimates of parking violations expected to occur within each beat, and city enforcement policies and priorities stored in a dynamic database 50. The planning, modeling and memory components 42 are typically hosted centrally on the parking enforcement support services server 21. Still other planning, modeling and memory components are possible.

Finally, the goal and policies tools 43 empower managers 11 and other personnel within an organization with the ability to implement higher-level goal and policy abstractions into practicable solutions. A motivation recommender tool 51 provides a real time system for motivating officers 14 and supervisors 12 through motivation touch points and different types of motivations. A coverage, compliance and saturated enforcement recommender tool 52 assists managers 11 and supervisors 12 with planning coverage in under-covered regions, maintains models of elastic response, and improves statistical knowledge of the "ground truth" of a beat, that is, the actual level of non-compliance. Last, a super-beat and super-team models tool 23 enables supervisors 12 to model the coverage and overall effect of forming different combinations of beats into super-beats and individual parking enforcement officers 14 into super-teams. The goal and policies tools 43 are also typically hosted centrally on the parking enforcement support services server 21. Still other goal and polices tools are possible.

Figure 4:
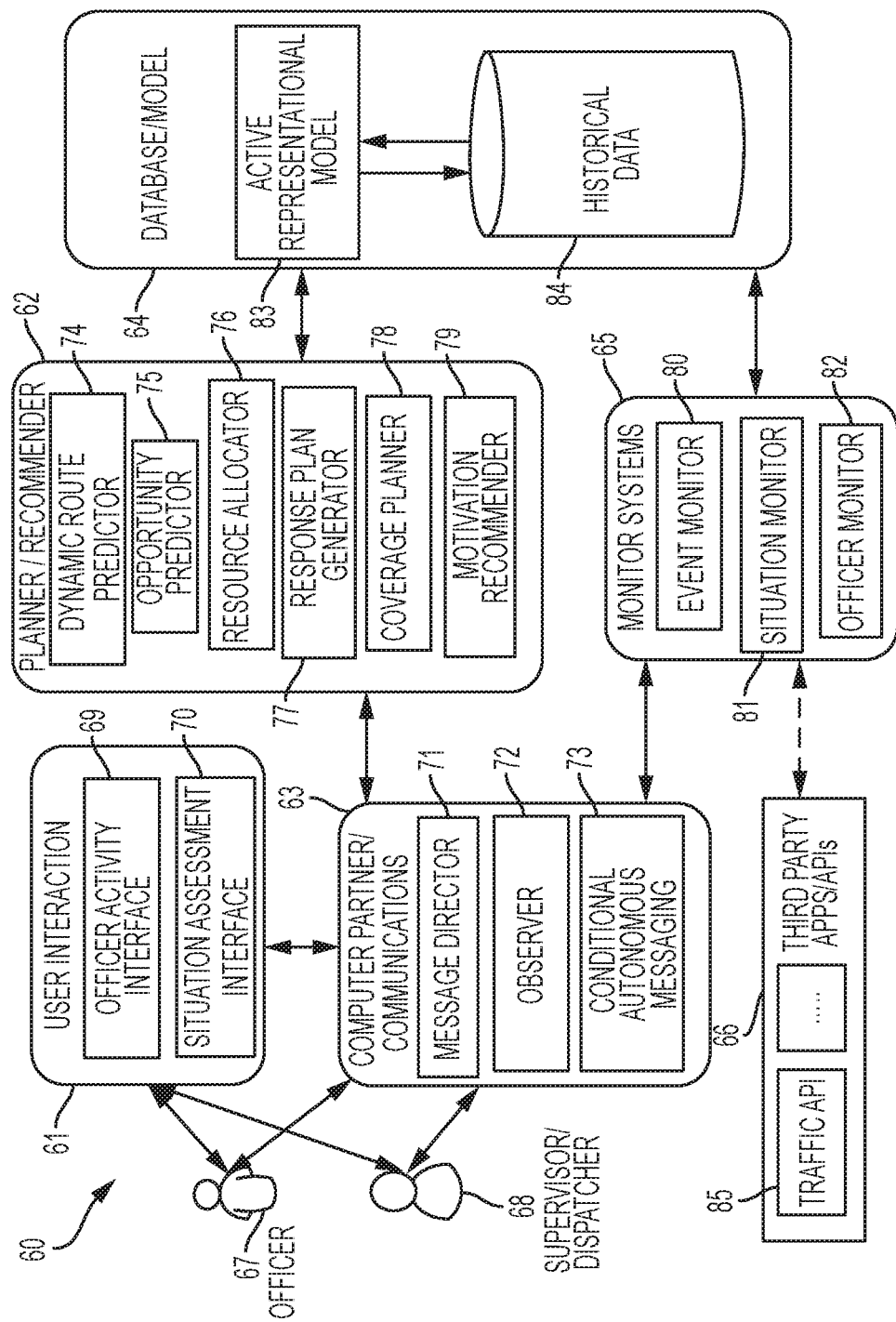
FIG. 4 is a block diagram showing the architectural elements of the parking enforcement support services as implemented on the parking enforcement support services server of FIG. 2.

The specific modules of the parking enforcement support services 22 are structured into five layers. FIG. 4 is a block diagram showing the architectural elements 60 of the parking enforcement support services 22 as implemented on the parking enforcement support services server 21 of FIG. 2. By way of overview, the user interaction layer 61 provides interactive user interfaces that serve as windows into the system 20 for the parking enforcement organization's personnel. The planner and recommender layer 62 generates upcoming activity recommendations for parking enforcement officers by predicting duty activities along patrol routes within a beat. The computer partner and communications layer 63 handles communications vetting, including conditional autonomous messaging on behalf of their human partner, that is, the officer 14 paired with the computer partner. The database and model layer 64 stores a time-based active representational model 83 for the city and historical data 84, including officer performance, citations and warnings, and past planned and unplanned events. Finally, the monitoring system layer 65 provides dynamic oversight over events and state changes. The layers will now be discussed in detail.

The user interaction layer 61 is implemented through the user interaction systems 41 discussed supra with reference to FIG. 3 and includes two components. First, an officer activity interface 69 presents optimal patrol routes within a beat to officers 67, as well as supervisors and dispatchers 68, as further discussed infra with reference to FIGS. 13-21. Second, a situation assessment interface 70 provides the status of on-going events, officer whereabouts, alerts, communications, and real-time feeds for use by supervisors and dispatchers 68, as well as officers 67, as further discussed infra with reference to FIGS. 47-49. Other user interaction layer components are possible.

The planner and recommender layer 62 generates upcoming activity recommendations for parking enforcement officers. The planner and recommender layer 62 utilizes information from the time-based active representational model 83 in the database and model layer 64 and includes six components, a dynamic route predictor 74, an opportunity predictor 75, a resource allocator 76, a response plan generator 77, a coverage planner 78, and a motivation recommender 79. Other planner and recommender layer components are possible.

Here, one or more activity plans are built by the system for each officer using the dynamic route predictor 74 and the opportunity predictor 75 in the planner and recommender layer 62. There could be multiple optimal activity plans where the differences between the competing plans are insubstantial or statistically irrelevant. In that situation, the competing optimal plans could be presented to the officer, who can then choose one of the activity plans, or the system 20 can dynamically pick one of the activity plans for the officer.

The dynamic route planner 74 and the opportunity predictor 75 build activity plans that optimize officer performance. An officer's performance is multi-dimensional because there are multiple demands on the officer 14 and trade-offs need to be made in deciding what to do. An officer 14 is expected to enforce the most important citations, meet service demands, take required breaks, and so on. These different activities compete with each other. Using time effectively is generally part of the requirement, and so is doing the most important things as determined by departmental policies.

The problem of identifying those activity plans that optimize officer performance can be modeled as a constrained optimization problem with priorities. The computation can factor in the time taken to walk or drive a block, the number of blocks to be enforced, the time spent issuing the number of predicted citations, and other considerations that can affect time to enforce. The opportunity predictor 75 component of the planner and recommender layer 62 builds an activity plan that optimizes patrol routes within a beat based upon productivity, as further discussed infra. Patrol routes within a beat for officers 67 are performance-optimized based upon anticipated productivity by calculating the anticipated number of parking violations per block, with resources deployed to maximize citation issuance. The correlation between the average time that a vehicle is parked and the maximum time that vehicles are allowed to park in each metered parking space is a key consideration.

In a further embodiment, an optimal activity plan could be generated by the components of the planner and recommender layer 62 that has been optimized for given or expected conditions. The optimization process take into account all available information, including city or department policies, the need for breaks, information about what other officers 14 have already done, expectations for violations (and citations) and markings, traffic conditions, sensor data, historic trends and known factors, details about the shift (time of day or period, such as morning, afternoon, or graveyard), day of week, number of officers 14 present, and known service requests with policies used to prioritize across competing needs. Based upon the foregoing factors, one or more activity plans, including predictions of expected performance, are generated and metrics are applied to the predictions of expected performance. The best performing plan, or plans, are selected, which constitute an optimal activity plan. A version of the optimal activity plan, possibly in abstract form, is presented to supervisors 12 and officers 14, together with the predicted expectations and relevant data. Still other ways of computing optimal activity plans are possible.

Three of the components of the planner and recommender layer 62, the resource allocator 76, the response plan generator 77, and the coverage planner 78, are focused on providing support to supervisors and dispatchers 68, as further discussed infra with reference to Scenarios 3 and 4. The resource allocator 76 identifies the resources needed to handle unplanned events. The response plan generator 77 creates the operational plans for the teams and recommends adjustments to the operational plans throughout the day as the situations change. The coverage planner 78 rebalances the remaining activities among the parking enforcement officers remaining on a team after one or more of the officers are assigned to handle an unplanned event.

Finally, a motivation recommender 79 generates performance analytics for presentation to supervisors and dispatchers 68 and parking enforcement officers 67, as well as to managers, as further discussed infra in the section entitled, Performance and Motivational Analytics. The motivation recommender 79 generates analytics about working hard and working smart that draw on models of urban situations and which predict expectations of best choices in activities. The motivation recommender 79 creates performance analytics to cover three broad times, before an activity is done, after an activity is done, and while an activity is being done. The analytics help an officer, his supervisor, or other personnel answer the questions, given the present state of the city, what is expected of the officer in terms of performance and what should the officer therefore be doing while on the beat? Thus, the performance analytics reflect what an officer was, is or should be doing, depending upon whether the analytics respectively are retrospective, real time or prospective, the service time taken by the officer to issue citations, citations or warnings actually issued, the officer's movements (or lack thereof), circumstances that might affect the officer's performance, and other factors that are specific to the moment of inquiry.

The computer partner and communications layer 63 handles communications vetting between the system 20 and the officers 67 and supervisors and dispatchers 68. First, a message director 71 dynamically routes messages between the organization's personnel, particularly where tagged messages are utilized, as further discussed infra with reference to FIG. 4. The observer 72 monitors the whereabouts and activities of officers 67 and generates alerts when a deviation from a recommendation or operational plan is identified, also as further discussed infra with reference to FIG. 4. The whereabouts of officers can be determined by the observer 72 directly based upon locational data provided through GPS, Wi-Fi address tables, or other location sensing devices, either integrated into the officers' wireless digital computing or devices patrol vehicles, or through dedicated GPS or similar receivers, or indirectly through traffic loop sensors, car marking information from ALPR-equipped vehicles, traffic flow sensor, or camera sensors 31. Finally, a conditional autonomous messaging 73 component provides conditional autonomous messaging on behalf of a human partner, that is, an officer 14, who is paired with the computer "partner," as further discussed infra in the section entitled, Balancing Work Load and Handling an Unplanned Event. Other computer partner and communications layer components are possible.

The database and model layer 64 stores a time-based active representational model 83 for the city that fuses historical and current parking citation data with information received from sensors throughout the city and includes estimates of parking violations expected to occur within each beat. The "active representational" aspect refers to persistent memory and computational processes that represent the current "state information" about the city and about the activities of the parking enforcement organization, particularly the on-the-beat activities of the officers and the enforcement activities that they perform. The active representational model 83 combines information based upon recent sensor data, including locational data from GPS receivers in officers' vehicles or mobile computing devices (or determined through Wi-Fi triangulation or other location-sensing devices), traffic loop sensors, parking meter payment data, car marking information from ALPR-equipped vehicles, and traffic flow sensor information, as well as duty status and parking citation information from officers. They also use historical data 84 in the modeling, including historical citation data that reflects past parking violations within each beat, along with the time of day and day of week for the violations. The database and model layer 64 is time-oriented by making predictions about what is happening at different times. Some of the predictions are also space-oriented, in that these predictions predict what will happen (or will happen in the aggregate) in regions of different sizes in the city.

The active representational model 83 includes algorithms that predict parking violations in regions, for instance, neighborhoods, and times, for instance, during a particular hour on a given day of the week. The modeling takes into account seasonal effects, day of week, neighborhood trends, and recent enforcement history. In addition, the modeling can take into account known ongoing factors, such as parades, weather, traffic, accidents, fires, sporting events, holidays, and so on. In one form, the algorithms can predict the probabilities or likelihoods of violations in parts of a city based upon historical data, including spatially sampled or temporally sampled historical citation data.

In a further embodiment, the algorithms can include the use of a wider range of factors in addition to (or in place of) historical citation data to create different predictive models for different kinds of neighborhoods. For instance, additional factors can include:

Parking behaviors, such as double-parking in commercial loading zones.

Day of week combined with time of day.

Categories of neighborhoods, such as residential, commercial or business, industrial, or mixed use.

characteristics of neighborhoods, such as a residential neighborhood near to a business district, hospital, or university, into which motorists who are unable to find parking will overflow.

These additional factors can be used in the training of the parameters of the predictive models as an adjunct to historical citation data or, if historical citation data is not available (or is unreliable), as a surrogate for historical citation data. Still other additional factors are possible.

The active representational model 83 exports third party application programming interfaces (APIs) 66, including a traffic API 85, for system elements making inquiries for questions about the current state. In one embodiment, a publish and subscribe approach is employed, where processes can publish data to make the data available to other processes when the data becomes known. In this approach, data is "pushed" or sent as the data becomes available to subscribing processes that have registered to receive the data. In a further embodiment, data can be "pulled" or provided upon request, which enables system processes to "pull" or query the active representation model 83 when they need the data.

Data that can be computed or provided in the active representational model 83 includes:

Locations, movements, and current tasks and duty statuses of officers on duty.

Life cycle of violations, for instance, where violations are known to have occurred, where violations are predicted to occur, numbers, time before compliance ends, which violations have been cited, which violations are likely to be cited.

Life cycle of events, for instance, which events are active, current state of active events, staffing levels, time before finishing or reaching next stage of events, participants.

Other types of computed or provided data in the active representational model 83 are possible.

The system 20 fuses information from many sources, including sensors distributed around the city with current and historical citation data, to inform its active representational model 83 for the city and to create an estimation of the current situation. For example, sensor information could come from fixed sensors in the road, ALPR sensing systems on patrol cars, buses, delivery vehicles, and other vehicles, vehicle occupancy sensors associated with parking spaces, parking payment collectors, and other sensors fixed or movable in the region. In addition, information about traffic, parking place occupancy, and ongoing citations can be collected. Elements of the system 20 are responsible for collecting and storing this information, and revising estimates about the urban situation, and updating the status information and status information in the active representational model 83 for the city, as discussed supra.

The status information in the active representational model 83 for the city are used to update predictions and make recommendations through the officer activity interface 69 and situation assessment interface 70, as well as in other contexts in which the information might have a bearing on decisions being considered or made. For example, information from the vehicle occupancy sensors 24, 28 is used to update expectations of parking regulation violations and information from ALPR-equipped vehicles is used to update information about when the vehicles that are currently parked in time-regulated parking zones will become subject to citation.

The monitoring system layer 65 provides dynamic oversight over events and state changes in the urban environment of the city and oversight of the activities of the parking enforcement officers 67. This layer fuses information coming from the computer partner and communications layer 63 and provides the information to the active representational model 83 in the database and model layer 64 for updates. The monitoring system layer 65 also maintains dynamic vigilance of evolving situations and enforcement activities and provides alerts as needed to parking enforcement personnel.

The monitoring system layer 65 includes three components. First, an event monitor 80 monitors the status information of ongoing events, as further discussed infra in the section entitled, Adjusting Plans to Re-Allocate Activities as Needed. The event monitor 80 tracks event-related data, such as the positions and roles of event participants, relevant sensor data, and tagged message streams. This information is used to track transitions for the active representational model 83. Second, a situation monitor 81 tracks performance and situation indicators not necessarily tied to specific events. The purpose of the situation monitor 81 is to look for developing conditions that need attention. Finally, an officer monitor 82 tracks the performance and activities of officers beyond their assigned event activities. On the one hand, officers 67 could have safety issues, such as if they are involved in an accident or are approaching a dangerous situation known to be dangerous. From a management perspective, officers 67 on occasion could appear to be off their assigned beat, parked somewhere unexpected or in non-productive situations. The officer monitor 82 is intended to fuse relevant information from the officer's vehicle, the officer's mobile computing device 26, and potentially other sensors and to send alerts to the officer 14, a dispatcher 13 or supervisor 12, as appropriate. Other monitoring system layer 65 components are possible.

Performance and Motivational Analytics

This section provides a framework for understanding variations on how analytics can be implemented into the system and how the variations on analytics are based upon different hypotheses of how to improve or optimize performance. Theoretically, there are three broad approaches about what is most effective and sustainable in motivating performance:

Activity Alerts (for working hard). This approach uses monitoring software to detect when officers are not being productive. The theory is that low performance is caused by slacking or goofing off behaviors. The hypothesis is that performance will improve if supervisors get real-time alerts about low-performing officers and coach them when slacking or goofing off behaviors are happening.

Real-time Optimization Recommendations (for working smart). This approach uses predictive analytics to create recommendations for optimal performance. The theory is that low performance is caused by people not knowing what to do. The hypothesis is that by providing recommendations just in time, officers, dispatchers, and supervisors will be informed, make better choices and improve performance.

Motivational interfaces (for making jobs more interesting). This approach is about making jobs more interesting. A body of psychological research on motivation and performance, such as described in D. H. Pink, "Drive: The Surprising Truth About What Motivates Us," Riverhead Books (Apr. 5, 2011), the disclosure of which is incorporated by reference. In this approach, for any activity that involves even a little bit of cognition, the greatest performance is found when the task provides a sense of autonomy, mastery, and purpose.

These three approaches are complimentary designing and the system 20 provides the tools that enable an organization to learn what works best. The motivational tools are configurable, so that the organization can try different motivational strategies with their personnel and collect data about performance.

Working Hard and Working Smart

The distinction between "working hard" versus "working smart" illuminates two broad theories about why organizations perform poorly. Analytics about working hard measure amounts of activity and raw productivity numbers. Parking enforcement officers 14 on patrol are largely out of sight of supervision. In some cities, interest in working hard analytics grew over the last few years following news stories about officers going home when they are supposed to be working or sleeping in their vehicles for hours when they were on duty.

The theory behind working hard analytics is that officers are loafing and not performing their work and the situation causes low performance. Examples of simple working hard analytics include identifying how busy people are. For instance, are there gaps of time when individuals have no apparent output? Are those individuals just standing still, apparently doing nothing? Are those individuals underperforming compared to the expectations for other individuals at comparable times and locations based upon historical data or real time situation data?

The underlying analytics about working hard can be nuanced. Such analytics need to account reasonably well for the time of day, day of week, whether a parking enforcement officer 14 is parked because they are performing a service responsibility, or are on break.

Analytics about working smart draw on models of urban situations and predict expectations of best choices in activities. Supervisors 12, dispatchers 13, and parking enforcement officers 14 make decisions all day long about where to go and what to do. Interest in working smart analytics is growing because organizations are increasingly understanding that enforcement resources are not deployed optimally, which follows the idea that recommendations should be based upon data through a process that involves prioritizing, selecting, and checking feasibility.

The theory behind working smart analytics is that low performance is caused by people focusing on the wrong things at the wrong times and places. Examples of working smart analytics combine measures of workflow with measures of opportunity. For instance, are officers 14 using routes that take them where they are most needed for productivity? Are officers 14 ignoring recommendations and engaging in less productive activities, or adhering to following the recommendations? Are officers 14 aware that another officer 14 has passed through their beat and has already picked up the available citations on a stretch of blocks? These concepts can be quantified into an activity plan for each officer 14. In a further embodiment, other factors can be taken into account, such as characteristics pertaining to the beat, including the nature of the beat, time of day, day of week, season, number of officers on the beat, traffic conditions, and service requirements, and officer-specific factors, including the officer's level of experience and familiarity with the beat. Other characteristics and factors could also be applied. The officer's performance can be gauged against the activity plan under either the rubrics of working hard, where no movement or activity may indicate that the officer 14 is not doing his job or loafing off, or working smart, where the officer's decision to not follow the activity plan may indicate bad choices in where, what and when to enforce parking infractions.

Working smart analytics also apply to higher levels in an organization. For example, are supervisors assigning their squad to the beats most worth working? When dispatchers 13 interrupt parking enforcement officers 14 while working, do the dispatchers 13 assign the wrong people and unnecessarily disrupt the productivity of the organization? When supervisors 12 interact with officers 14, do they pay enough attention to low performers? When managers create organizational policies, do they account for the impact of their policies on other dimensions of organizational performance?

Predictive analytics for parking citations in a region model parking and violation-related activities by region and time interval. Recommendations for which activities to choose can be computed by systems that generate plans for different alternative activities and outcomes, compare and evaluate the outcomes, and recommend the top choices. Systems making such predictions and recommendations can use historical data and a raft of sensor information. For example, parking occupancy, as available through vehicle occupancy sensors, and traffic conditions are predictive of the amount of parking activity, the availability and competition for parking spaces, and the number of expected violations. Thus, those areas within a beat situated about an officer's general direction of travel within which expected parking violations in his activity plan are expected are identified and recommendations for each of those areas are provided to the officer after considering the officer's actual (tracked) activities and any compliance activities (citations issued) already performed by the officer, so as to avoid inefficiencies in re-patrolling areas too soon or visiting areas that are not likely to be productive.

Analytics and Presentation Timings

There are three broad times for presenting performance analytics in an enforcement organization: a preview presentation before an activity is done, a review presentation after an activity is done, and a real time presentation while an activity is being done. The theory of analytic impact varies with the presentation timings.

Preview analytics are presented before an activity is done. For example, previews can take place at the beginning of a shift or at the beginning of working a part of a shift. The mobile interfaces for parking enforcement officers 14, as illustrated in the scenarios, discussed infra, provided previews for a shift ("Plan my Shift") and orienting ("Plan for this Neighborhood"). The theory for preview analytics is that they prepare an officer 14 to organize their activities properly before they carry them out.

Review analytics are presented after an activity is done. These analytics are the most common kind of analytics that are used. Review analytics are a kind of post-mortem analysis. They can cover one or several sessions of performance and identify areas of low performance. The theory of review analytics is that they encourage reflection by people about what is going wrong and provide an opportunity to recognize how to do better and commit to doing that.

Real time analytics are presented while an activity is being done. For example, alerts about working hard can take place when an excessive time gap is noted and before the time gap gets any longer. An activity or routing recommendation can take place at the time of a decision. The theory for real time analytics is that they guide decisions when they are being made, and that the time that decisions are being made is a high leverage point for improving performance.

Touch Points and Influence

There are four broad touch points for presenting performance analytics in an enforcement organization, presentation to supervisors 12, to dispatchers 13, to managers, and to parking enforcement officers 14. The theory of influence and effectiveness of an analytic varies with the touch point.

Supervisors 12 have oversight over squads of officers 14. Typically, supervisors 12 are responsible for assigning officers 14 to beats, reviewing their officers' performance, and advising their officers 14 on their work. If supervisors 12 assign officers 14 to the wrong activities or fail to monitor the low performers in the organization, the performance of the organization can be compromised. The theory of analytics for supervisors 12 is that supervisors 12 have a broad impact for gating the performance of the organization. Supervisors 12 need a recommendation system to assign officers 14 optimally, given institutional policies. Supervisors 12 also need oversight of low performers to encourage the low performers to work harder or work smarter.

Dispatchers 13 have oversight over the real time unfolding of daily activities. Typically, dispatchers 13 take or receive 9-1-1 calls and other requests and decide which people or resources to assign to the requests. Today, dispatchers 13 typically have little or no data about the impact that choosing particular officers 14 might have on citation performance (revenue). In some organizations, dispatchers 13 put out a call for assistance and take the first parking enforcement officer 14 to respond. Dispatchers 13 generally have little to no responsibility for rebalancing other responsibilities after an officer 14 is pulled from whatever he is doing. The theory of analytics for dispatchers 13 is that dispatchers 13 have the potential to disrupt or preserve and balance the citation performance of an organization. Dispatchers 13 need a monitoring interface, situation awareness, and a recommendation system to effectively wield their influence on ongoing activities.

Parking enforcement officers 14 have oversight of their own activities. Typically, officers 14 have no visibility for events outside their immediate location. Officers 14 are often unaware of any activities of a different officer 14 that passes through their beat. In most departments, officers 14 also do not have any data for optimizing their choices, including "best case" awareness, where everything goes as planned, or in dynamic situations, where data of ongoing events becomes available. The theory of analytics for officers 14 is they need both situation awareness and recommendations about optimal choices to do their jobs well.

The notion of a patrol "beat" will now be discussed.

Beats

Depending upon the vernacular chosen by a parking enforcement organization, the geographic areas within a city where parking enforcement officers 14 carry out their parking enforcement activities may be called zones or beats. These terms will be used interchangeably, unless otherwise noted. Beats are used to organize and divide the work of the officers 14. Traditionally, a medium-sized city may be divided into twenty or thirty beats with a single parking enforcement officer 14 assigned to patrol each beat during a shift. Typically, there are different beats for daytime and nighttime. At night, less parking and traffic enforcement is needed than during the day, and parking enforcement officers 14 can therefore cover larger areas and focus on different kinds of violations at night.

In the traditional beat approach, one parking enforcement officer 14 is assigned to each beat. This approach keeps officers 14 out of each other's way and provides clear accountability for coverage of each neighborhood or block of a city. Traditionally, beat design was concerned mostly with the amount of area that an officer could cover effectively during a shift. In most cities, beats are mapped out and updated every few years.

The infrequent design of beats every few years works best when the regions being covered do not change in character and when the size of the parking enforcement force is fairly constant. These assumptions break down in practice, either because neighborhoods evolve and have different enforcement needs or because the enforcement force changes in size. To account for such changes, traditional, fixed beat can be redesigned as often as needed as conditions change. In principle, beats could be re-designed every day or even during a single day, such as when parking enforcement officers 14 become unavailable due to unexpected circumstances. When resources are limited, beats could be designed to enforce areas with the highest probability of citations. For example, when there are constraints on time or staffing, parking enforcement could be directed to cover only those blocks with the highest likelihood of citations, such as the top 5%, 10%, or 20%. A performance-optimized patrol route within a beat for these blocks could be determined, and the patrol route would be divided equally in intervals of time according to the available number of parking enforcement officers 14. This approach allows each parking enforcement officer 14 to spend a similar amount of time enforcing unique areas where citation productivity is likely to be high. Similarly, beats could be designed based upon the assumption that citation output will be similar across all parking enforcement officers 14 while the time to enforce a beat will vary.

Here, the generation of beats and routes through the system 20 can be driven by feedback to the system, including disparities between the number of violations predicted versus the number of citations actually issued. For example, if a large number of citations are issued on a certain block face in a given hour, even if paid use, occupancy, and other factors suggest the citation volume should be low, that block can be considered by the system as a block with a high probability of violations. Similarly, after using the method 40 design a beat to canvass that block, if the number of violations predicted remains significantly higher than the number of citations issued, that variance can be factored into future designs of beats by the system 20.

Super-Beats and Super-Teams

The traditional approach to designing and fielding beats is breaking down. In many cities, policy dictates that when a parking enforcement officer is returning from an assignment servicing an event, the officer should pick up any tickets encountered as they return to their own beat or another assignment, even if passing through the beat of another officer. This type of policy introduces several problems, as the parking enforcement officer assigned to the passed-through beat will typically not be aware of the other transient officer's travel and citing activities. When the assigned officer covers those areas of his beat, the officer will find that another officer has already cited the violations, which can lead to complaints about "poaching," wasted time, and difficulties in making quota or meeting performance expectations. Some cities use the rhetoric of teamwork to counter these complaints, while also recognizing the need to optimize the performance of the organization, but lack any real time computational support for making a paradigm shift away from individual officer performance and towards true team effort.

In a broader sense, one of the problems with assigning parking enforcement officers rigidly to traditional dedicated beats is that the officers are not always deployed where they are needed most during a duty shift, as the parking enforcement officers will ordinarily stick to patrolling their own beats, except in the case of emergencies or when responding to unplanned events managed by dispatch. Moreover, by itself, the traditional beat approach has no principled provisions for assigning multiple officers to two "hot spots," that is, two different locations in need of attention falling within the coverage of the same beat, if the hot spots occur at the same time. Further, the supervisors and dispatchers who respectively make the decisions on how to handle planned events versus emergencies and unplanned events generally make their decisions without any real time computational support, albeit in the absence of a full understanding of the effects of different choices. In short, supervisors and dispatchers "fly blind" and rely on memories of past experience, gut feelings, and policies, rather than up-to-date data. Furthermore, when dispatched parking enforcement officers respond to unplanned events, other duty activities on their beats are put on hold, which, in many circumstances, can lead to suboptimal performance for the organization.

One alternative to traditional beats involves eliminating beats altogether through dynamic beats. For instance, the Beat Generator product, licensed by Xerox Corporation, Norwalk, Conn., makes predictions about expected citations. The product divides expected work by the number of parking enforcement officers available and gives each officer an area or a route to patrol during a duty shift, but at the cost of omitting support for planned and unplanned events.

Notwithstanding, the problems attendant to traditional beats can be addressed by creating by combining individual beats into a combined parking enforcement region known as a super-beat. As summarized in Table, 1, the super-beats approach differs from the traditional beat approach in several ways. Starting with the same parking enforcement officer staffing, the super-beats approach suggests combining several, for instance, three or so, beats together into a single super-beat. Policy then mandates that the officers on the super-beat work together as a team to maximize their collective performance, along with incentives structured to encourage teamwork and optimization. Traditional beats, dynamic beats, such as provided by the Beat Generator product, and Super-Beats are compared in Table 2.

TABLE 1

| Traditional Approach | Super-Beat Approach |
| --- | --- |
| Assign one officer per regular beat. | Assign a team of officers to a super-beat. |
| No computer support for optimizing assignments. | System supports optimizing assignments. |
| Planned special assignment from supervisor. No real-time oversight. | Planned special assignments from supervisor. Real-time dashboard oversight for dispatchers and supervisors. |
| Unplanned events assigned by dispatcher. No computer support for optimizing. | Unplanned events assigned by dispatcher. System helps optimize plans. |
| When officers "pick up" tickets on others' beats, offers complain about poaching and wasted motion. | When officers pick up tickets on others' beats, this is factored into A1 recommendations. Credit is shared and waste motion is eliminated. |
| Individual performance measured and incented. | Individual and team performance measured and incented. |
| No passing of enforcement data across officers or shifts. | Enforcement information is delivered to officers on patrol dynamically. |
| Sub-optimal - because it does not place officers dynamically where they are needed. | Optimal for a team and across teams when dispatchers can change team assignments. |

TABLE 2

| | Traditional Beats | Dynamic Beats | Super-Beats |
| --- | --- | --- | --- |
| Divides labor of force. | Yes | Yes | Yes |
| Optimizes enforcement assignments. | No | Yes | Yes |
| Supports planned events. | With supervisor, but without optimization. | No | Yes |
| Supports unplanned events. | With dispatcher, but without optimization. | No | Yes |
| Can be used and adopted incrementally. | (Is breaking down) | Use variable number of separate squads of officers for dynamic work. | Yes |

Of the three approaches, the super-beat approach is the only one that provides optimization and support for planned and unplanned events. Provisions for dynamic planning make the super-beats approach especially suited to cities where the parking enforcement organization must respond to emergencies or unplanned events. The same capabilities also enable a city to vary the size of the enforcement force during the day, as needed. Organizations can also deploy or test the super-beats approach incrementally. Typical parking enforcement departments have years of experience and a culture built up around organizing their activities by beats. Approaches, such as dynamic beat generation, offer a promise of optimization, but at the same time, require organizations to do away with familiar pre-defined beats altogether. For many departments, that approach is too radical of a change and that hinders adoption. Super-beats enable a parking enforcement organization to keep existing beats for those situations in which traditional beats work well enough and to try super-beats and teamwork in select areas where optimization is suffering. For example, an organization can take a few squads and deploy them over a portion of the area as super-teams on super-beats, while measuring changes in overall performance. This type of incremental adoption offers less risk and enables an organization to try things out, test and demonstrate utility, and motivate other supervisors and squads to transition to a super-beat approach.

Optimizing Patrol Routes

Figure 5:
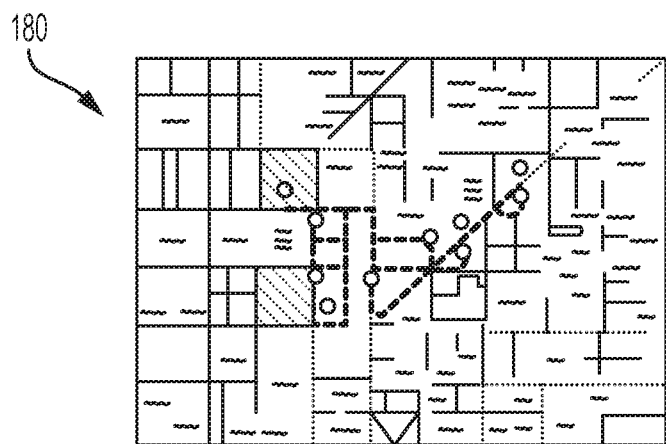
FIGS. 5-7 are map diagrams respectively showing, by way of examples, an officer activity interface presenting optimal patrol routes within a beat for different times of the day.
Figure 6:
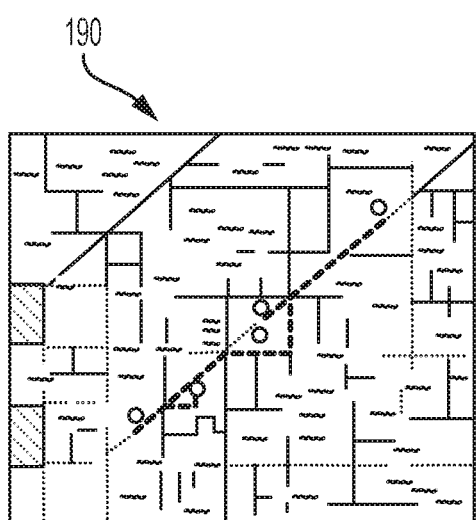
Figure 7:
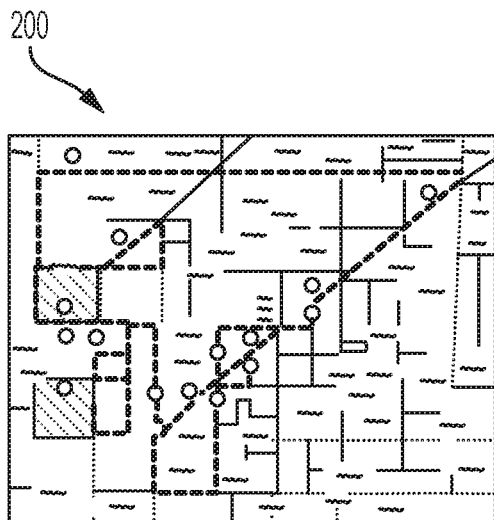

Once a beat is designed, a recommended patrol route within the beat for the parking enforcement officer 14 assigned to that beat can be optimized. FIGS. 5-7 are map diagrams respectively showing, by way of examples, an officer activity interface 180, 190, 200 presenting optimal patrol routes within a beat for different times of the day. The number of potential citations typically changes over each hour of a given day. Consequently, the optimal route for enforcing parking regulations also needs to change throughout the day. Referring first to FIG. 5, at 9:20 a.m., the recommended route covers the entire area of the beat. Referring next to FIG. 6, at 1:15 p.m., the recommended route expands as additional parking meters become operational. Finally, referring to FIG. 7, at 7:22 p.m., when there may be fewer violations or time constraints, the recommended route focuses on just those blocks with the most citations, with the parking enforcement officer 14 being able to opt to enforce the top 5%, 10%, 25%, or any other fraction of the beat.

A patrol route within a beat can also be optimized based upon anticipated productivity. The computation is performed by the opportunity predictor 75 components of the planner and recommender layer 62 by calculating the anticipated number of parking violations per block, with resources deployed to maximize citation issuance. The correlation between the average time that a vehicle is parked and the maximum time that vehicles are allowed to park in each metered parking space is a key consideration in this approach. In the city of Indianapolis, Ind., for example, 95% of the parked vehicles stay for a period of less than three hours. Consequently, parking enforcement officers 14 returning to previously-visited parking spaces on a block after three hours will, in all likelihood, find a different vehicle parked there. Further, 82% of the vehicles remained parked for less than two hours, and 57% for less than one hour. Such values help to determine the likelihood of finding infractions on a block after the block has been canvassed by an officer. Further, such factors provide insights about when a block should again be included in the options displayed to a parking enforcement officer, along with their priority.

The various patrol route within a beat optimization approaches, including the approaches based upon time to enforce and expected citations, can be combined. The number of potential violations per block may vary significantly, and the parking enforcement officer 14 may need to cover those blocks where the probability of issuing the most tickets is highest first. To accomplish this goal, the time to enforce can be optimized with the blocks where productivity will be greatest being afforded higher priorities. Thus, the parking enforcement officer 14 will be provided the patrol route within a beat that leads to the most citations early, while trying to mitigate the time taken to enforce the beat. Dispatcher to officer communications will next be discussed.

Conditioned, Autonomous Messaging

When an unplanned event arises, a dispatcher 13 needs to assess the event, estimate the number of parking enforcement officers 14 that will be required and assign the officers 14 to the event. Since dispatchers 13 cannot directly see the full context of an officer's current situation on patrol, including unlogged engagements, dispatchers 13 typically need to ask the officer about his availability. In principle, a dispatcher 13 could simply just ask the most appropriate parking enforcement officer 14 about his availability. This approach avoids interrupting the other officers 14, yet the contacted officer 14 may be busy and unable to respond. Furthermore, if the officer 14 takes too long to respond, the dispatcher 13 could move to the next most appropriate officer 14 and so on until an officer 14 is assigned and dispatched. However, in a worst case scenario, valuable time may be wasted searching for an available officer 14, which could be problematic to unacceptable in a situation that requires a short response time. Alternatively, to avoid the delays of sequentially contacting individual parking enforcement officers 14 until an available officer is found, a dispatcher 13 could poll all of the officers en masse about their availability. Communicating with all officers, though, would be result in an overwhelming stream of inquiries and interruptions to officers 14, thereby creating significantly more overhead than is usually needed to support dispatch coordination.

To reduce coordination communications overhead, computer systems partnered with each officer 14 are harnessed to intermediate in the communications. For example, an officer's mobile computing device, such as a tablet computer or smartphone, can regularly update its status by communicating with the parking enforcement support services server 21 and the dispatcher's computer system would get the information from the server 21. Thus, human interruptions are minimized.

Here, each computer system sorts, prioritizes and filters information, so that irrelevant availability requests do not overwhelm officers 14, as well as burden dispatchers 13, supervisors 12, or other personnel. Each officer's computer partner carries out conditioned, autonomous messaging to support coordination with reduced communications overhead. Irrelevant availability requests are filtered by setting the conditions in which actually interrupting an officer is not necessary to determine availability. By way of example, these conditions can include:

If an officer is already working on a service activity request at the same or higher priority as a new service activity request, the officer is considered to be unavailable and the response can be autonomous.
  If an officer is on patrol and driving, the officer is considered to be not engaged in driving to or directly handling an event and is considered to be available.
  If an officer is on a break and the priority of the event is below a preset threshold, the officer is considered to be unavailable and the response can be autonomous.

If an officer is on a break and the priority of the event is above a preset threshold, the officer is considered to be available.

If the officer is writing a citation, the officer is not on a high priority assignment and is considered to be available.

If an officer is reviewing next enforcement activities to perform, the officer is not on an assignment and is considered to be available.

If enough suitable officers have already responded as being available, there is no point in querying other officers.

If an officer is working on a lower priority activity, the officer could be presented with a short query or sound to which the officer could respond with a pre-arranged code word to keep the interruption at a minimum.

Still other conditions are possible. The visualization of citation opportunities will now be discussed.

Visualizing Citation Opportunities on Blocks

Through the computer systems partnered with each officer 14 through a mobile computing device, such as a tablet computer or smartphone, the system 20 provides information displays about citation opportunities to guide parking enforcement officer 14 patrol route movement within a beat. The citation opportunity information displays can also be used to help manage the assignment of beats to officers or to recommend actions to officers 14 in real time.

The information displays constantly present new priorities as a parking enforcement officer 14 moves on his patrol route within his beat. FIGS. 8-10 are diagrams respectively showing, by way of examples, an officer activity interface 210, 220, 230 presenting recommendations for probable parking violations in an officer activity interface along a patrol route within a beat as updated based upon parking enforcement officer 14 movement. The parking enforcement officer's current position is shown as a solid dot. The lines denote block faces, and the various colors, shading or line patterns align with different thresholds representing the likelihood of issuing a citation. For instance, a solid (or dark red) line represents the blocks or block faces where the probability of finding violations is the highest, or "Highly Probable," a dashed (or orange) line represents areas where finding violations is "Probable," a dotted (or yellow) line represents areas where finding violations is "Somewhat Likely," and a dashed-dotted (or dark blue) line represents the areas where finding violations is "Least Likely," such as in those areas that were just canvassed by the parking enforcement officer 14. The methodology for displaying these options is not limited to the colors or line patterns noted and can include any variety of colors or line patterns representing an indefinite number of thresholds.

Here, the parking enforcement officer 14 is walking from north to south. The recommended paths discussed with reference to FIGS. 5-7 supra show where the most number of potential citations can be found. The information display reflects that a high probability of issuing citations exists directly south of the parking enforcement officer's current location. Those blocks most recently visited by the officer 14 are less likely to offer additional violations because any illegally parked vehicles have already been cited. City policy or ordinance may also prohibit the issuance of more than one violation for a particular infraction during a given time window.

Figures 11, 12, 13:
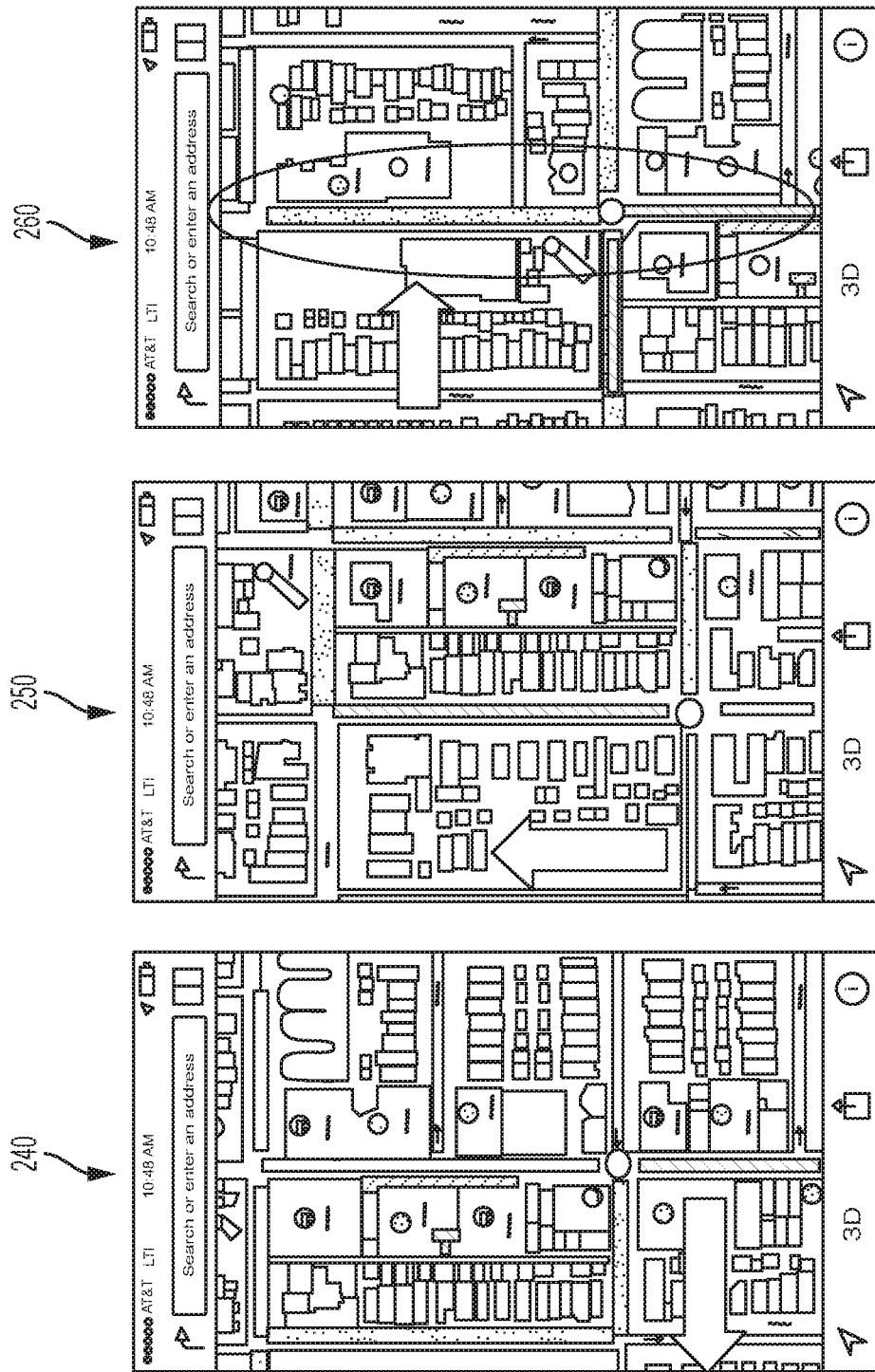
FIGS. 11-13 are diagrams respectively showing, by way of examples, an officer activity interface presenting adaptive recommendations for probable parking violations along a patrol route as updated when a recommendation is not followed.

Notwithstanding the recommended paths, the parking enforcement officer may decide to follow an alternative path than the patrol route within a beat recommended. Instead of proceeding south, the parking enforcement officer 14 turns to the right. FIGS. 11-13 are diagrams respectively showing, by way of examples, an officer activity interface 240, 250, 260 presenting adaptive recommendations for probable parking violations along a patrol route within a beat as updated when a recommendation is not followed. Each time that the officer 14 reaches an intersection, the information display can suggest the direction that the officer ought to follow to issue the most citations so as to optimize performance with respect to time and violations. The information display dynamically adapts to the parking enforcement officer's current location and generates new recommendations for issuing the most citations.

Citation Opportunity Clusters

Figure 14:
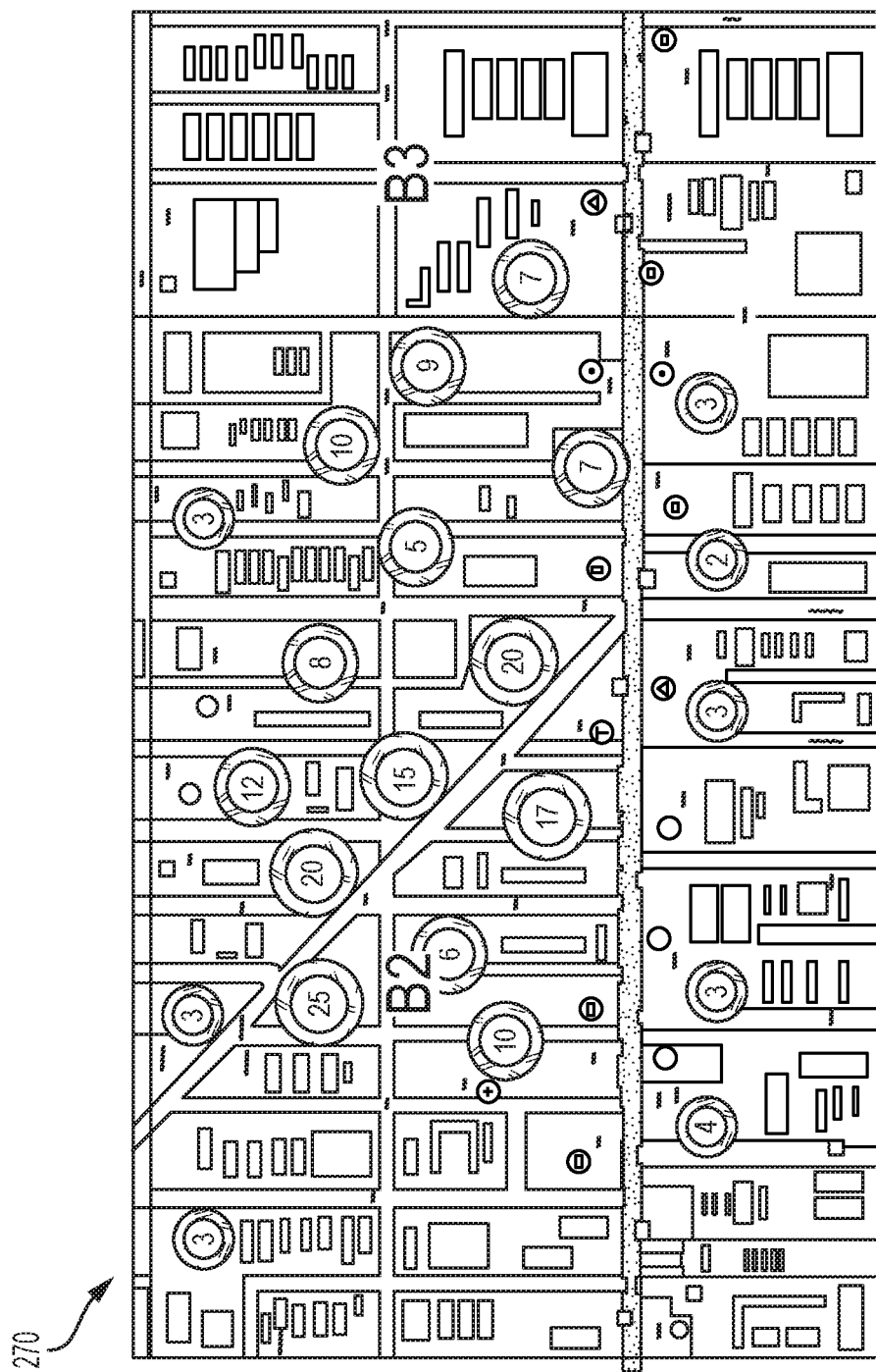
FIG. 14 is a map diagram showing, by way of example, clusters of predicted or issued parking violations or citations.

Patrol route within a beat recommendations can be presented in other formats. FIG. 14 is a map diagram 270 showing, by way of example, clusters of predicted or issued parking violations or citations. Rather than color- or line-coding block faces on a map with probabilities, clusters of predicted or issued violations or citations can be displayed on a map. The clusters are re-computed as the officer zooms in on the map. In this way, the visualization trades off the ability to see an accurate count of citations against the precise location of citations for a given amount of display real estate.

Visualizing Activities

Figure 15:
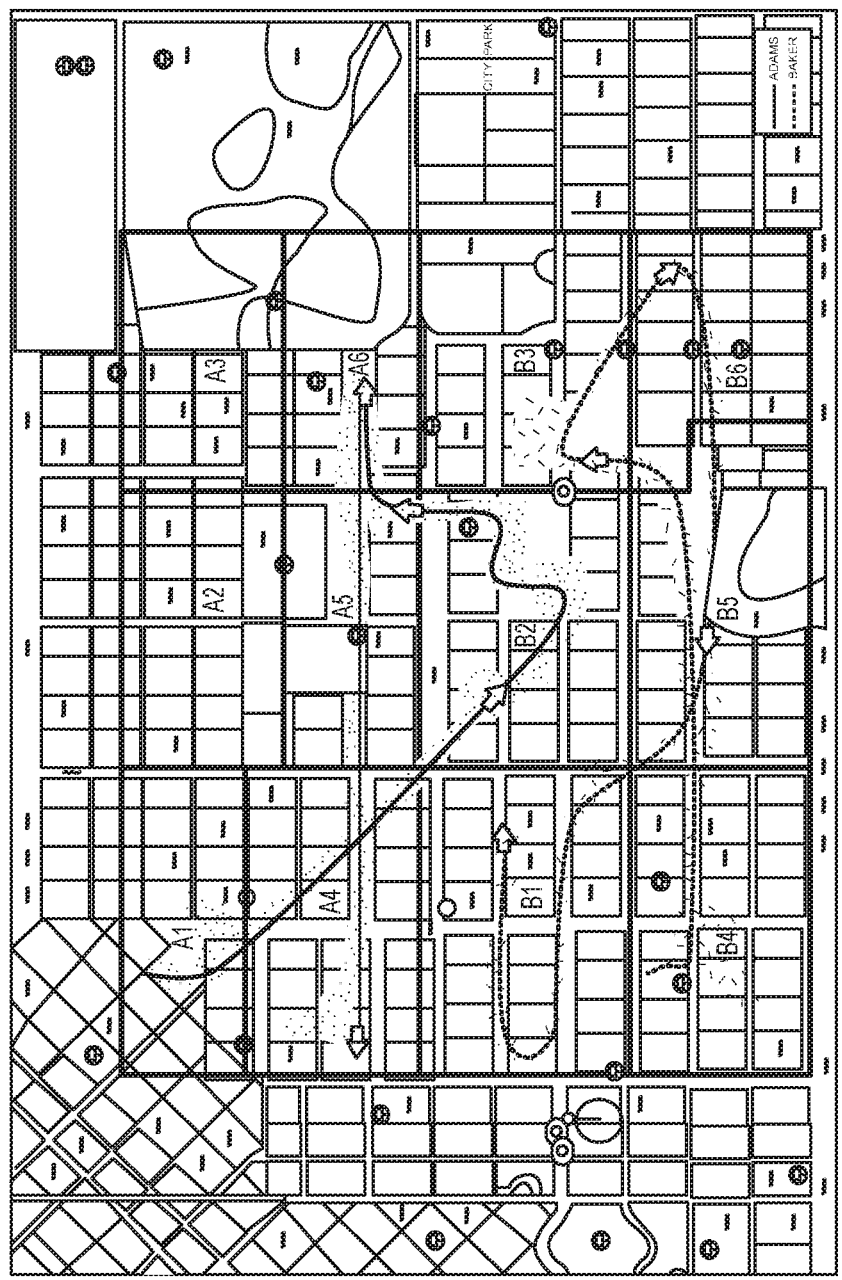
FIG. 15 is a map diagram showing, by way of example, an activity map for a pair of parking enforcement officers while working on their respective patrol routes.

In addition to patrol route within a beat recommendations, an activity map of the path of travel taken by an officer through his beat can be generated. FIG. 15 is a map diagram 280 showing, by way of example, an activity map for a pair of parking enforcement officers while working on their respective patrol routes within a beat. The activity map summarizes the movement of each officer in time, space, and activity. Line-coded (or color-coded) paths for two parking enforcement officers on Beat 3, Adams and Baker, are depicted for the period from 8 a.m. to 10 a.m. A directional marker, such as a color-coded arrowhead, leaf head, pointer, or needle, is first selected. The main travel path covered by each officer is then shown as a solid line that is made up of connected segments with an arrowhead placed somewhere on the segment. In one embodiment, the arrowheads are placed on the end of each segment at regular times intervals; alternatively, the arrowheads can be placed in the middle of each segment (or somewhere on each segment), such that the passage of time is indicated by estimating that the officer 14 was traveling in a straight line at a constant velocity in-between each pair of time-space locations, as signified by the arrowheads.

Here, the arrowheads are placed at a location on the activity map that signifies the officers' whereabouts at constant half-hour time intervals, although other time intervals could be used. The arrowheads on each travel path demark both the officers' main directions of travel and boundaries of sequential half-hour time intervals. Thus, in this example, an arrowhead for each officer is depicted at thirty-minute intervals. For officer Adams, the circle at Wyman Elementary School marks 8:00 a.m.; the first arrowhead shows where he is at 8:30 a.m.; the second arrowhead shows where he is at 9:00 a.m.; and so on. In a further embodiment, when several travel paths are displayed on the same activity map, the travel path corresponding to each officer can be depicted with a modality that is unique to that officer, such as by color, texture, line width, and so forth.

In some situations, the travel paths depicted on the activity map can become cluttered, such as when the officer is moving so slowly through his beat that the arrowheads that terminate each connected segment appear close together or start to collide. In a further embodiment, the travel paths can be decluttered by replacing select directional markers that appear along the officer's travel path with simple time markers, such as a hash mark or dot. The simple travel markers would generally appear in place of directional markers where the connected segments are short and the officer's direction of travel has not changed, that is, he has proceeded along a straight line. The end of the straight line travel path would still be terminated with a directional marker, but simple time markers would replace the preceding directional markers. In a still further embodiment, detecting a slow-moving officer may be of concern and those places on the officer's beat where his movement is slow may need to be emphasized, rather than de-emphasized. An indicator that highlights the slow-moving officer, for instance, densely-spaced tick or hash marks, densely-packed dots, an icon, color, width, or other edge features to call attention to the slow segment can be used. Still other forms of decluttering are possible.

Locations of special activities are shown as icons (or with other types of indicators or features, like color, width, line type, and so forth) along the path. In this example, color-coded (or pattern-coded) circles are used to indicate service assignments. The main route taken by an officer 14 along his beat can be implied based on the central position of each segment and side trips or excursions from the main route can be shown as "clouds" or density maps, that is, "comet trails," which convey a rough sense of where the officer traveled and where an ALPR recorded vehicle information. Alternatively, the locations of marked (parked and recorded) vehicles could be shown as icons or dots, depending upon map scale. In variations on the activity visualization, specific times can be obtained either by small labels on the maps, or by pop-up labels when a viewer hovers a pointer over the map. In addition, selectable layers on the maps can indicate traffic, beat boundaries, enforcement types, expected parking violations, past performance, historical citation data, service requests, other officers and their activities, and other kinds of information relevant to enforcement.

Visualizing Activity Types

Figures 16, 17:
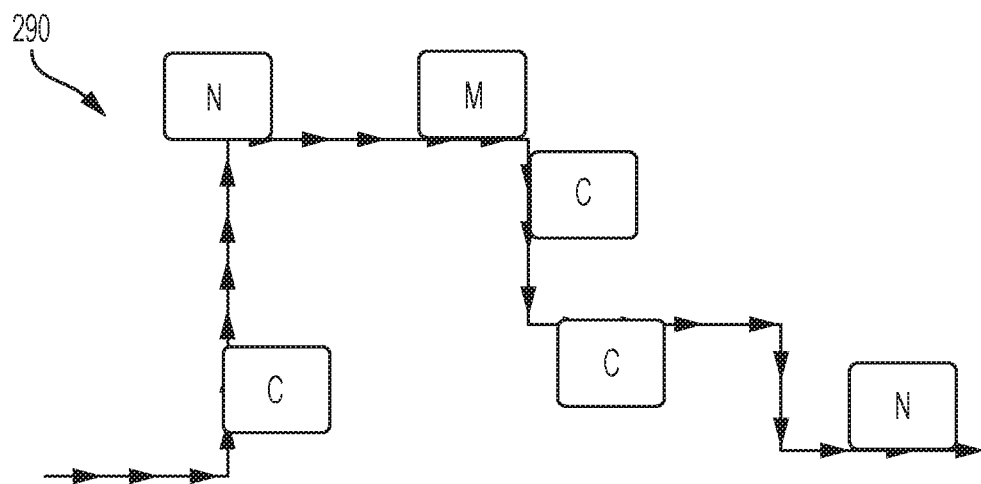
FIG. 16 is map diagram showing, by way of example, an activity type map for streets recently visited by a parking enforcement officer.
FIG. 17 is diagram showing, by way of example, a mapping of city block area name to city block area character for Beat 3 in Ocean City.

If a supervisor 12, dispatcher 28, or parking enforcement officer team member wants a visual summary of an officer's recent activity, the system can display an activity map. FIG. 16 is map diagram showing, by way of example, an activity type map 290 for streets recently visited by a parking enforcement officer 14. Recent logged activities are depicted in a map format and can be overlaid on a street map to see the names of the streets that the officer 14 has traveled. The round-cornered boxes indicate specific logged activities. A box with a 'C' or similar label represents a citation. A box with an 'M' or similar label represents a marked vehicle. A box with an 'N' or similar label represents a note that the officer sent in from his mobile computer. Other types of boxes or shapes, symbols, and labels are possible.

Scenarios

A set of four scenarios will now be discussed to describe the use of the system and method to optimize operational processes of a fictitious parking enforcement organization in Ocean City. These scenarios illustrate how organizational performance can be improved when parking enforcement officers are organized into teams, rather than working individually on their own beats. The scenarios provide examples of how the system and method can support teamwork by better facilitating visual representation and integration of context and coordination. The user interfaces described are intended to provide contextual awareness for members of an enforcement team and efficient negotiation of work between parking enforcement officer team members, supervisors, dispatchers, and system modules. The scenarios include:

Scenario 1 presents a high-level introduction and overview that describes the activities of management and a three-person team assigned to Beat 3, a super-beat, in Ocean City. This scenario is simplified to exclude unplanned events. The system and method described herein enables the team to achieve greater performance and agility than conventionally possible. This scenario also introduces a map-based activity visualization, as through the dynamic route predictor 74 and opportunity predictor 75 components of the planner and recommender layer 62 (shown in FIG. 4).

Scenario 2 presents an officer's-eye view and shows the activities and intermediated communications for Officer Adams as he works on Beat 3 during his duty shift. Adams' information needs are supported through a user interface on his mobile computing device. This scenario also shows how Adams experiences the computer-intermediated communications intended to optimize team performance as provided through the message director 71, observer 72, and conditional autonomous messaging 73 components of the computer partner and communications layer 63 (shown in FIG. 4).

Scenario 3 presents a supervisor's-eye view and shows the activities of Supervisor Song in the middle of a duty shift. Supervisors 12 typically assign officers to beats at the beginning of a duty shift, provide motivational inputs when needed, and also review officer performance after a duty shift. This scenario presents a real time interface for supervisors overseeing squad performance over parts of a duty shift as provided through the resource allocator 76, response plan generator 77, coverage planner 78, and motivation recommender 79 components of the planner and recommender layer 62 (shown in FIG. 4).

Scenario 4 presents a dispatcher's-eye view and shows the activities of Dispatcher Dance as she assesses ongoing events and takes supervisory actions during the duty shift. Typically, a dispatcher 13 is concerned with responding to unplanned real time events when parking enforcement officers need to be pulled from their ongoing patrol duties. A dispatcher 13 may oversee several squads. Traditionally, dispatchers 13 focus almost exclusively on public safety concerns and not on other aspects of organizational performance, which can sometimes be an issue with the needs of other personnel in the organization, particularly supervisors 12, who have responsibility for their squad and its overall performance. The dynamic planning and recommender parts of the system assist her directly that is provided through the resource allocator 76, response plan generator 77, and coverage planner 78 components of the planner and recommender layer 62 (shown in FIG. 4). The c-partners operating on the officers' mobile computing devices through the message director 71, observer 72, and conditional autonomous messaging 73 components of the computer partner and communications layer 63 (also shown in FIG. 4) intermediate communications to optimize performance while keeping the interruptions and overhead of coordination low for the team. This scenario also illustrates further system-initiated interactions with the dispatcher 28 and parking enforcement officers 14 and teams during the shift.

Background to Scenarios

Ocean City has 50 parking enforcement officers organized into six squads who work on 30 beats. Three dispatchers oversee the beats. The Department of Transportation in Ocean City created the "super" Beat 3 by combining two pre-existing single-officer beats named beat A and beat B. In the following scenarios, Dispatcher Dance oversees the real time activities of two squads and also the activities of three officers in Squad 1 who work as a team covering Beat 3. FIG. 17 is diagram showing, by way of example, a mapping 300 of city block area name to city block area character for Beat 3 in Ocean City. Beat 3 is divided into twelve areas or neighborhoods, labeled A1 through B6. The mapping 300 shows names of the areas of the beat for easy reference. The areas have different characteristics. For example, areas A1 and B4 are residential and have schools. Areas B2 and B3 are business and shopping districts. Area A6 has hotels, stores, and restaurants that attract tourism.

In the course of a day, officers carry out different parking enforcement and public safety tasks. These tasks can be of a high or low priority. For simplicity in the scenarios, each task requires either an hour or a half hour. FIG. 18 is diagram showing, by way of example, visual encodings 310 for the parking enforcement tasks. A black encoding represents high priority and a grey (or cross-hatched) encoding represents medium priority. A solid pattern represents a task requiring a full hour and a checkered pattern represents a task requiring a half-hour.

Scenario 1—Parking Enforcement on a Shift

The officer interface 47 (shown in FIG. 3) acts as a real-time partner that interacts with an officer 14 throughout a duty shift. Practically speaking, supervisors 12 cannot monitor all of their officers 14 in detail through every minute of a duty shift. The officer interface 47 helps reduce the workload of supervisors 12 by helping officers 14 make optimal choices throughout a duty shift. In comparison to a supervisor's interface, the officer interface 47 is intended to provide finer-grained recommendations and alerts to officers 14 than a supervisor 12 reasonably could. In addition, since officers 14 have an immediate awareness of street conditions and other factors not visible to supervisors 12, the officer interface 47 can offer a level of detail that is useful, but not overwhelming. For instance, an activity plan can be visually displayed to an officer 14 through the officer interface 47. When provided at an abstract level, the activity plan can refer to entire regions within the officer's beat that the system 20 recommends. Conversely, when provided at a detailed level, the activity plan can indicate exactly where the officer 14 ought to go on a city block.

This scenario provides a high level overview of the activities of a supervisor and a three-officer team assigned to Beat 3, a super-beat, in Ocean City. This overview has no unplanned events or surprises; later scenarios cover the same duty shift, but add unplanned events and situation assessment, plus example designs of user interfaces and intermediated communications.

| Date/Time | Activity |
|---|---|
| Tuesday, 8:00 a.m. | At 8:00 a.m. in the morning, all of the parking enforcement officers in Squad 1 meet at the Department of Transportation building to pick up gear and to discuss the assignments and issues with Supervisor Song, who has already entered the priorities and tasks for the officers into the system. Officers Adams and Baker log into the system and see that they are assigned as a team to cover Beat 3 for the entire duty shift. Officer Cooper is currently scheduled to help cover Beat 3 during the mid-day traffic peak from 10 a.m. to 3 p.m. At 8:00 a.m., the highest priority for Beat 3 is traffic control for picking up and dropping off students at schools in areas A1 and B4. A secondary priority is covering congestion-causing double parking and various unsafe parking as people run errands and pick up coffee on the way to work. Adams and Baker are both assigned vehicles equipped with ALPR that enable them to read and record license plates and residential permit tags while driving by. |
| 8:00 a.m.-8:30 a.m. | Adams covers elementary school drop off in A1. Baker covers the middle school drop off in B4. |
| 8:30 a.m.-9:00 a.m. | The officers split the patrol of early morning crunch in the business districts B2 and B3. |
| 9:00 a.m.-10:00 a.m. | On-street parking in the business districts is limited. In residential areas, non-residents are allowed to park for no more than two hours a day. There have been growing complaints in the residential areas surrounding the business areas that non-residents park for too many hours. Non-residential vehicles can be identified by the lack of a residential permit. There is also a request to check out a possibly abandoned vehicle in B6 in the industrial area. Adams and Baker know that non-residential vehicles can be identified by the lack of a residential permit. |

FIGS. 19-22 are pairs of diagrams 320, 330, 340, 350 showing, by way of examples, prioritized parking enforcement tasks for the time periods of Scenario 1. Referring to FIG. 19, in the 9 a.m. hour, the high priority one-hour residential marking task in A4 through A6, the medium priority half-hour marking task in the B1-B5 corridor, and the high priority short abandoned vehicle task in the industrial area in B6 are shown. The overview shows the two officers splitting up the work. The coordination in the 8 a.m. hour enables higher performance than traditional assignments on smaller beats would permit because most of the priorities in this first hour are in the B section of Beat 3, that is, the former "Beat B." If traditional beats were used, only one officer on Beat B would have been deployed during this hour. With teaming, the system, through the coverage planner 78 components of the planner and recommender layer 62 (shown in FIG. 4) dynamically puts parking enforcement officers 14 where they are needed.

| Date/Time | Agent | Activity |
|---|---|---|
| 10:00 a.m. | | Cooper joins the team to help cover tasks during the busy middle of the day time period.<br>Ocean City has parking meters and parking occupancy sensors in the downtown area, but not in its residential areas. To more accurately monitor parking in areas without the sensors, Ocean City's policy is to sweep those areas every half hour when possible. |
| 10:00 am-11:00 a.m. | Adams Baker Cooper | One high priority one-hour long task is patrolling the business districts B2 and B3. Baker has this assignment.<br>A medium priority one-hour long task is patrolling the residential parking in B4 to B6 to mark vehicles that arrived in the last hour. Adams has this assignment.<br>Another medium priority half-hour task is patrolling the B1-B5 corridor for vehicles that arrived in the last hour. Cooper has this assignment. |
| 11:00 a.m.-12:00 p.m. | Adams Baker Cooper | The 11:00 a.m. to 12:00 p.m. hour is similar to the previous hour, with the difference that some non-residential vehicles parked in the A4 to A6 area that was marked earlier may now be exceeding the two-hour limit. Patrolling this area now has a high priority.<br>The officers continue their assignments from the previous hour. |

Referring next to FIG. 20, the patterns of the activities from 10 a.m. to noon are shown. Here, Cooper joins the team at 10:00 a.m. and patrols the B1 to B5 corridor from 10:30 a.m. to 11:00 a.m. From 11:00 a.m. to noon, he patrols residential area A1 and returns to cover the B1 to B5 corridor. Earlier, at 10:00 a.m., Adams patrols and marks a large combined residential and tourism area. At 11:00 a.m., he patrols and picks up over-time vehicles in the residential and tourism areas. Also, starting at 10:00 a.m., Baker patrols business areas for two hours. Overall, the pattern during the 10 a.m.-12 p.m. hours follows the policy of revisiting most of the residential parking areas near the business districts at least once an hour during the period when violations are most likely. This pattern includes patrol for the business district for congestion problems and gives a little late morning coverage to the school area in A1.

Staggered Breaks and Planned Events

| Date/Time | Agent | Activity |
|---|---|---|
| 12:00 p.m. | | Priorities during the early afternoon reflect several considerations.<br>First, following labor practices in Ocean City, officers are expected to take breaks during the day. They take a half-hour lunch break and a fifteen-minute break during the afternoon.<br>By policy, officers are expected to stagger their major breaks when operating as a team, so that at least one officer is on duty on a super-beat to respond to any accident or urgent unplanned event.<br>In the business areas, the peak of congestion continues through the noon hour to 1:00 p.m.<br>When possible, at least two visits to each area during the day shift are recommended, if possible. |
| 12:00 p.m.-1:00 p.m. | Adams (on lunch break) Baker Cooper | During this period, Adams takes a lunch break (designated by $A^B$ in FIG. 21).<br>Baker covers the busy business areas.<br>Cooper patrols southern residential parking near the business and industrial area. |
| 1:00 p.m.-2:00 p.m. | Adams Baker (on lunch break) Cooper | During this period, Adams takes over patrolling the business areas.<br>Baker takes over patrolling a distant northern residential area and takes a lunch break.<br>Cooper continues the patrol of a northern residential area adjacent to the business areas to mark vehicles from non-residents who park there when working in the business district. |

Figure 21:
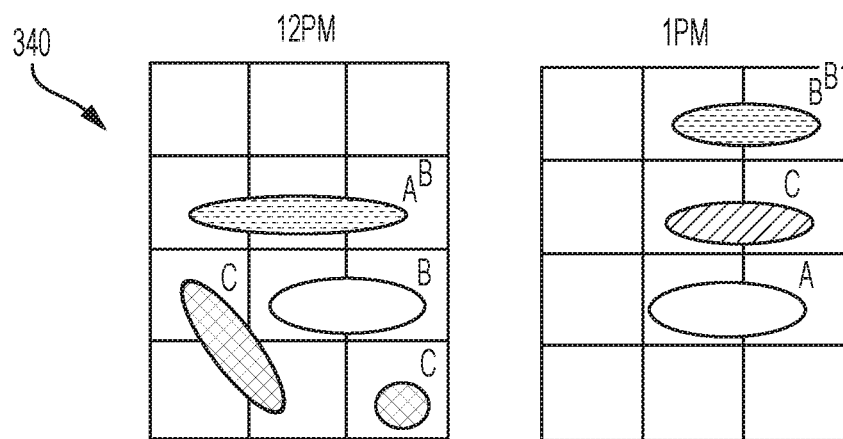
Figure 22:
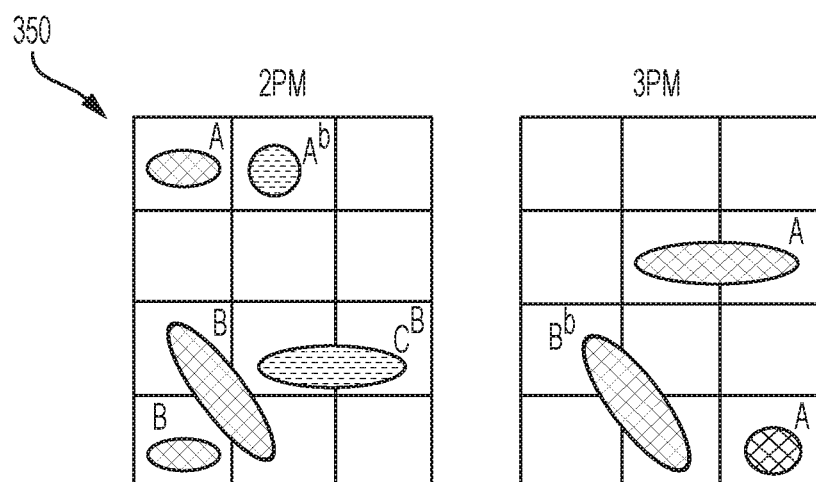

Referring next to FIG. 21, the activities over the early afternoon are shown.

| Date/Time | Agent | Activity |
|---|---|---|
| 2:00 p.m.-3:00 p.m. | Adams (on mini break) Baker | Adams takes a mini break, but covers distant northern residential areas. He covers Wyman Elementary School again |

| Date/Time | Agent | Activity |
|---|---|---|
| | Cooper (on lunch break) | at 2:30 p.m. Baker patrols southern residential areas to mark and pick up non-residential over-time parking. She covers the middle school again. Cooper covers the business district lightly and takes a lunch break. |
| 3:00 p.m.-4:00 p.m. | Adams Baker (on mini break) | Adams does a last patrol of the northern residential areas, tourism area and the industrial area. Baker patrols the southern residential corridor and takes a mini break. Cooper moves to an assignment with another team on another beat. |

Figure 25:
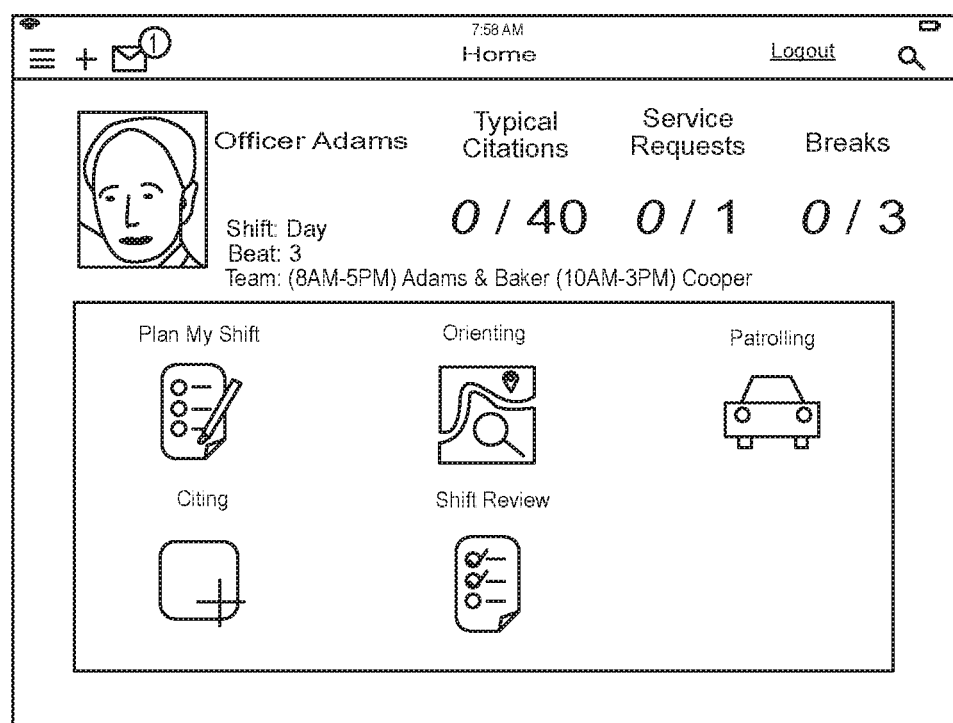
FIG. 25 is a diagram showing, by way of example, the home screen of the real time coordination application of FIG. 24.

Referring next to FIG. 25, the activities over the mid-afternoon are shown.

| Date/Time | Agent | Activity |
|---|---|---|
| 4:00 p.m. | | During the 4 p.m. hour of the shift, the priority is to reduce congestion during rush hour. In Beat 3, the main areas of congestion are the business areas, the light industrial area, and the tourist area. Officers are expected to patrol and focus wherever they are needed in the area. |
| 4:00 p.m.-5:00 p.m. | Able Baker | Adams takes tourism area A6 and business area B3. Baker takes business area B2 and industrial area B6. |

Figure 23:
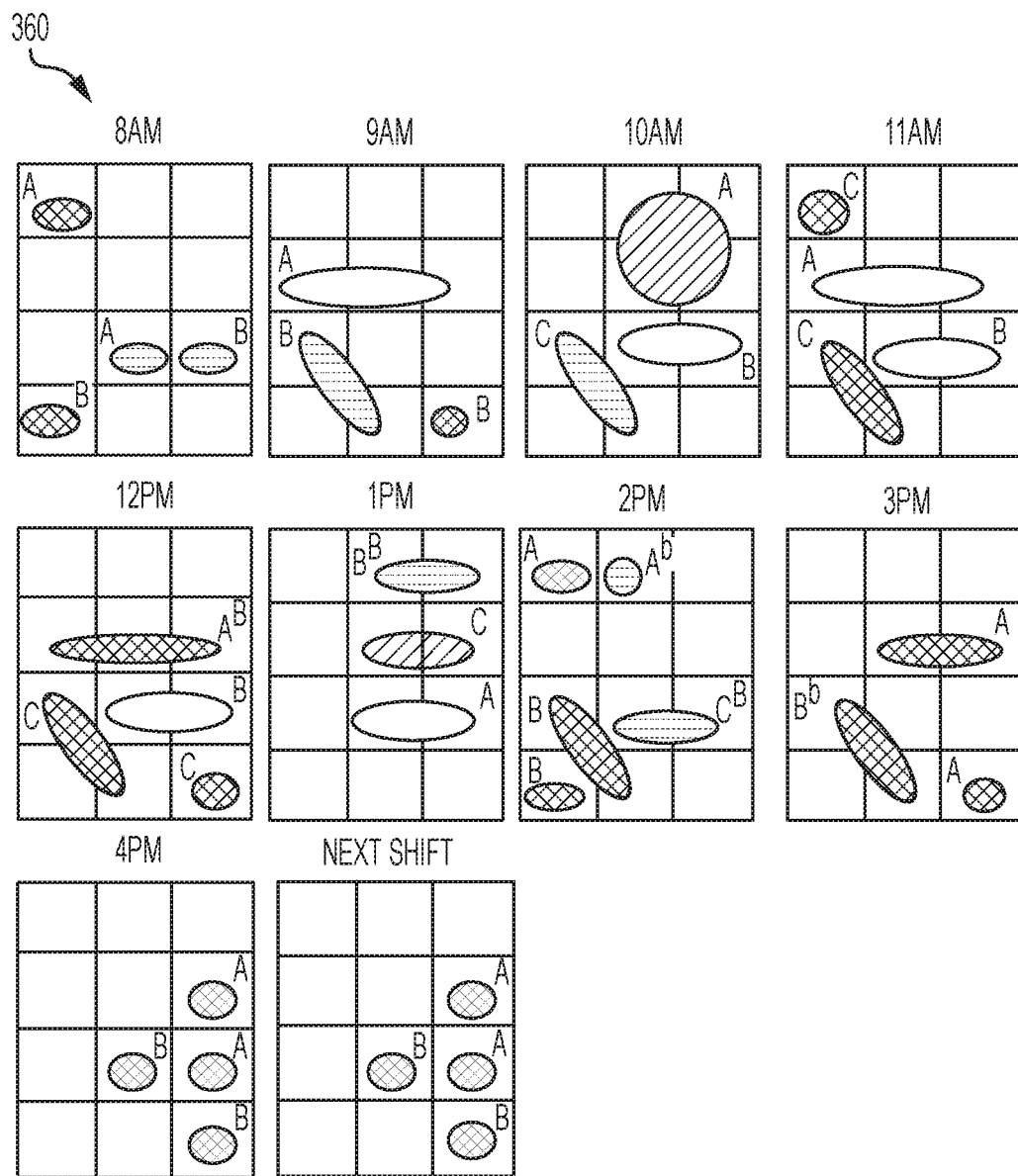
FIG. 23 is a set of diagrams showing, by way of examples, an overview of the enforcement activities for Beat 3.

FIG. 23 is a set of diagrams 360 showing, by way of examples, an overview of the enforcement activities for Beat 3. Superscript, uppercase 'B' indicates a lunch break, and superscript lowercase 'b' indicates a mini (15-minute) break. From this perspective, the following observations are shown:
- Assignments generally follow the expected density of traffic in the business, tourism, and light industrial areas.
- Parking enforcement officer assignments in patrolling residential areas are frequent enough to monitor non-residential over-time parking.
- School traffic monitoring is covered during the appropriate hours. Here, School traffic monitoring is most needed at the beginning of the school day at 8:15 a.m. and also at 2:30 p.m.
- Officers have scheduled breaks and do not overlap lunch breaks.
- Additional staff is scheduled during the peak part of the duty shift.

Scenario 1 focuses on the rhythm of enforcement. In later scenarios, the policies guiding this rhythm are considered and represented and can be used to guide officer allocation levels and assignments. The later scenarios also shows how the assignment advice that follows such guidelines can be computed through the dynamic route predictor 74, opportunity predictor 75 components of the planner and recommender layer 62, and how the interactions with officers for guidance and input can be carried out through the mobile computing device interfaces of the user interaction layer 527 and the computer partner and communications layer 63.

In the next scenarios, the scenarios cover the same duty shift, except that unplanned events are added that require dynamic re-planning.

Scenario 2—Supporting Officers

Scenario 2 retells the story of the shift described in Scenario 1 from the perspective of Office Adams and includes unplanned events that change assignments during the shift. The scenario also presents mockups of user interfaces for the system 20 that are provided by the officer activity interface 69 and the situation assessment interface 70 components of the user interaction layer 61 (shown in FIG. 4) as part of the officer interface 47 (shown in FIG. 3) and interactions with the system that are provided by the message director 71, observer 72, and conditional autonomous messaging 73 components of the computer partner and communications layer 63 (also shown in FIG. 4). Through the officer interface 47, officers 14 receive recommendations and alerts in support of both revenue-producing enforcement activities and public safety-promoting service activities.

The officer interface 47 provides data needed by officers 14 during their duty shifts. Besides computed expectations of citations, the officer interface 47 can provide situational awareness to officers 14 by showing activities of other officers 14 that can impact their planning or upcoming activities. The officer interface 47 can also remind officers 14 to take breaks as needed and meet coverage requirements. Behind the scenes, computations are performed to plan optimal patrol routes within a beat and opportunities for issuing citations respectively by the dynamic route predictor 74 and opportunity predictor 75 components of the planner and recommender layer 62 (also shown in FIG. 4).

Figure 24:
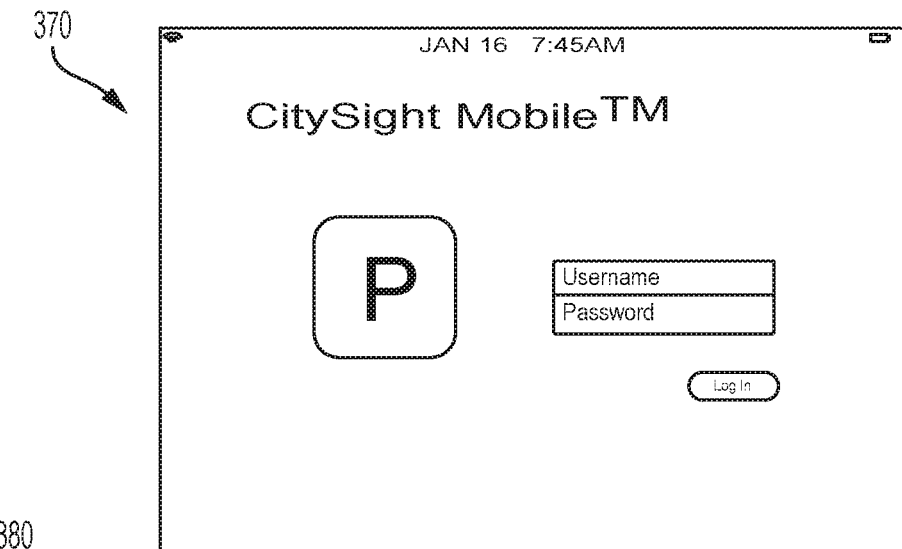
FIG. 24 is a diagram showing, by way of example, a logon screen of the real time coordination application, which would be used by an officer at the start of each duty shift.

While on patrol, each parking enforcement officer 14 is equipped with a mobile computing device, such as a tablet computer or smartphone, upon which a real time coordination application executes. Alternatively, the real time coordination application could be provided on the mobile computing device as a Web-based program that runs in a Web browser or similar application. FIG. 24 is a diagram showing, by way of example, a logon screen 370 of the real time coordination application, which would be used by an officer at the start of each duty shift. To logon, the parking enforcement officer 14 enters a username and password, although other forms of identification, authorization and authentication are possible.

| Date/Time | Agent | Activity |
|---|---|---|
| Tuesday, 7:45 a.m. | Adams | At 7:45 a.m., Officer Adams, Badge #79, heads to the Department of Transportation building to pick up his gear and get any assignments and updates from Supervisor Song. |

-continued

| Date/Time | Agent | Activity |
|---|---|---|
| | Adams | Adams collects his mobile computing device, vehicle keys and so on. He goes to the briefing room. After exchanging greetings with other officers waiting for the meeting to start, he activates his mobile computing device, a tablet computer.
He logs in and goes to the home screen to get a quick overview of his shift assignment and find his teammates.
The home screen shows that his scheduled teammates are Officers Baker and Cooper. Cooper is scheduled to be on the beat from 10 a.m. to 3 p.m.
Adams is assigned to Beat 3. |
| 7:50 a.m. | Adams | Adams looks around the room and waves to Baker. Cooper is not in the room yet. |
| 7:55 a.m. | Adams | The home screen shows that he has a message. |
| 7:56 a.m. | Adams | Clicking on the message icon, he finds a greeting from Baker. |

FIG. 25 is a diagram showing, by way of example, the home screen 380 of the real time coordination application of FIG. 24. Adams has already logged in. The '1' in the circle by the message icon indicates that he has a new message. Key performance indicators in the top row of the home screen 380 reflect Adams' status at the beginning of the shift. In this scenario, a typical officer makes 40 citations on this beat during this shift and does one service request. The number of expected breaks, one lunch break and two short breaks, along with the number of breaks already taken, are also shown. Other types of performance indicators and informational notices are possible.

Figure 26:
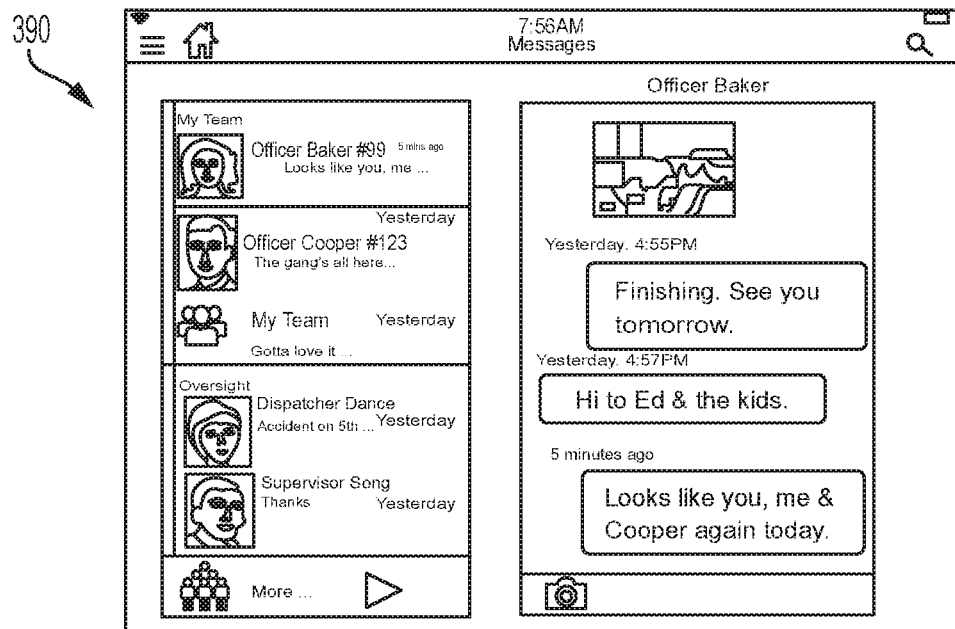
FIG. 26 is a diagram showing, by way of example, a messaging interface screen of the real time coordination application of FIG. 24.

FIG. 26 is a diagram showing, by way of example, a messaging interface screen 390 of the real time coordination application of FIG. 24. The messaging interface screen 390 provides chat streams with the other parking enforcement officers on Officer Adams' team and people on other beats and also to provide oversight management. Other forms of messaging and parties with whom messaging can occur are possible.

Shift Planning for Three Officers on a Beat

| Date/Time | Activity |
|---|---|
| 8:01 a.m. | At the meeting, Supervisor Song has some requests for the squad. There were complaints about inadequate traffic control at school drop off. He asks officers with these assignments to take status notes with pictures, so that the department can document and address any issues at the schools. |
| 8:02 a.m. | After the briefing meeting, Adams heads out to his vehicle, which is a standard traffic enforcement car equipped with ALPR. Adams navigates to the home screen of the real time coordination application and clicks on the "Plan My Shift" interface to see an Activity Map of his plan for the day. He also sees the estimated plans for the other members of his team. |

Figure 27:
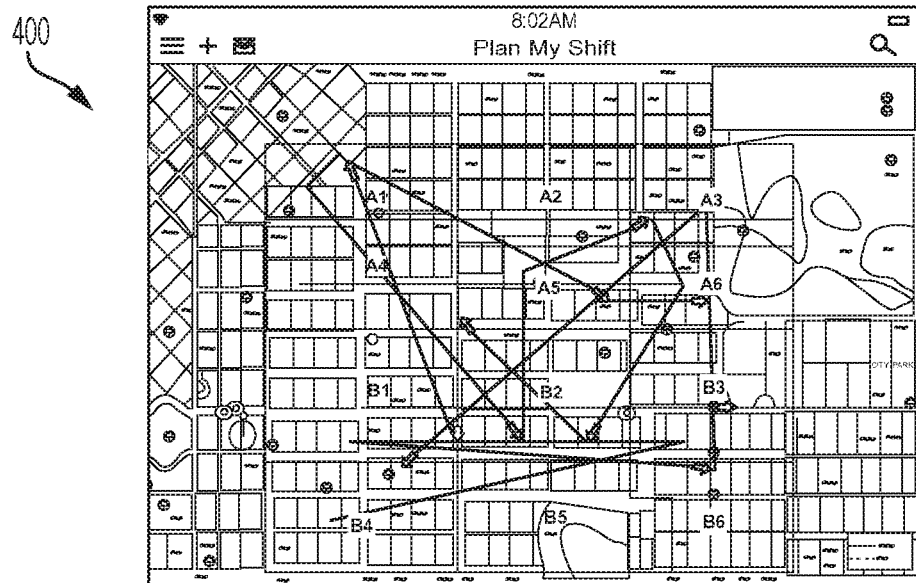
FIG. 27 is a diagram showing, by way of example, an activity map interface screen of the real time coordination application of FIG. 24.

FIG. 27 is a diagram showing, by way of example, an activity map interface screen 400 of the real time coordination application of FIG. 24. The activity map interface screen 400 is part of the "Plan My Shift" interface that shows the course of activities for the three officers during their shift on Beat 3. The coordination in the 8 a.m. hour enables higher performance than traditional assignments on smaller beats because most of the priorities during some of the hours are in the B section of Beat 3, that is, the former "Beat B." If the parking enforcement organization had used its traditional approach on the old beats, only one officer would have been deployed on the former Beat B during this hour.

The activity map interface screen 400 has time labels on the arrows, which makes seeing where all three officers are expected to be located at a particular time easier. Using the activity map, Adams can explore the initial plans for the day for himself and for other members of his team. By zooming in and out of the activity map, he can get more detailed information about different parts of the area. He can also overlay information on the routes of the other officers on his team, as well as contextual information, such as traffic patterns or citation hotspots.

Figure 28:
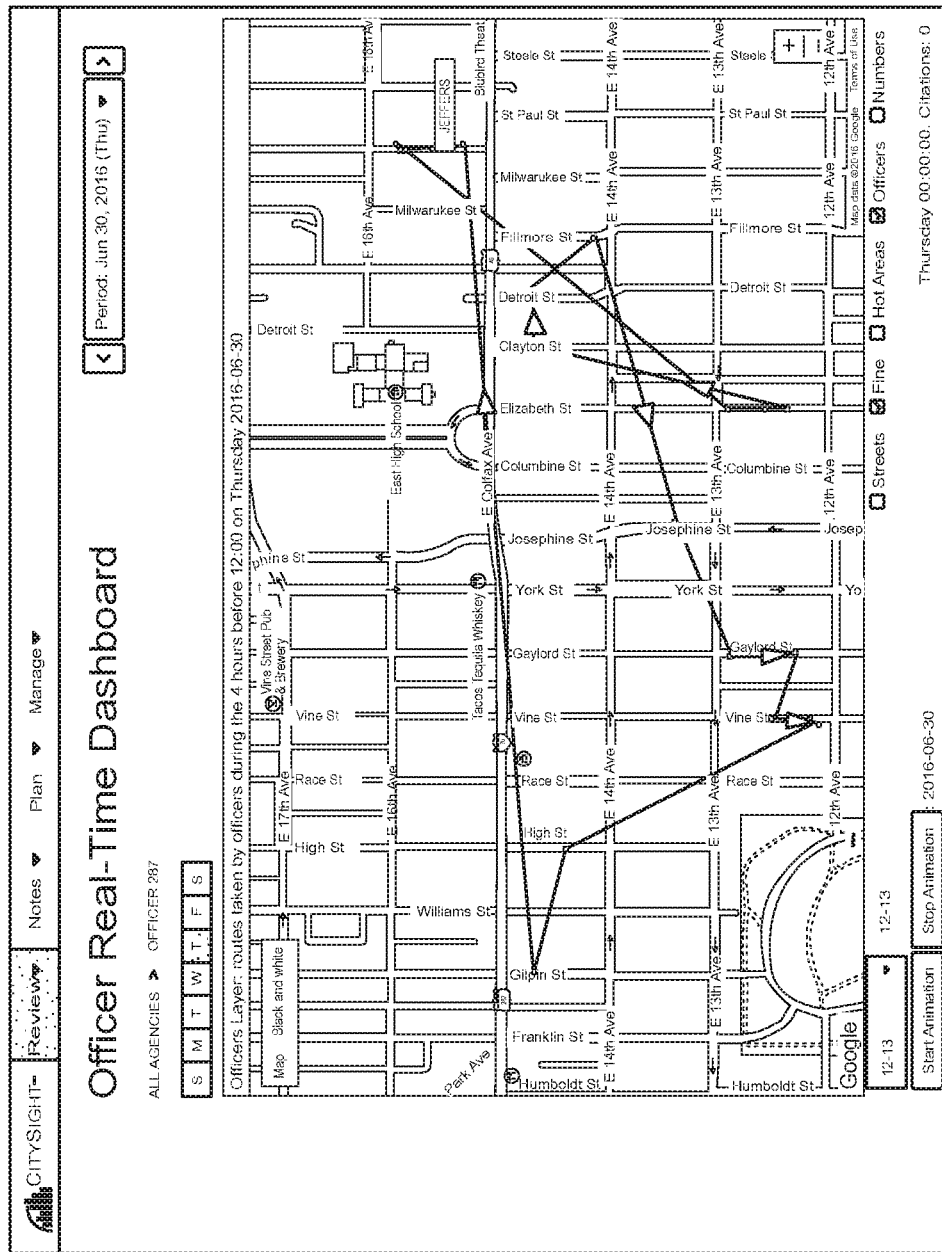
FIG. 28 is a diagram showing, by way of example, an alternate activity map interface screen of the real time coordination application of FIG. 24.

FIG. 28 is a diagram showing, by way of example, an alternate activity map interface screen 400 of the real time coordination application of FIG. 24. The activity map interface screen 400 provides an officer real-time dashboard with velocity and arrows that indicate the routes taken by the officer 14 during an adjustable time period. The day of the week can be selected to allow review of the officer's activities.

In addition, levels of detail, such as streets, fine, hot areas, officers, and numbers and locations of parking citations, can be selectively included in the activity map interface screen 400 by designating user-selectable indicators, such as icons, that are added to the activity map. Here, squares mark the actual positions of the parking citations that the officer 14 has found. The travel path depicted in the activity map is constructed, so that the travel path goes through the positions of the parking citations in chronological order. (Other orderings of the parking citations are possible, such as by numbers of parking citations, although such an ordering would not correspond to the officer's travel path over time.) By clicking on a square, the user can learn more about that individual citation. In a further embodiment, the squares can be omitted, so that only the travel path of connected segments and arrowheads is shown, or the travel path can be omitted, so that only the positions of the parking citations are shown. In a still further embodiment, the parking citations are displayed on the activity map together with a slider control (or similar map zooming control) for selecting a time of day. As the user moves the slider control, the size (or other property) of those parking citation indicators that are nearest to the selected time of day are highlighted, increased, or emphasized, while dimming or decreasing the size or saliency of the other indicators.

Figure 29:
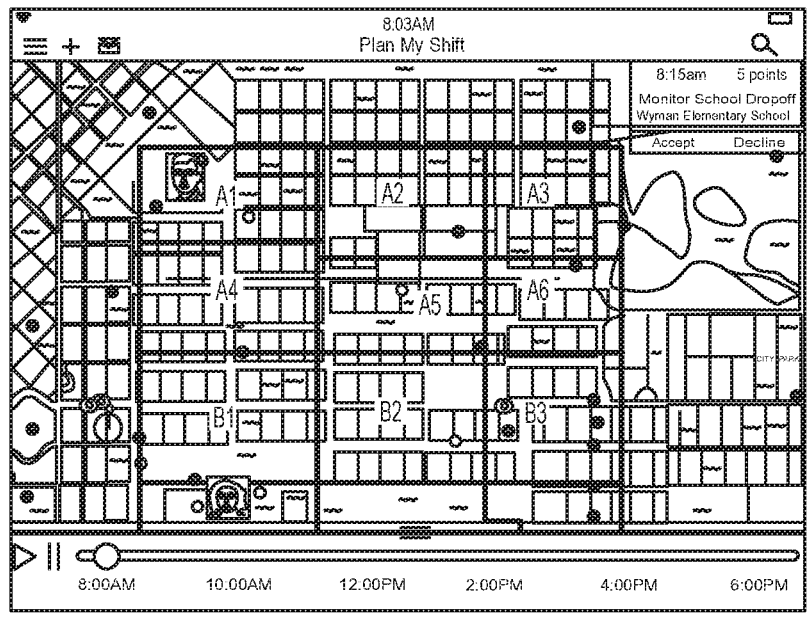
FIG. 29 is a diagram showing, by way of example, an alternative activity map interface screen of the real time coordination application of FIG. 24.

FIG. 29 is a diagram showing, by way of example, an alternative activity map interface screen 420 of the real time coordination application of FIG. 24. The alternative activity map shows where and when activities take place and uses animation. Thus, when a viewer pushes the play button, the officer icons move in a time-synchronized fashion over the officers' patrol routes within their beats. In a further embodiment (not shown), the officers' movements are animated with a "comet trail" following each officer's icon in a format similar to the activity map interface screen 420.

One benefit of having a static visualization versus an animated space-and-time visualization is that the parking enforcement officers can get a sense of coverage without having to remember each other's street-by-street movements throughout the day. Activities are dynamically updated by the system to reflect tasks assigned by supervisors and dispatchers. Usually, a coarse view of the shift is provided initially. When on patrol, the officers can request detailed turn-by-turn directions, although many officers may not need or want that level of advice.

Shift Planning for Three Officers on a Beat

Event Capture—Documenting a Service Assignment

| Date/Time | Activity |
|---|---|
| 8:05 a.m. | Adams drives to his first service assignment, which is traffic control for student drop off at Wyman Elementary School. |
| 8:10 a.m. | He carries out traffic control at the school. |
| 8:20 a.m. | Remembering Supervisor Song's request, Adams documents the traffic situation at Wyman. He takes a picture of some potential bus crowding and notes that the volunteer parents at the school for traffic control seem well organized. He captures the picture in a tagged note in the system. |

Figure 30:
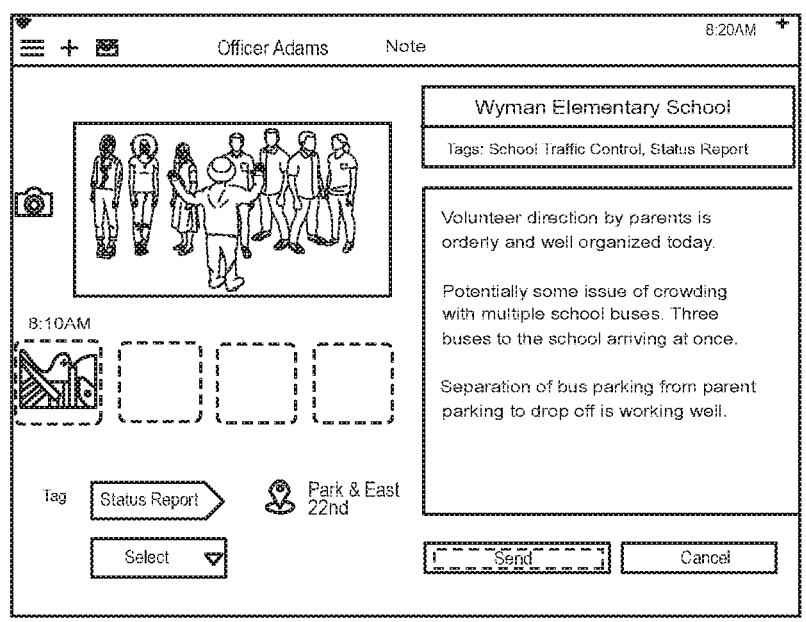
FIG. 30 is a diagram showing, by way of example, a notetaking interface screen of the real time coordination application of FIG. 24.

FIG. 30 is a diagram showing, by way of example, a notetaking interface screen 430 of the real time coordination application of FIG. 24. A note taken by Adams, documenting traffic and the situation at Wyman Elementary School, is filed in the system as part of documenting the safety situation in the morning at schools.

Dynamic Replanning—Due to Delay in Completing an Activity

| Date/Time | Activity |
|---|---|
| 8:30 a.m. | Adams returns to his vehicle. From his earlier viewing of the "Plan My Shift" interface, he remembers that after the school drop off, the dynamic route predictor 74 component of the planner and recommender layer 62 had suggested that he patrol the residential neighborhood A1 and the business neighborhood B2. Since he was unexpectedly delayed at the school, there is not much time to do both activities.<br>Adams goes back to the "Plan My Shift" interface, which has been dynamically updated. The system recommends a route to B2 and shows an estimate of the likely number of citations that he might find along the way on Park Avenue West and on 16th Avenue in the business district.<br>Adams interprets the map as meaning that he will likely pick up a citation on the way to B2, and that he is likely to pick up more citations once he starts patrolling the business district. |
| 8:31 a.m. | Adams starts driving on the recommended route to B2. |
| 8:40 a.m. | Driving along Park Avenue, Adams sees a car parked next to a fire hydrant. He issues a citation and continues on to 16$^{th}$ Avenue. |
| 8:45 a.m. | As he arrives on 16$^{th}$ Avenue, Adams uses the Orienting "Plan for this Neighborhood" interface screen of the map interface zoomed to a block view to get a detailed sense of how to best enforce parking regulations in the neighborhood. |

Figure 31:
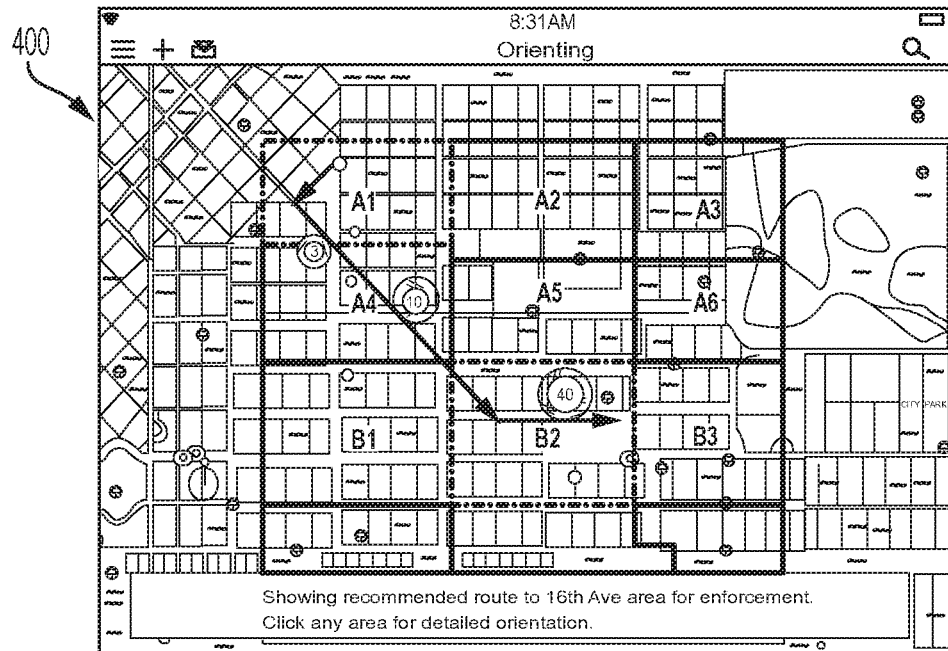
FIG. 31 is a diagram showing, by way of example, an orienting interface screen of the real time coordination application of FIG. 24 showing a recommended route for parking enforcement.

FIG. 31 is a diagram showing, by way of example, an orienting interface screen 440 of the real time coordination application of FIG. 24 showing a recommended route for parking enforcement. The orienting "Plan for this Neighborhood" interface screen 430 displays a preferred route for Adams to leave the school assignment and proceed to the business district B2 for enforcement. The system also roughly predicts the number of citations that Adams may find during this trip. The message box at the bottom of the screen tells Adams that he can click on a neighborhood for a more detailed orientation. In one variation of the activity map design, Adams could just zoom in without switching to an "Orienting" view mode and the system would provide the zoomed-in view labeled with information that the system predicts he will need to carry out his next expected activity of patrolling the neighborhood.

Understanding Context and Enabling Context Alerts

| Date/Time | Activity |
|---|---|
| 8:45 a.m. | Adams decides to sweep through the streets in B2 that the opportunity predictor 75 component of the planner and recommender layer 62 predicted would be most productive. He sees that the expected number of citations is relatively high for this area and time period.<br>He clicks on the proximity alert button to request audio alerts to assist him with looking for parking regulation violations as he drives near where other officers have found violations in the recent past. |
| 9:00 a.m. | A common problem in residential neighborhoods, especially in areas adjacent to a business district, is that non-resident workers park in the residential district. However, if they end up parking for longer than the time allowed for non-residents, they risk getting cited. For example, the regulations for the neighborhood in this scenario limit non-resident parking to two hours. Holders of valid residential parking permits can park all day.<br>Adams moves from B2 and begins patrolling the residential and tourism areas A4 through A6. A5 is one of the areas where there have been problems with non-residents parking in the neighborhood. |
| 9:05 a.m. | Adams uses the opportunity predictor 75 component again, which advises him to turn on the ALPR unit and start in Area A5. The ALPR will electronically record where and when vehicles are parked and also check the validity of their residential permit permits, if applicable. |
| 9.15 a.m. | Adams patrols Area A5. Audio alerts from his mobile computing device tell him to look down alleys and check bus zones as he nears them, as he has sometimes overlooked alleys and bus zones in the past. He has the ALPR activated, so the system is recording the license plate numbers and residential permits of vehicles on the streets as he drives past. Adams spots three parking regulation violations and issues citations. |

Figure 32:
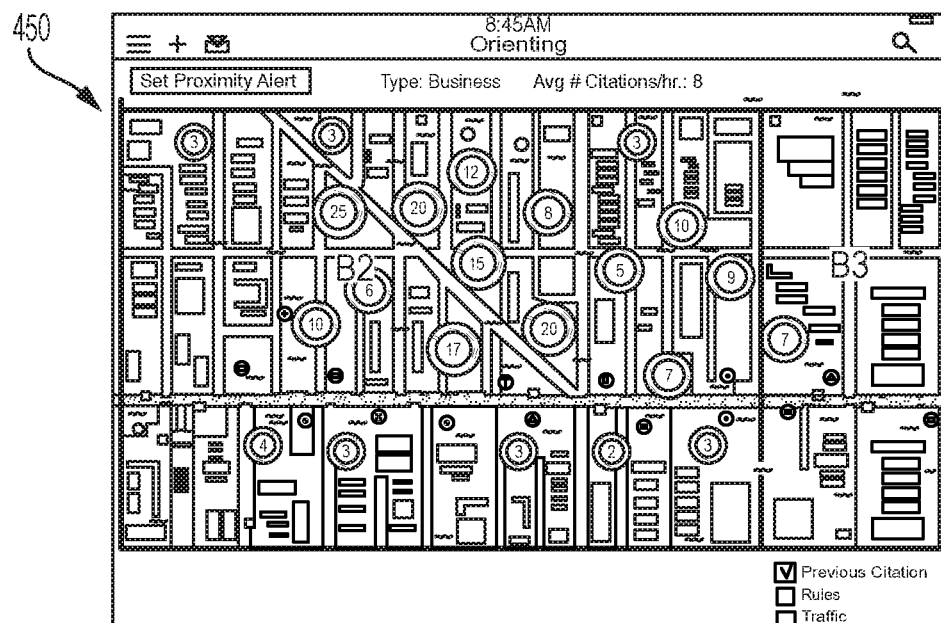
FIG. 32 is a diagram showing, by way of example, an orienting interface screen of the real time coordination application of FIG. 24 focusing on a business area of the beat.

FIG. 32 is a diagram showing, by way of example, an orienting interface screen 450 of the real time coordination application of FIG. 24 focusing on a business area of the beat. The orienting "Plan for this Neighborhood" interface screen 450 focusing on business area B2. This interface guides a parking enforcement officer to where to look for parking regulation violations by showing where previous citations have usually been found, as provided through the opportunity predictor 75 component of the planner and recommender layer 62. Citation counts appear in circles on the screen and refer to the number of citations given during this hour during a recent time period, such as during the past two weeks. Alternatively, the circled citation counts could be normalized to give expectations over the next hour.

Figure 33:
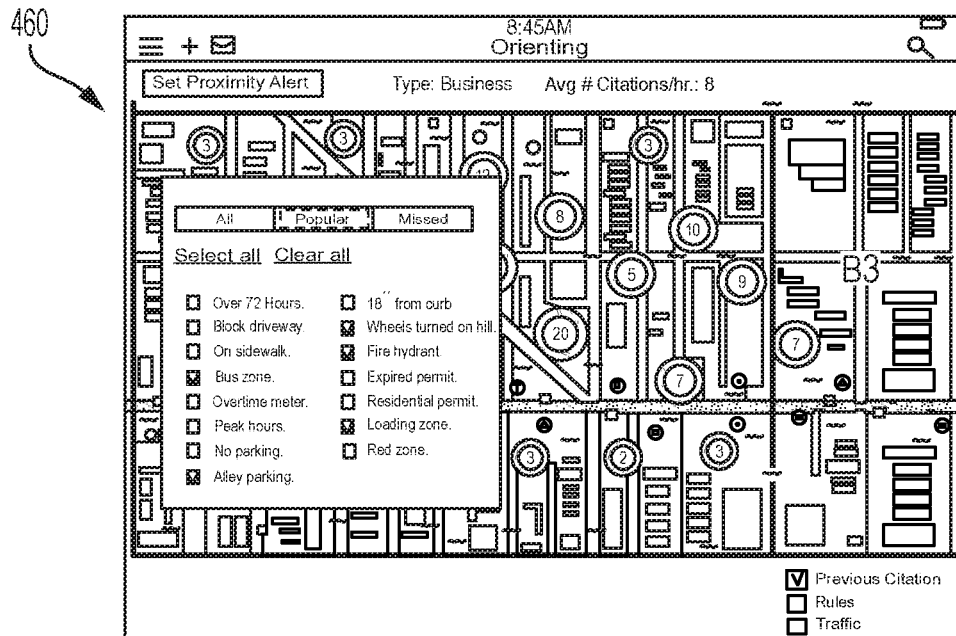
FIG. 33 is a diagram showing, by way of example, an orienting interface screen of the real time coordination application of FIG. 24 showing options for audio global positioning system (GPS) alerts.

FIG. 33 is a diagram showing, by way of example, an orienting interface screen 460 of the real time coordination application of FIG. 24 showing options for audio global positioning system (GPS) alerts. The parking enforcement officer can turn on audio alerts for selected categories of parking regulation violations, so that an audio alert is generated during patrol when the officer approaches vehicles that match the selected categories of violations.

Alerts and Response to Unplanned Event

While Adams is on patrol, a service request for a tag-and-tow operation comes in to the dispatcher. The dispatcher sends the service request to Adams and, when he accepts the service request, Adams' plan for his shift is modified and routing suggestions are offered to him.

| Date/Time | Activity |
|---|---|
| 9:45 a.m. | Using her situation monitoring interface, Dispatcher Dance notices a new incident. The information about the incident comes from a 9-1-1 emergency call from one Nancy Wong |

-continued

| Date/Time | Activity |
|---|---|
| | at 176 Lafayette Street in area A5. The caller says that there is a truck blocking her driveway. Ms. Wong needs to drive to a doctor's appointment and cannot find the truck's driver. |
| 9:46 a.m. | Dance opens the interface to the resource allocator 76 component of the planner and recommender layer 62, which suggests that Adams gets rerouted to respond to this incident, as he is the closest parking enforcement officer to Ms. Wong's location. Dance puts the plan in motion by pressing the "Go" button, which triggers the system to send a request to Adams to respond to the call. |
| 9:47 a.m. | Adams is almost at the end of a patrol sweep in A5. The service request appears on his screen together with an updated recommended route and estimated time of arrival. |
| 9:48 a.m. | Adams accepts the request. He is almost finished with his sweep of A5 and heads to 176 Lafayette Street. |
| 9:55 a.m. | Adams arrives at 176 Lafayette Street. The driver of the truck still cannot be found and the truck is clearly blocking the driveway. Adams calls the towing service. He issues a citation for the truck and takes a picture of the situation. He sends feedback to the system to document the incident. Policy requires that he stay on the scene until the tow truck arrives and takes the illegally parked truck away. |
| 10:10 a.m. | After the tow truck arrives and starts towing the truck away, Adams brings up the Orienting "Plan for this Neighborhood" interface for advice on what to do next. |

Figure 34:
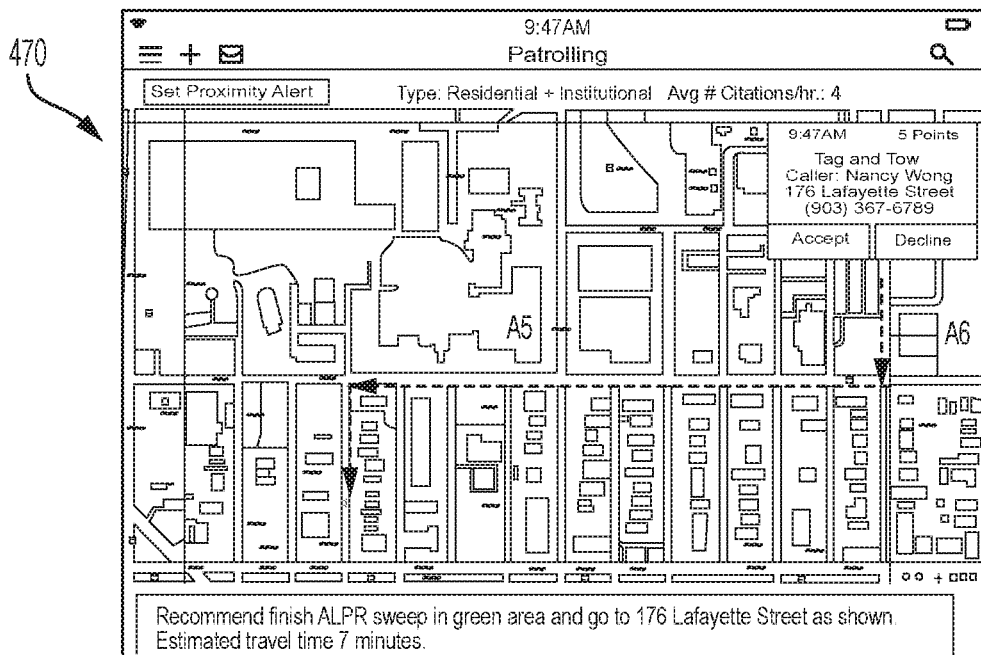
FIG. 34 is a diagram showing, by way of example, a patrolling interface screen of the real time coordination application of FIG. 24.

FIG. 34 is a diagram showing, by way of example, a patrolling interface screen 470 of the real time coordination application of FIG. 24. The interface shows the service request from the dispatcher regarding handling a call for a tag-and-tow for a truck that is blocking a driveway. The screen gives Adams an opportunity to accept or decline the service request and also shows a recommended route and estimated travel time to get to the location.

Context Awareness, Activity Tracking and Plan Adjustments

Dispatcher Dance relies on computations performed by the resource allocator 76 and the response plan generator 77 components of the planner and recommender layer 62, which is further discussed infra with reference to Scenario 3. The resource allocator 76 is responsible for identifying the resources needed to handle unplanned events. The response plan generator 77 is responsible for creating the operational plans for the teams and recommending adjustments to the operational plans throughout the day as the situations change. The blocked driveway and subsequent tag-and-tow activity, for instance, is an unplanned event and perturbation from Adams' original plan for his shift. Scenario 4, infra, describes how Dispatcher Dance uses her situation assessment and monitoring interface to interact with the resource allocator 76 and the response plan generator 77. In the example scenarios, the resulting new plan is not much different from the old plan and does not require any coordination with the other team members.

Figure 35:
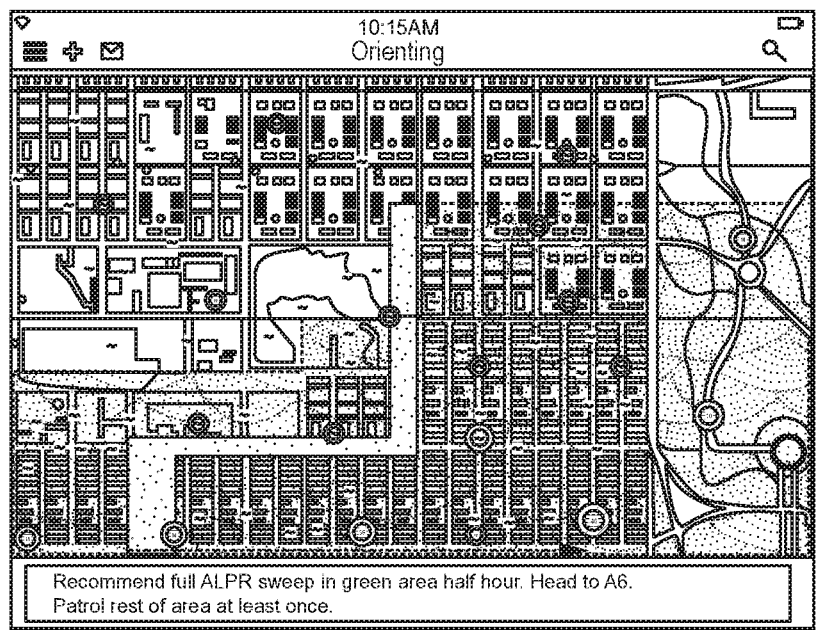
FIG. 35 is a diagram showing, by way of example, an orienting interface screen of the real time coordination application of FIG. 24 showing a recommended route for parking enforcement in a portion of the beat.

Here, while Adams is working in a residential area, Officer Edwards passes through his area and picks up some citations along the way. Adams' activity map gives him contextual awareness of the other officer's activities, coverage, and citations. FIG. 35 is a diagram showing, by way of example, an orienting interface screen 480 of the real time coordination application of FIG. 24 showing a recommended route for parking enforcement in a portion of the beat. Here, the orienting "Plan for this Neighborhood" interface screen 350 shows a portion of the A2-A3-A5-A6 region recommended to Adams, along with a recommendation that Adams sweep every half-hour in the 10 a.m. to 11 a.m. hour to increase compliance on regulations for non-residential parking. The screen also shows citation counts for this hour from recent weeks. Since Adams recently patrolled $18^{th}$ Avenue while travelling to the tag-and-tow service request, the system recommends that he begin by driving along $17^{th}$ Avenue to the mixed residential and tourism area in A6, which has the highest number of likely citations. The cross-hatched (darker green shaded) area of the screen shows where Adams has already patrolled.

In general, the activity maps for Adams and other officers are continuously updated, and, in particular, Adams' priorities now need to be changed to account for Officer Edwards' ticketing activities. Information about Edwards' ticketing activities is added to the Active Representational Model in the system's data base, which tracks the current status of the city. The information added to the Active Representational Model includes both the citations that Edwards picked up, the information that he has patrolled part of Adams' area, and any license plate and registration information that was picked up by the ALPR on Edwards' vehicle. The opportunity predictor 353 components of the planner and recommender layer 62 uses this newly-added information to determine that Adams no longer needs to travel to that area in light of Edwards' having already done so. The opportunity predictor 353 now modifies its recommendations for Adams' activities.

| Date/Time | Activity |
|---|---|
| 10:11 a.m. | Since Adams recently patrolled $18^{th}$ Avenue when he drove to the tag-and-tow service request, the dynamic route predictor 74 component of the planner and recommender layer 62 recommends that he drive along $17^{th}$ Avenue to the highest density citation area in A6, which is mixed residential and tourism. Adams heads off to A6 with the ALPR activated and begins patrolling the shaded region on a route that he picked for himself. As in the earlier part of the scenario, Adams could set audio alerts to remind him when he is near places where he typically overlooks citations. Adams picks up tickets mainly in the predicted areas. Parking in A2 and A3 is pretty sparse. There was only one ticket found there in the last hour and no new non-residents have parked there since. |
| 10:50 a.m. | Officer Edwards, on a different team, is returning from a traffic control assignment. His route takes him through part of Adams' area, the eastern portion of A3 and A6. While Edwards passes through, his ALPR marks vehicles in the region and he also cites one non-resident vehicle that has passed the two-hour limit. He gives a citation to a car parked too close to a fire hydrant.<br>As Edwards enters and works in Adams' area, Adams' patrolling interface alerts him to the presence of Edwards. |

Figure 36:
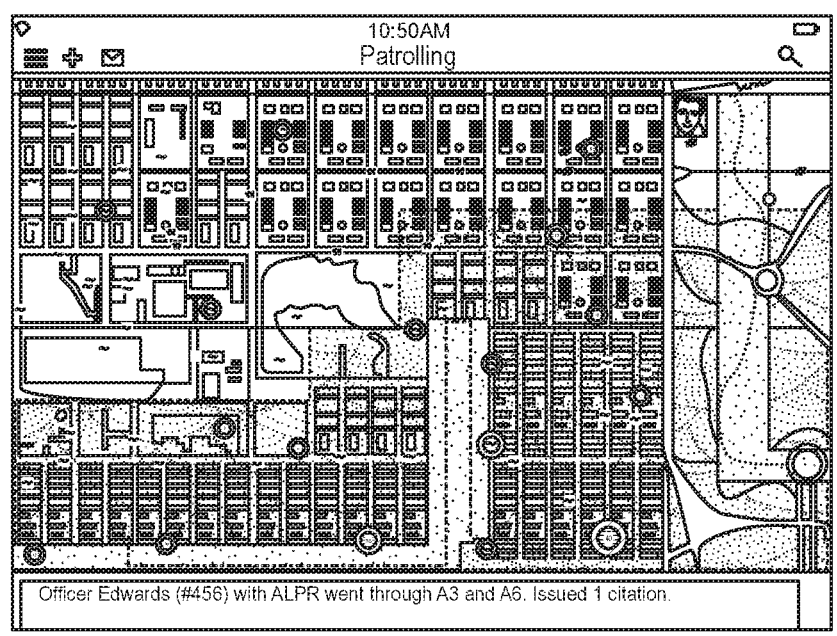
FIG. 36 is a diagram showing, by way of example, an activity map interface screen of the real time coordination application of FIG. 24 showing a portion of the beat.

FIG. 36 is a diagram showing, by way of example, an activity map interface screen 490 of the real time coordination application of FIG. 24 showing a portion of the beat. The screen shows a portion of the A2-A3-A5-A6 region patrolled by Adams and also shows the path taken by Edwards passing through the region with the citation that he issued.

Situation Assessment and Lunch Alert

| Date/Time | Activity |
|---|---|
| 12:00 p.m. | As Adams approaches the noon hour, he reviews his work and is prompted by the system to take a lunch break. Adams accepts the lunch recommendation and takes lunch near a coffee shop. |
| 12:45 p.m. | Adams marks his break as complete and resumes patrolling in A6, picking up several citations. |

| Date/Time | Activity |
|---|---|
| 1:05 p.m. | At 1 p.m., the system interrupts his patrolling display to alert Adams about a recommended change of focus. The optimized area for him is now A6-B2-B3. |
| 1:10 p.m. | Adams begins patrolling B3. |

Figure 37:
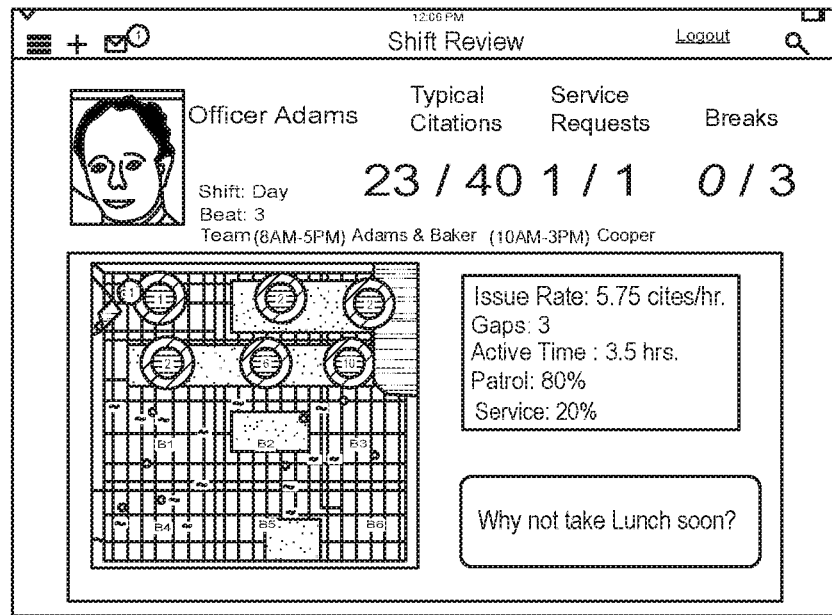
FIG. 37 is a diagram showing, by way of example, a shift review interface screen of the real time coordination application of FIG. 24.

FIG. 37 is a diagram showing, by way of example, a shift review interface screen 500 of the real time coordination application of FIG. 24. The screen, as seen by Officer Adams at noon, shows his statistics so far and where he spent his time in Beat 3. The screen recommends that he take a lunch break.

Unplanned Event and Rebalancing the Assignments

Figure 38:
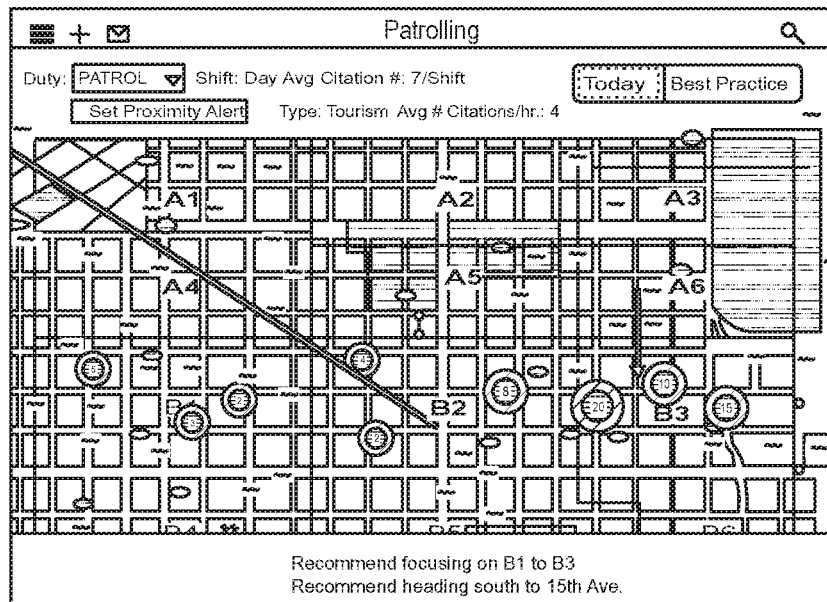
FIG. 38 is a diagram showing, by way of example, a patrolling interface screen of the real time coordination application of FIG. 24.

FIG. 38 is a diagram showing, by way of example, a patrolling interface screen 510 of the real time coordination application of FIG. 24. In this scenario, after 1 p.m., the patrolling interface screen 380 changes for Adams to advise him to switch his attention to B1, B2, and B3. The density of expected citations suggests that his attention should be mainly on B3, with decreasing attention on B2 and B1. After Adams switches to his new assignment in the 1 p.m. to 2 p.m. hour, an accident occurs in area A1. (This account of an accident as an unplanned event differs from the story in Scenario 1.)

With support of the coverage planner 78 components of the planner and recommender layer 62, the dispatcher changes the assignments to the team to handle the accident and rebalance the remaining activities among the other parking enforcement officers on the team. Scenario 3, infra, discusses how Dispatcher Dance uses the coverage planner 78 through the situation assessment interface to review the situation and make recommendations. FIG. 39 is a set of diagrams showing, by way of examples, changes 520 in duty shift task assignments for Adams, Baker and Cooper. Baker is on break and does not change her assignment. Cooper leaves his assignment on A5 and A6 to do traffic control for the accident in area A1. Cooper is expected to need 30-40 minutes to cover the accident. Adams picks up the high priority part of Cooper's previous assignment in A6 and drops his own previous lower priority assignment in B1.

| Date/Time | Agent | Activity |
|---|---|---|
| 1:20 p.m. | Dance Baker Cooper | Dance receives a call about a traffic accident in area A1. Baker and Cooper are closest to the accident. Baker is on a lunch break. Dance offers the assignment to Cooper, who accepts the traffic control assignment for the accident and drives from A5 to A1. |
| 1:25 p.m. | Adams | The patrolling interface screen shows Adams his new recommended focus area and integrates information about where Adams or Cooper recently patrolled B3 or A6, so that Adams will know where coverage is needed. The screen also recommends a starting route for Adams. |

Figure 42:
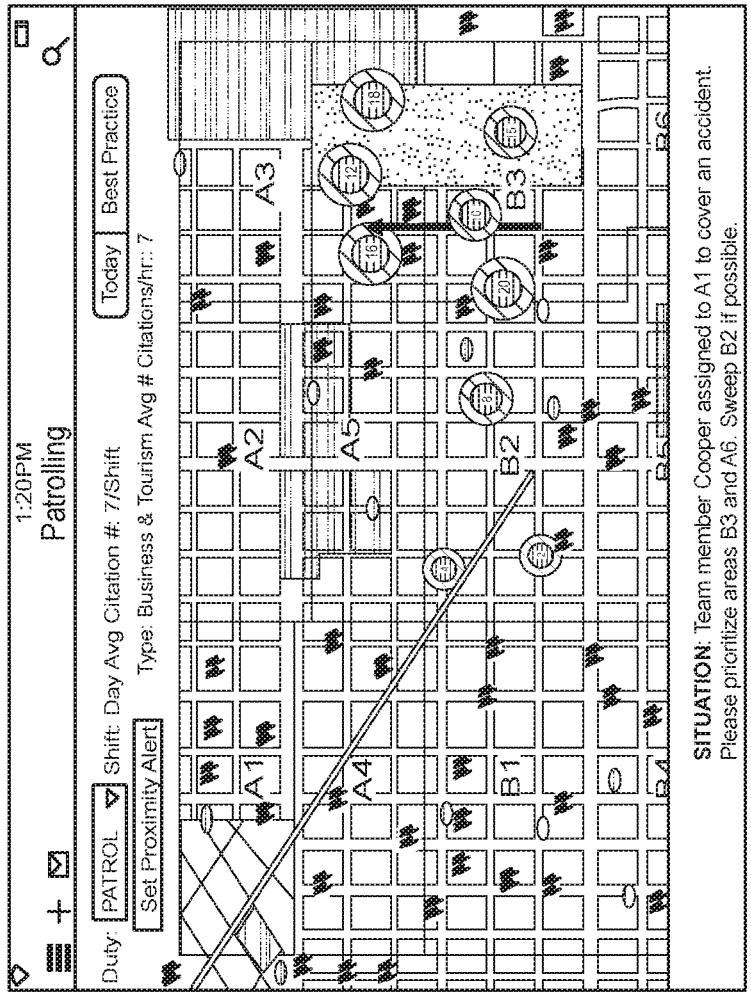
FIG. 42 is a diagram showing, by way of example, a patrolling interface screen of the real time coordination application of FIG. 24 showing the re-assignment of duty shift tasks to cover the accident.

FIGS. 40-41 are sets of diagrams 530, 540 showing, by way of examples, planned team assignments respectively before and after an accident in a region of the beat. Re-planning also takes place for the 2 p.m. hour FIG. 42 is a diagram showing, by way of example, a patrolling interface screen 550 of the real time coordination application of FIG. 24 showing the re-assignment of duty shift tasks to cover the accident. The screen alerts Adams about Cooper's re-assignment to cover the accident in area A1 and recommends that Adams focus his attention on B3 and A6. The shaded (light green) area shows the focus areas and the cross-hashed (dark green) area shows the parts of the assignment recently covered by either Cooper or Adams.

| Date/Time | Agent | Activity |
|---|---|---|
| 2:00 p.m. | Cooper | By 2 p.m. Cooper has cleared the accident in A1. |
| 2:00 p.m. | Dance Cooper Adams | The coverage planner 78 component of the planner and recommender layer 62 reconsiders the locations of the parking enforcement officers for the 2 p.m. hour. Given the changed locations of the officers since the original plan was made, the coverage planner 78 component determines that some driving time can be eliminated by re-planning the 2 p.m. hour and recommends that Cooper and Adams switch assignments in the 2 p.m. hour. |
| 3:00 p.m. | Adams | As in previous assignment transitions, Adams uses his patrolling interface screen to get recommendations for his work in the 3 p.m. hour. |

Figure 43:
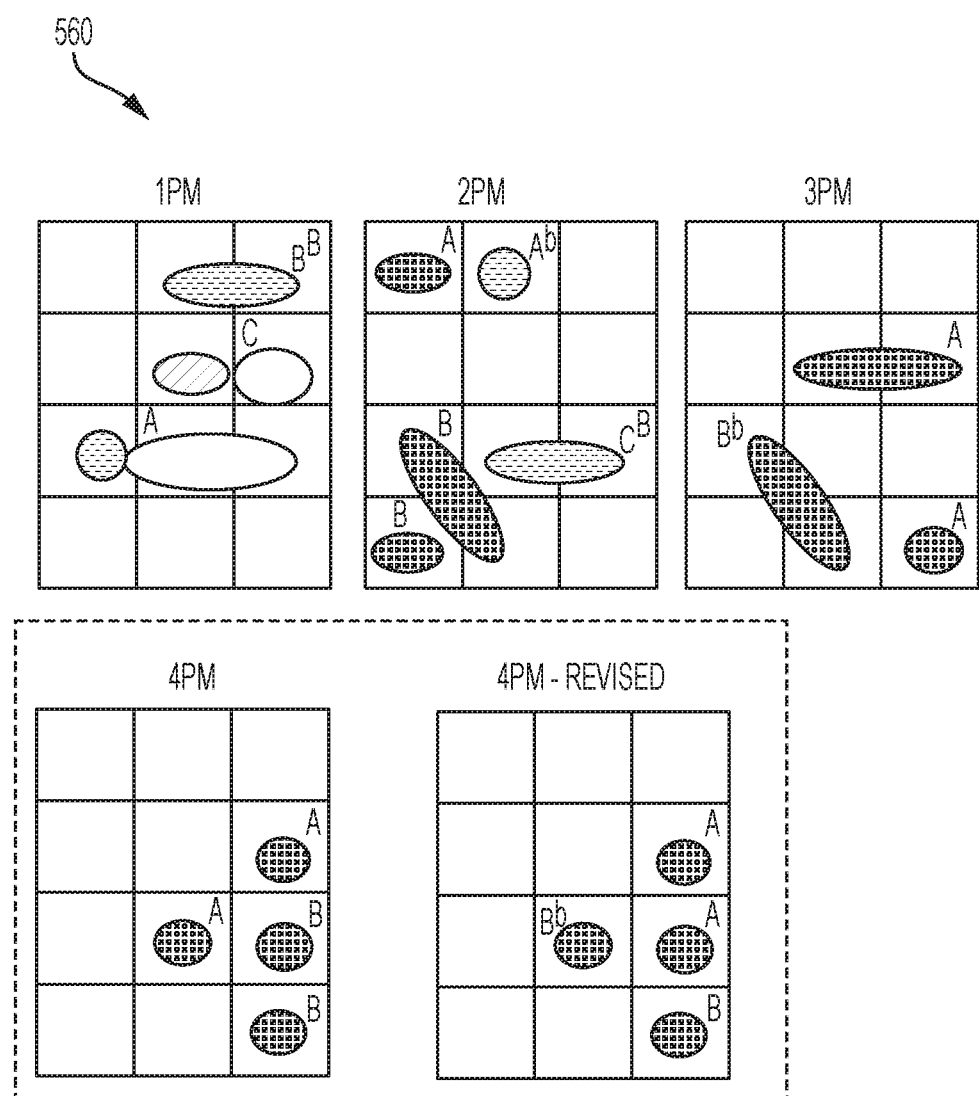
FIG. 43 is a set of diagrams showing, by way of examples, planned team assignments for an afternoon.

FIG. 43 is a set of diagrams 560 showing, by way of examples, planned team assignments for an afternoon. Adams and Baker agree to trade a portion of their beats in the 4 p.m. hour.

Overriding Recommendation and Swapping Assignments

As the 4 p.m. hour approaches, Baker remembers that she wanted to run an errand in area B2. Normally, she would have run her errand earlier during the 3 p.m. hour while on her break, but she has not yet taken her break. She suggests to Adams that they trade areas in the 4 p.m. hour. Baker will cover B2 for Adams and Adams will cover B3 for Baker.

| Date/Time | Activity |
|---|---|
| 3:45 p.m. | At 3:45 p.m., Baker realizes that she did not take her break during the 3 p.m. hour. She has a personal errand to run in area B2. Baker messages Adams that she would like to trade coverage areas during the 4 p.m. hour. She proposes to cover B2 for Adams and Adams would cover B3 for her. |
| 3:50 p.m. | Adams agrees to the swap. |
| 4:00 p.m. | Adams finishes his sweep in area A6 and drives to B3. The observer 72 component of the computer partner and communications layer 63 (shown in FIG. 4) notices that Adams is in B3 and reminds him, through the officer activity interface 69 of the user interaction layer 61 (also shown in FIG. 4) that his focus areas are A6-B2. Adams responds that he is overriding the recommendation and trading assignments with Baker. |

Figure 44:
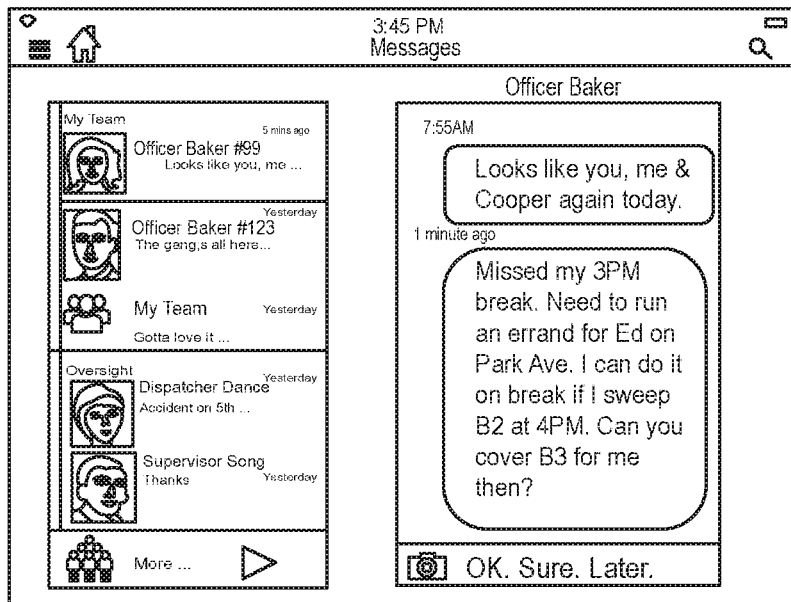
FIG. 44 is a diagram showing, by way of example, a messaging interface screen of the real time coordination application of FIG. 24.

FIG. 44 is a diagram showing, by way of example, a messaging interface screen 570 of the real time coordination application of FIG. 24. The screen shows Baker's request to trade areas with Adams at 4 p.m. and his agreement to the trade.

Figure 45:
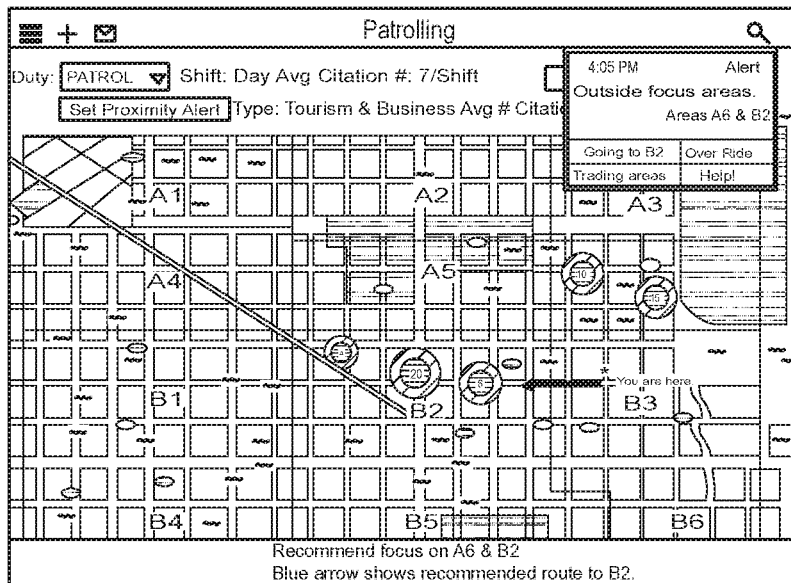
FIG. 45 is a diagram showing, by way of example, a patrolling interface screen of the real time coordination application of FIG. 24.

FIG. 45 is a diagram showing, by way of example, a patrolling interface screen 580 of the real time coordination application of FIG. 24. When the observer 72 component of the computer partner and communications layer 63 (shown in FIG. 4) notices that Adams is in B3 rather than B2, Adams is sent an alert. In this scenario, the observer module notices from the GPS on Adams' mobile computing device that he is outside the area that was recommended to him and sends him an alert. Adams can respond that he is trading areas with Baker.

There are several ways that the change of plans could be communicated between Adams, Baker and the system. Here, the system initiates communications after noticing that Adams is working B3, rather than B2, and that Baker is working B2 rather than B3. The system then asks the officers to confirm that they had traded areas. Another approach for communicating a change by Adams involves sending a tagged message to the system, such as described in U.S. Pat. No. 10,013,459, issued Jul. 3, 2018 and U.S. Pat. No. 10,025,829, issued Jul. 17, 2018, the disclosures of which are incorporated by reference. An event tag, which is appended to the message automatically by the mobile device, by the officer, or by both, would cause the message to be routed to the message director 71 component of the computer partner and communications layer 63 (shown in FIG. 4). Based on the event tag, the message director 71 component would then be processed by an episodic analytic system (not shown) that can produce an association between organizational activity data, here, what areas are being patrolled by which officers, and specific events, here, Adams and Baker trading areas. The various associations formed by the episodic analytic system can also be used to generate analytics about activities to evaluate organizational performance. In a still further variation, an officer could interact with the map interface screen on his mobile computing device to tell the system which area he plans to cover, thereby overriding a recommendation.

Scenario 3—Supporting Supervisors

Supervisors 12 oversee and manage their squads of parking enforcement officers 14 and are responsible for their squad's performance. Operationally, Supervisors 12 have responsibilities that include:

- Pre-plan beat assignments for officers based upon seniority and beat rotation.
- Train officers on beats and rotate the officers to develop familiarity.
- Periodically assess officer performance, including previewing expectations with officers prior to duty shifts, reviewing expectations and performance after duty shifts, and presenting expectations to officers during duty shifts.
- Suggest changes to policies and encourage changes in activities when appropriate.

In some parking enforcement organizations, the responsibilities for supervisors 12 and dispatchers 13 may partially overlap.

Monitoring Officer Performance

Supervisors 12 need to know when their officers 14 are not performing as well as they could. Here, the system 20 provides tools for monitoring officer activities. Officers' actual performance is compared to expected performance based upon information fusion, planning, and computed performance expectations.

Officer supervision is difficult and requires asking if an officer 14 followed recommendations and whether the officer's performance was as good as expectations for the recommendations. Finding answers to these questions is challenging and intuitively-derived answers gleaned by mentally fusing information, forming alternative plans and computing expectations are unreliable at best. Specifically, fusing information about a situation is complex and requires sensors to collect data combined with the fusion of current data, historic data, and the estimation of the current situation. Similarly, planning is a complex optimization problem that requires finding the best order and best routes to work the areas of parking enforcement responsibility. Finally, computing expectations is complex because officer expectations are based upon many factors, such as characteristics pertaining to the beat, including:

- Nature of the officer's beat.
- Time of day.
- Day of week.

and factors specific to the officer, including:

- Experience.
- Familiarity with the beat.

Still other considerations and factors may influence fusing information, forming alternative plans and computing expectations.

This scenario considers two time segments during a duty shift during which a supervisor 12 monitors and advises officer performance in real time.

| Date/Time | Activity |
|---|---|
| 10:11 a.m. | Since Adams recently patrolled 18$^{th}$ Avenue when driving to the tag-and-tow assignment, the dynamic route predictor 74 component of the planner and recommender layer 62 (shown in FIG. 4) recommends that he drive along 17$^{th}$ Avenue to the highest density citation area in A6, which is mixed residential and tourism. Adams heads off to A6 with the ALPR activated and begins patrolling the shaded region on a route that he picked for himself. As in the earlier part of the scenario, Adams could set audio alerts to remind him when he is near places where he typically overlooks citations. Adams picks up tickets mainly in the predicted areas. Parking in A2 and A3 is pretty sparse. There was only one ticket found there in the last hour and no new non-residents have parked there since. |
| 10:50 a.m. | Edwards, who is on a different team than Adams, is returning from a traffic control assignment. His route takes him through an eastern portion of A3 and A6. While he passes through, his ALPR marks vehicles in the region. He also cites one non-resident vehicle that has passed the two-hour limit and gives a citation for a car parked too close to a fire hydrant. As Edwards enters and works in Adams' area, Adams' patrolling interface alerts him to the presence of Edwards. |
| 10:55 a.m. | Supervisor Song decides to check on Adams. He brings up a situation assessment display. |

Figure 46:
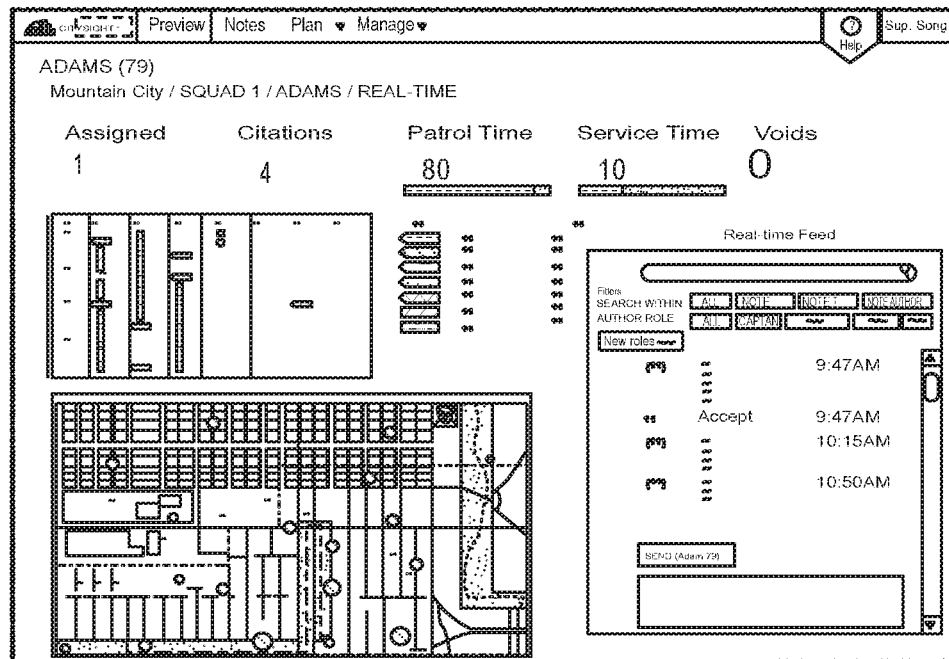
FIG. 46 is a diagram showing, by way of example, a situation assessment interface of a real time monitoring application for use by a parking enforcement officer supervisor for execution on a personal computer.

FIG. 46 is a diagram showing, by way of example, a situation assessment interface 590 of a real time monitoring application for use by a parking enforcement officer supervisor for execution on a personal computer. Here, the screen shows Supervisor Song checking on the activities of Adams. The screen displays combines real time data about Adams' activities with recommendations about where citations may be found. The screen also shows a stream of communications to and from Adams to provide context. Song can communicate directly with Adams from the situation assessment interface 590.

In this implementation of the situation assessment interface 590, the top box on the left is an officer timeline that shows activity or duty status codes, gaps in activity, and citations. Other performance review features are possible, such as statistics on performance of two-part activities, that is, those activities that require more than one pass to complete a citation. For example, in a time-limited parking zone, the issuing of an over-time ticket takes two passes, where a vehicle is observed on the first pass and ticketed on the second pass if the vehicle is later observed in the parking zone past the allowable time. In a second example, a citation for an abandoned vehicle takes two passes. Commonly, an officer will first put a warning on a vehicle suspected of being abandoned and a citation will be issued if the vehicle is still there after 72 hours. The map interface and other interface screens for parking enforcement officers 14 and for oversight interface screens for supervisors 12, that is, the situation assessment interface 590, can annotate "ripening" two-part activity opportunities for enforcement when the allowed time has elapsed.

Although this example shows a supervisor 12 monitoring an individual parking enforcement officer 14, the situation assessment interface 590 could be focused on a geographical area of inquiry or to a selected group of parking enforcement officers 14, such as those officers who are on a particular squad, multiple squads, or a super-team. In addition, the situation assessment interface 590 could be used to detect low or high performance in real time and the supervisor 12 could then send suggestions or motivational messages to the officer or group in question. Finally, the system can compute various analytics that can be added as performance indicators to the situation assessment interface 590.

Highlighting Anomalies in Parking Enforcement Operations

Performance analytics are quantitative and qualitative measures that convey levels and quality of parking enforcement organizational performance. For example, a parking enforcement organization might measure how often areas are patrolled, the average amount of time taken to respond to a request, or expected numbers of citations or revenues from ticket fines. Performance analytics and indicators that can be used in reviewing parking enforcement officer or team performance will now be discussed.

Detecting Low and High Performance in Real Time

A dispatcher 13, a supervisor 12, or other member of a parking enforcement organization may wish to be notified if an individual parking enforcement officer 14 or parking enforcement team are performing worse than expected. This situation can occur, for example, if an officer has fallen asleep, taken a break when they should be on duty, spent more than 30 minutes on a service task, and so forth. Performance indicators include:

Lack-of-Activity Indicators. Low performance can be detected by looking for a lack of appreciable activity by an individual parking enforcement officer 14 or team. For example, low activity on the part of an individual parking enforcement officer 14 can be detected by looking for one or more of:

Too much time has lapsed since a citation was written.
Too much time has lapsed since duty status changed.
Too much time has lapsed since a vehicle was marked.
Too much time has lapsed since a citation of a given category was issued.
ALPR is deactivated.
Too much time has lapsed since the officer's mobile computing device has moved.
Too much time has lapsed since the officer submitted a note.
Given the type of service task, too much time has been spent on the task.
Any other key performance indicators are missing or low.

At a zone level, low activity can be detected by looking for one or more of:

Too few citations.
Too few duty status changes.
Too few vehicles marked.
Too few citations of a given category were issued.
Officer handhelds have visited too few streets or zones.
Too few notes have been submitted overall.
Given the type of service task, one or more team members spending too much time on the task.

Once a performance anomaly has detected, a supervisor 12, dispatcher 13, parking enforcement officer 14, or team can be notified of the detected anomaly in a variety of ways, including:

Officer-of-Interest Map. Displaying the locations of low performing parking enforcement officers 14 on a map. In addition, when the viewer hovers the mouse over the icon in the map representing the officer 14, the system can display up-to-date information about the key performance indicators for that officer 14, such as how they have been performing during the most recent 30 to 120 minutes. The map may also show the locations of all officers 14, using color, icons or other indicators to distinguish low, average, and high performers. Other performance metrics are possible.

Area-of-Interest Map. Highlighting low performing beats, super-beats, streets, or teams on a map. In addition, when the viewer hovers the mouse over the area of interest, the system can display up-to-date information about the key performance indicators for the officers in that area, such as how they have been performing during the most recent 30 to 120 minutes. The map may also show areas of average and high performance, using color, icons or other indicators to distinguish the low, average, and high performance areas. Other performance metrics are possible.

Officer-of-Interest Table. Displaying a sorted list of low performing parking enforcement officers 14 with the lowest performers at the top of the list. In addition, the list can show up-to-date information about the key performance indicators for the officers 14, such as how they have been performing during the most recent 30 to 120 minutes. The list can also be sorted from high to low performance to highlight those officers 14 with the highest performance. Other performance metrics are possible.

Area-of-Interest Table. Displaying a sorted list of low performing beats, super-beats, streets, or teams with the lowest performers on the top of the list. In addition, the list can show up-to-date information about the key performance indicators for the officers 14 in that area, such as how they have been performing during the most recent 30 to 120 minutes. The list can also be sorted from high to low performance to highlight beats, super-beats, zones, streets, or teams with the highest performance. Other performance metrics are possible.

Officer Comparison Methods

For the analytics discussed in the last section, average performance can be computed in various ways to discover different kinds of anomalous behavior, for instance, including:

Comparison to all parking enforcement officers 14 in this time period
Comparison to all parking enforcement officers 14 at this time on this day of the week
Comparison to performance of all parking enforcement officers 14 in all time periods
Comparison of this parking enforcement officer's performance to his average performance in this time period, this time on this day of the week, or all time periods.
Comparison to other parking enforcement officers 14 in the same squad or the same organization.
Comparison to all parking enforcement officers 14 when working in the current super-beat, beat, zone, or street.
Comparison to all parking enforcement officers 14 when working under the current weather conditions.
Comparison to all parking enforcement officers 14 when working under the current weather conditions in this time slot, day of the week, on the same holiday, or other time period of interest.

Comparison to a pool of high performing parking enforcement officers 14 or low performing parking enforcement officers 14.

Still other types of comparisons or temporal time frames are possible.

Ways of Detecting Lack of Movement

Detecting the lack of movement of a parking enforcement officer 14 is one component of detecting lack of productive activity. Unusually (or suspiciously) low movement can be detected in several ways, including:

Small amount of area covered.

Small number of streets visited within the assigned beat.

Total latitude and longitude change within a time range.

Time spent on streets uneven with too much time spent on some streets and too little time spent on other streets.

Too much time spent outside of the assigned beat.

Too few areas covered.

Still other ways to detect low movement are possible.

Early Detection of Performance Drops

The low performance detection described in the last section will detect the lowest performing parking enforcement officers 14 after a period of time. However, a supervisor 12, dispatcher 13, or super-beat team member may wish to detect such drops in performance as early as possible, so that action can be taken to improve the situation.

Performance drops can be detected early by computing a running tally of each parking enforcement officer's performance, updated continuously throughout the day. At any moment, all parking enforcement officers 14 are ranked based upon this score. To calculate each score, the system assigns activity points to various kinds of activities. The system then collects digital information about officer activity and tallies each officer's score through a process that ages the contributions of the activity points. The activity points from an activity contribute to an officer's score only for a period of time after the activity has been noted; the activity points eventually cease to contribute to the score after a sufficient period of time has passed. In other words, a temporal weighted average of activity points is computed, where more recent activity points are given a higher weighting.

When performing early detection of performance drops, each activity is assigned a number of points. Activity points are assigned to each activity roughly based upon the amount of time required to perform the activity and the effort or value that the activity represents. For example, driving down the road for one minute might be 1 point. Writing up a ticket for 2 minutes might be worth 5 points, consisting of 2 minutes for the time taken and 3 more minutes for the value generated. The set of activities that are assigned points includes the activities discussed in the section supra entitled, Detecting Low and High Performance in Real Time. Still other types of activities can be assigned points.

Three kinds of weighting appear to be particularly effective:

Boxcar Weighted Activity—the points from each activity performed are given equal weight, as long as the activity was performed within the last m minutes. After the m minutes have elapsed, the weight assigned to the activity becomes zero and the activity no longer contribute to the score. This function has the advantage of being easy to explain. For example, parking enforcement officers 14 can be told, "You get credit for all of your activities in the last half hour," assuming that m equals 30.

Exponentially Weighted Activity—the points from each activity performed are given a weight that depends upon the amount of time that has passed since the activity took place. For example, an activity that was just logged into the system gets a weight of 1. After 10 minutes, the weight is decreased to a weight of $½$. After 20 minutes, the weight is decreased to a weight of $¼$. After 30 minutes, the weight is decreased to a weight of $⅛$, and so forth. This function has the advantage that a drop in activity can be detected early, but has the disadvantage of being harder to explain.

Exponential and Boxcar Weighted Activity—this function combines the Boxcar Weighted Activity and the Exponentially Weighted Activity functions. All weights assigned to activities performed drop to 0 after a period of time, for instance, 60 minutes. Until then, the weights drop exponentially in the same fashion as for exponentially weighted activity. This function may be a little easier to explain than the pure exponentially weighted activity function; for example, parking enforcement officers 14 can be told, "You get credit for all of your activity in the last hour, but recent activity counts more."

Still other ways to detect drops in performance early and other functions for weighting activity point scores are possible.

Advising Officer Performance

In addition, to monitoring for low performance, the dashboard interfaces of the system for supervisors 12 can provide recommendations for advice that the supervisors 12 can give to their officers 14. In many cases, the recommendations created by the system or created by supervisors 12 are similar to the examples discussed supra in Scenario 1. Such advice provides motivation to the officers by enhancing their sense of autonomy, mastery and purpose, including allowing officers 14 to be able to modify the level of detail in performance recommendations. For example, an officer 14 could get turn-by-turn directions to specific targets, which reflects low autonomy and route mastery. On the other hand, an officer 14 could choose to only receive occasional hints if the officer is speeding by potential parking violations or ignoring a highly-probably patch of violations, which reflects medium autonomy and route mastery. Further, an officer 14 could decide to get just a background overview that shows nearby blocks with their predicted citations and other enforcement opportunities, which reflects high autonomy and route mastery. Such recommendations extend the monitoring capabilities of the dashboard from "working hard" monitoring and advice to "working smart" monitoring and advice.

One pragmatic reason for providing recommendation capabilities to supervisors 12 would be for deployments of the system in cities where mobile computing devices capable of displaying such advice are not given to parking enforcement officers 14. In that situation, the recommendations can be read by supervisors 12 and passed along to their officers 14.

Detecting Areas Where Officers are Most Needed

During a day of parking enforcement, given the number of violations being observed or predicted or the number of service tasks, the parking enforcement needs on some beats, super-beats, streets, or teams may exceed the work that can be performed by the parking enforcement officers 14 already assigned. This situation can be detected algorithmically in several ways, including:

Real time information from parking meters that have expired or are about to expire.

Predictive models from historical data showing the number of expected violations in the area, given the time of day, day of the week, weather, holiday or non-holiday status, and other factors.

The number of citations being written.

The rate at which streets are being visited.

The scheduled need for service tasks, including traffic control for demonstrations, city council initiatives, press conferences, scheduled signal maintenance, and so forth.

Unscheduled service needs, such as traffic accidents, fires, police emergencies, signal outages, floods, snow blocking roads, and so forth.

Still other ways to detect areas where officers are most needed are possible.

When such areas of high need are detected, the information detected algorithmically can be communicated to a dispatcher 13 to call attention to the need in a variety of ways, including:

Highlight high need areas on a map.

Provide a rank ordered list of the areas that need more parking enforcement officers 14, where the areas are ranked by the expected value of having an additional officer in that area during the next time period.

Still other ways of notifying dispatchers 13 of high need areas are possible.

Detecting Low Value Assignments

A parking enforcement officer 14 or team will generally be assigned to a given beat, super-beat, street, or zone at any point in time. Such an assignment may turn out to have higher or lower value based upon a number of factors, such as:

The number of violations in that area at that time.

Scheduled or unscheduled services needed in that area at that time

Whether parking meters and other equipment are functioning. For example, the parking meters may be bagged in that area to show that they have been taken out of service or are in need of servicing.

Other factors are possible.

Detecting that a parking enforcement officer 14 or team has been assigned to an unproductive zone early is valuable. The situation can be detected by looking for signs that their work during the next time period will likely be of relatively low value if they continue working in their current role and area. Likely low value work can be detected by looking at:

The rate at which parking enforcement officers 14 in that area typically find citations.

The extent to which the streets in that area have been visited recently, by any parking enforcement officer 14.

Whether the any parking enforcement officers 14 are scheduled for service duties in the next time period.

Whether reports that the streets are blocked, parking places roped off, parking meters are bagged, and so forth have been logged by the system.

Other indicators of likely low value work are possible.

The system can compute a predicted low value work score for each parking enforcement officer 14 for the next 30 minutes, hour, or any other time period. The system can make the predicted low value work score available to a dispatcher 13 or super-beat team, as follows:

Display the information on a dynamically updated map.

Provide a sortable data table, in which officers 14 with low value predictions are shown at the top.

Other ways to provide the predicted low value work score are possible.

Reassigning Underutilized Officers

A dispatcher 13 or a super-beat team may discover that they need one or more additional parking enforcement officers 14 to support the current level of workload in their area. The need for reassignment may be triggered by an explicit event or may be simply be detected from the routine information flow about the status of parking regulation violations and parking enforcement officers 14. For example, a given beat, super-beat, zone, or street may have too few officers 14 given the current number of parking violations that are being observed. This situation may result from an unscheduled event, such as a traffic accident, fire, or traffic signal outage, an officer 14 who is unable to work, or from a larger-than-expected crowd of motorists and parking regulation violations.

Alternatively, a dispatcher 29 or super-beat team may consider the predicted low value work score described supra in the last section, identify the parking enforcement officers 14 or teams currently on the assignments having the lowest values, and attempt to find them higher value assignments. A reassignment will generally move an officer 14 from one area to a different area.

Note that both of these types of information can be displayed on the same map. Such a map would show both the location of underutilized parking enforcement officers 14 and the location of higher value assignments that currently have no officers 14 or too few officers 14 to support the assignments. By looking at such a map, a viewer can find available parking enforcement officers 14 to fill higher value assignments who are already in a nearby area, so that travel time will be minimized, and who are also currently in relatively low value assignments, so that expected revenue is increased. If desired, the dispatcher 13 can also have the response plan generator 77 component of the planner and recommender layer 62 (shown in FIG. 4) run a planning algorithm to suggest a reassignment plan that takes into account both revenue increase and travel time.

Scenario 4—Supporting Dispatchers

This scenario focuses on the situation assessment and response activities of a dispatcher 13 during part of a shift and describes the real time assessment of unplanned events and how the human-plus-computer team gathers the relevant information and makes decisions. In the same manner as each parking enforcement officer 14, each dispatcher 13 has a c-partner. The scenario illustrates how all of these computers and people are engaged to make optimal decisions quickly while minimizing interruptions to people.

Throughout the day, dispatchers 13 watch over their assigned regions of Ocean City. By the time that the parking enforcement officers 14 hit the streets, the overall staffing and assignments have already been developed; however, unplanned events often arise over the course of a day. Unplanned events include traffic accidents, roadway hazards, dangerous conditions that affect citizens and property, unscheduled civic demonstrations, fires, and so on. When an unplanned event, as well as planned events, occur, parking enforcement officers 14 may be called upon to stop whatever they are doing at that moment and be asked to handle the event by directing traffic or assisting in some other way. To avoid lapses in parking enforcement coverage and help optimize organizational performance, dispatchers 13 need to adjust officer assignments in real time.

In this scenario, Dispatcher Dance monitors the activities of two squads that each have nine officers assigned. Both squads are organized in teams ranging from one to three officers apiece. Scenario 3 modifies and extends Scenario 2. The scenario begins with a shift handoff from Dispatcher Donavan to Dispatcher Dance, whilst a fire event from the previous night is still being wrapped up. Early in Dance's shift, a falling tree hits a power line and a parking enforcement officer 14 must be assigned to respond to that event, assess the situation, call for any additional help if needed, and direct traffic. Scenario 3 also describes a response to a traffic accident that occurs later on in the day.

Here, Dispatcher Dance uses a situation assessment and planning interface of the system. Phone support for 9-1-1 and 3-1-1 calls and other communications are integrated into the interface.

Conflicting Goals and Better Coordination Between Supervisors and Dispatchers

There is overlap between the activities of dispatchers 13 and supervisors 12. For the most part, dispatchers 13 are concerned with handling unplanned events. Since dispatchers 13 are traditionally not as concerned about the revenue performance of a parking enforcement organization, their decisions tend to be blind to revenue performance-related issues and, in some situations, their handling unplanned events can significantly interfere with the revenue objectives that most concern supervisors 12. Consequently, decisions by dispatchers 13 can disrupt the other goals for the organization. Here, this scenario focuses on augmentations to the interfaces used by dispatchers 13 to provide more visibility and accountability to a more complete range of performance goals of an enforcement organization than conventionally made available to dispatchers 13.

Similarly, although supervisors 12 often have place a greater emphasis on compliance and revenue concerns, supervisors 12 are also sometimes involved in responses to unplanned events. Here, the features of the interfaces for dispatchers 13 can be included in the interfaces for supervisors 12, and vice versa, as appropriate to the implementation.

Shift Handoff and Activity Monitoring

| Date/Time | Activity |
|---|---|
| 8:01 a.m. | Dispatcher Dance takes over the shift from Dispatcher Donavan. They use the situation assessment interface to discuss the current status of events in Ocean City and view the ongoing situation before Donavan goes home. Among other things, they review the status of a downtown fire event #975 at a Woolworth's store that started on the previous day. The fire is now extinguished, but there is still clean up and ongoing traffic control at the scene. Officer Fontaine from the previous shift plans to cover the scene until 9:00 a.m. |

Figure 47:
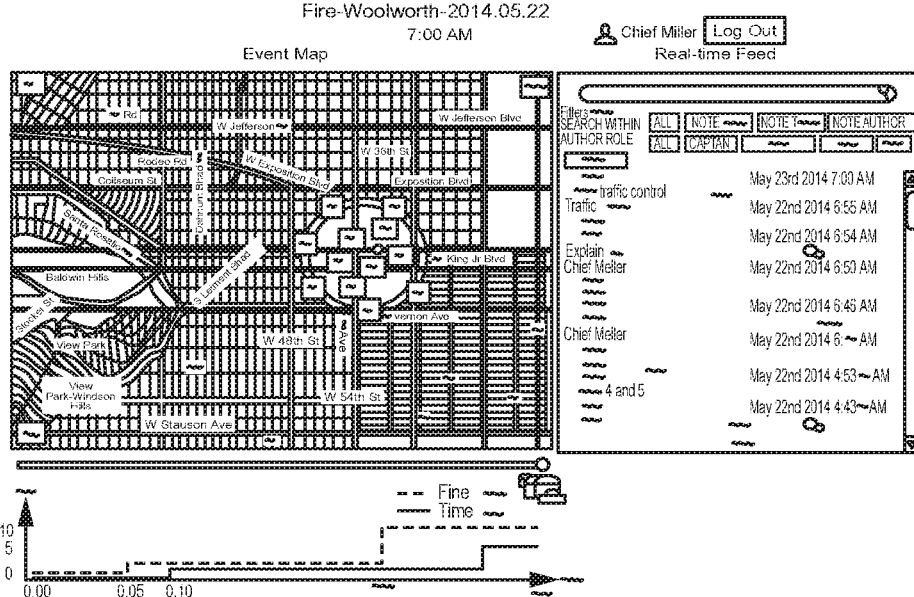
FIG. 47 is a diagram showing, by way of example, a situation assessment interface display of the real time monitoring application of FIG. 46.

FIG. 47 is a diagram showing, by way of example, a situation assessment interface display 600 of the real time monitoring application of FIG. 46. Episodic analytics interfaces can be included as part of the situation assessment interface 600. They are used to review the previous time course of an event. The episodic analytics include a record of communications for responding to an event and a time-based animated map, which can show the positions and activities of various responders at any previous time during the course of the event.

Activity Recommendations for an Unplanned Event

Supervisors 12 and dispatchers 13 have oversight over the same teams of officers 14. Supervisors 12 are responsible for planning and achieving overall performance, including planned revenue-bearing services and planned service activities, but not the unplanned events and emergencies that are the purview of dispatchers 13. As well, due to the nature of their jobs, dispatchers 13 tend to ignore everything outside of emergencies and lack the bandwidth to deeply understand the immediate situations facing officers 14 on patrol on the streets.

Rather, dispatchers 13 are properly focused on handling emergencies, but if their decisions are completely unin-formed, two types of concerns arise. First, the wrong officers 14 could be pulled off their current activities in circumstances in which pulling other available officers 14 off their beats could meet the needs of the emergency equally well, which can adversely affect team performance. Second, the need to reassign officers 14 to cover the activities of those officers 14 assigned to respond to an unplanned event remains unaddressed, which further exacerbates team performance.

Here, simple evaluation criteria, such as time to respond or skills, is provided to help dispatchers 13 make good assignments for handling emergencies. Also, to provide additional criteria that help sensitize dispatchers 13 to avoiding decisions that unnecessarily impact overall performance, sensor information is fused with current and historical citation data from the time-based active representational model 83 (shown in FIG. 4) to illustrate the potential impact on overall team performance that would occur when officers 14 are pulled off their beats. The potential impact is quantified based upon the anticipated number of parking violations that would potentially be lost for each of the candidate officers 14, although other evaluation criteria are possible.

The simple and additional evaluation criteria enable dispatchers 13 to make better choices. Additionally, these evaluation criteria allow the weighing in of other metrics, such as public safety needs that include response time, officer qualifications and number of officers needed, citation efficiency that includes projected number of citations lost as to each officer 14 assigned to respond to the unplanned event versus availability of other officers to handle the citations otherwise lost, and balancing the load of each officer 14 assigned to respond to the unplanned event, travel time, and other policy considerations.

| Date/Time | Activity |
|---|---|
| 8:15 a.m. | A tree falls at 18$^{th}$ Avenue and Grant Street in Beat 3. The tree hits some power lines and live power lines are dangerously sparking in the street. A citizen calls 9-1-1. The 9-1-1 call is routed to Dance, who logs the event as #989 and type #33, which is a code referring to a potentially life-threatening obstacle on the roadway. This code gives the event Priority 1, which is a code Red top priority. |
| 8:15 a.m. | Dance notices that the location of the event is in Beat 3. The closest officers are Adams (badge #79) and Baker (badge #99). Both officers are currently working on Priority 3 (low) service calls to monitor and direct traffic at school drop off.<br>Cooper (badge #123) is the next closest officer. Cooper's predicted travel time to the event is four minutes, which is within policy guidelines. Cooper is currently working with another team in Squad 1. The response plan generator 77 suggests assigning Cooper to direct traffic for event #989. The system has already communicated with Cooper's c-partner to verify that he is potentially available and not occupied on a higher priority activity.<br>Dance clicks on "initiate plan," which starts a series of communications asking Cooper to accept the assignment. If Cooper accepts, the response plan generator 77 will also prepare a plan to balance the load of the other officers in Squad 1, Adams and Baker. |

Figure 48:
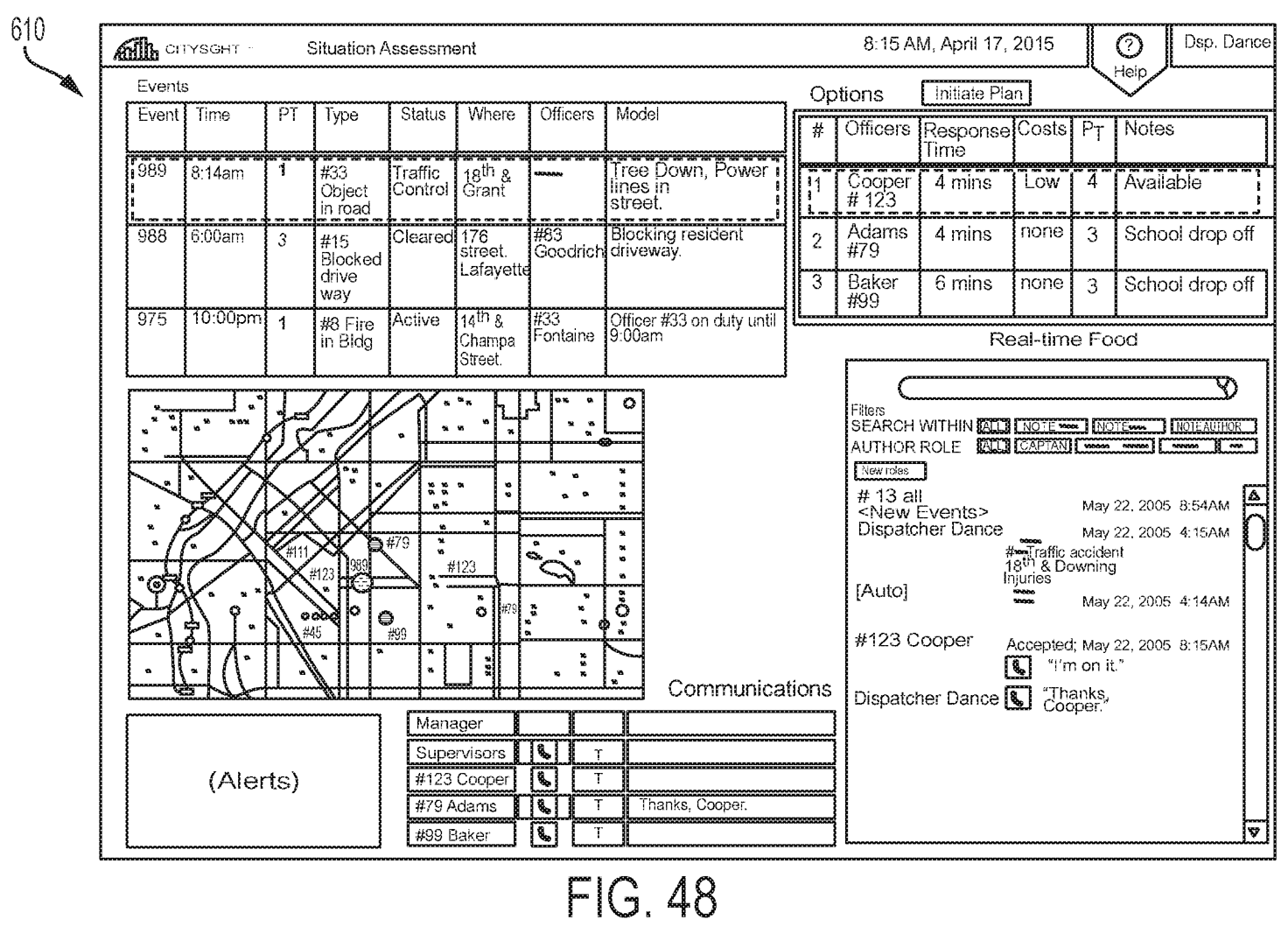
Figure 49:
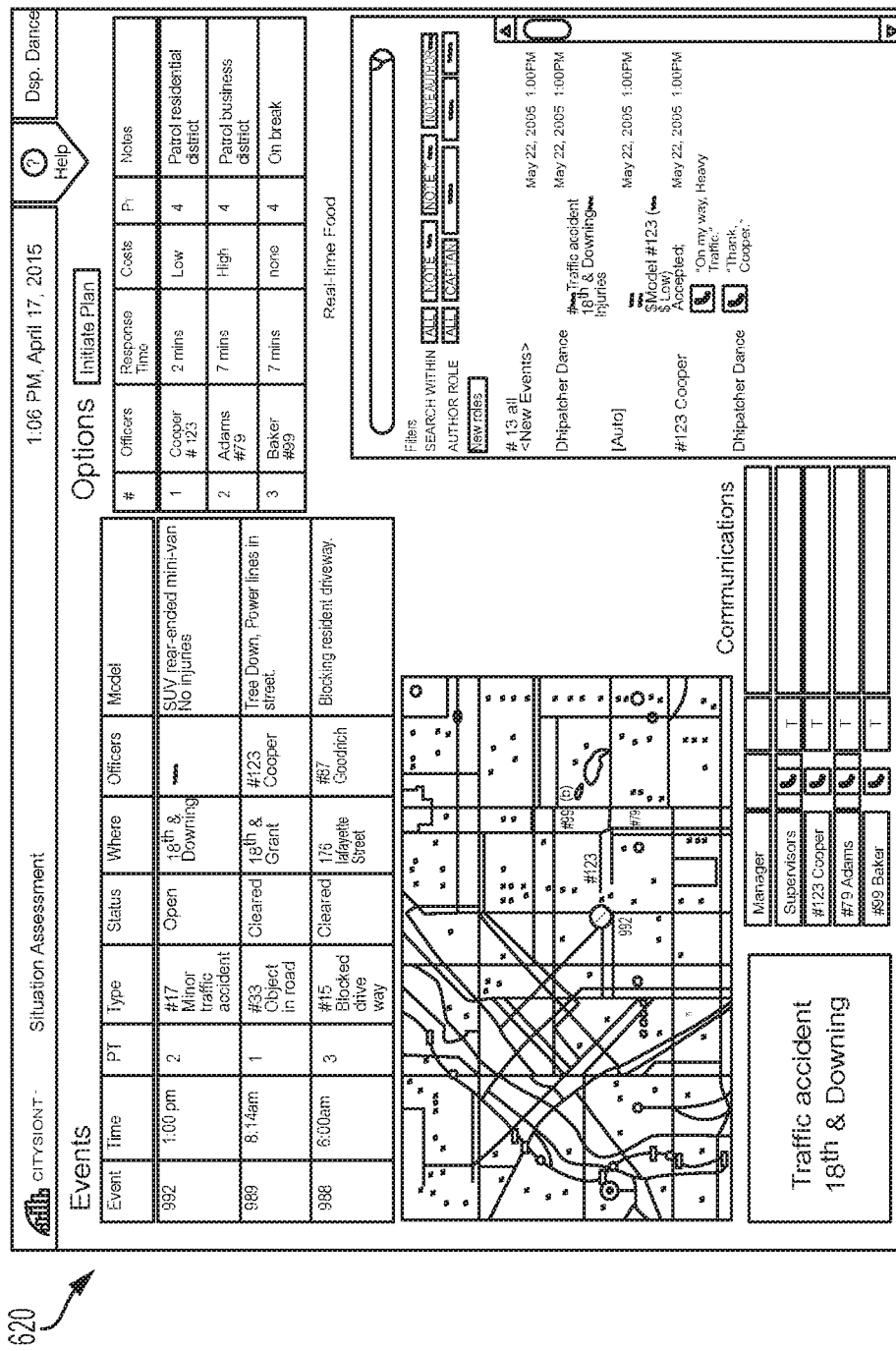

FIGS. 48-49 are diagrams showing, by way of examples, the situation assessment interface 610, 620 of the real time monitoring application of FIG. 46. The situation assessment interfaces 610, 620 as implemented includes the following components:

- A sorted list of ongoing events at the top left. The most urgent events for dispatcher attention appear at the top. The list shows information about each event, such as the start time, priority level, status, assigned officers, resources, and notes.

A set of recommended options that can be selected or modified. The recommended options can include those officers 14 who are presently on duty with a simple evaluation criteria that includes time to respond, plus additional criteria that the dispatcher 13 can consider when evaluating candidate officer assignments, such as the impact on revenue or other costs that assigning each of the officers would have on the overall performance of the team.

A zoomable situation map showing the locations of active events, plus the locations and duty status of each officer. When the dispatcher 13 selects a particular event, the map scrolls and zooms to the location of the event, showing a close-up of the event.

A log and real time feed of communication events for each event. Selecting a particular event brings up the log for the event.

A communications window for quickly contacting people. Communications can be to multiple people at once and can be or voice or text. Voice may be dynamically converted to text and added into the same visual log.

Other screen components are possible.

The situation assessment interface shows recommended options for responding to the fallen tree event. Here, the response plan generator 77 of the planner and recommender layer 62 has proposed three candidate plans for responding to the event. The map shows the positions of parking enforcement officers 14 relative to the location of the event. The costs column reflects an estimate of revenue that would potentially be lost from citations what would otherwise have been issued, if applicable, or other costs associated with each option. A real time feed shows the communications stream and summarizes the course of the event. Optionally, other elements of episodic analytics may be included.

| Date/Time | Activity |
| --- | --- |
| 8:45 a.m. | Dance is monitoring the fire event #975. An alert appears on the situation assessment dashboard saying that Fontaine (badge #33) will soon go off shift.<br>Dance uses the communications ability of the situation assessment interface 70 of the user interaction layer 62 (shown in FIG. 4) to call Fontaine, who has finished directing traffic and is presently collecting the traffic cones at the fire scene. There is no need to assign a replacement officer to the event.<br>Dance changes the status of event #975 to "Cleared." |
| 9:45 a.m. | The power company and tree cutting crews have arrived for event #989 and have respectively started work securing the power lines and removing the tree from the roadway. They brought their own staff for directing traffic at the scene. Cooper signs out from the event.<br>Cooper gets a preliminary view of his work on his shift using the "Plan My Shift" interface on his mobile computing device. The resource allocator 76 of the planner and recommender layer 62 recommends that he resume the earlier plan from his supervisor 12 and join Adams and Baker on Squad 3. The resource allocator 76 of the planner and recommender layer 62 the assignment, which Cooper accepts. |
| 10:00 a.m. | Dance focuses on other squads and areas since not much is happening for Squads 1 and 2. |

Balancing Work Load and Handling an Unplanned Event

External events, such as emergencies, can lead to dynamic reassignments of officers 14, usually by way of a dispatcher 13. If a supervisor 12 is not available, the response plan generator 77 can recommend adjustments to the operational plans throughout the day as the situations change and the coverage planner 78 can rebalance the remaining activities among the officers 14 remaining on a team after one or more of the officers 14 are assigned to handle an unplanned event. The new optimal assignments are then presented to officers 14 through the officer interface 47. To help a dispatcher 13, super-beat team, or other manager reassign officers appropriately, the system 20 provides both information about the identity and location of parking enforcement officers 14 on low value assignments and the location and potential value of alternative assignments within the city.

When officers 14 are assigned to pick up tasks that were started by other officers 14 who have been assigned to respond to an unplanned event or emergency, the remaining unassigned officers 14 need to have enough information displayed to enable them to gracefully continue the work of the team. For example, the officers 14 may need information about what areas were adequately covered recently, what vehicles have been marked by other officers 14 and may be ready to be checked for over-time violations, what service tasks remain unfinished, and so forth.

Policy can also have an influence on team performance and additional criteria can also be provided to assist dispatchers 13 with making appropriate policy-adherent choices. For instance, officers 14 may be expected to stagger their major breaks when operating as a team, so that at least one officer is on duty on a super-beat to respond to any accident or urgent unplanned event. A dispatcher 13, however, may not know which of the officers 14 on a team are on break at any given time.

Here, conditional autonomous messaging, as provided through the conditional autonomous messaging 73 component of the computer partner and communications layer 63 (shown in FIG. 4), can effectively mediate between a dispatcher 13, via the parking enforcement support services server 21, and team members, over the network through their respective mobile devices, when the dispatcher 13 is actively vetting candidate officer assignments. Typically, the officers 14 are equipped with both conventional forms of communications, including radio- and cellular phone-types of devices and mobile devices that include wirelessly-connectable digital computing devices, such as personal, notebook and tablet computers, and so-called "smart" mobile computing devices 26, such as smartphones and the like. Each officer's c-partner, as implemented through his mobile device, is able to autonomously determine the officer's on-going status and his availability to undertake a new assignment based upon the officer's tracked activities and other information, such as messages sent or received by the officer, notes that the officer has taken, data which he has collected, and so forth. Conditional autonomous messaging is performed without the officer's actual involvement. In one embodiment, a "push" communications model is used, where each officer's c-partner, that is, mobile device, periodically updates the parking enforcement support services server 21, such as every few minutes, by sending an update on the officer 14. In a further embodiment, a "pull" communications model is used, where the parking enforcement support services server 21 queries each officer's c-partner and receives an answer containing the update on the officer 14. The "pull" model has the advantage of presumably being up-to-the-second, yet a disruption in communications, such as a spot with bad cellular coverage, can cause the c-partner to miss receipt of a pull request from the server. On the other hand, the "push" model has the advantage of overcoming communication coverage lapses, but requires more power consumption by each mobile device and more data than required by the server could be sent. Thus, in a still further embodiment, a hybrid model that uses a combination of both "push" and "pull" communications models is used.

| Date/Time | Activity |
|---|---|
| 1:05 p.m. | The 9-1-1 operator takes a call about an accident. The call is routed to Dance, who collects and enters the accident information into the situation assessment interface 70 of the user interaction layer 62 (shown in FIG. 4) as event #992.<br>In some organizations, there is a similar process followed when logging 9-1-1 calls, except that the event information is collected and entered by the 9-1-1 operator.<br>In area A1, an SUV has rear-ended a minivan. The resource allocator 76 of the planner and recommender layer 62 automatically requests information about officer availability. The c-partners of the parking enforcement officers 14 use conditional autonomous messaging and information facilities in the system 20 to respond with availability information about location, predicted response time, current activities, and estimates of revenue (cost). |
| 1:06 p.m. | Baker (badge #99) is seven minutes away from the location of the accident and on break. Policy discourages interrupting parking enforcement officers' breaks for responding to an event, unless the event is a Priority 1. Baker's c-partner responds to the query and indicates non-availability because she is on break.<br>Adams (badge #79) is also seven minutes away, but is collecting tickets in the business district. Interrupting his work would have a "medium" cost. His c-partner acknowledges the query and responds with the information that he is available, but with a medium revenue impact.<br>Cooper (badge #123) is two minutes away patrolling a residential district. The potential revenue impact is low. Cooper's c-partner acknowledges Cooper's availability for the assignment. |
| 1:07 p.m. | The situation assessment interface 70 of the user interaction layer 62 (shown in FIG. 4) receives the responses from the officers' c-partners and displays the information on Dance's dashboard. The "Alerts" window adds a message that a recommendation is ready, that the best option is to assign Cooper to assess the traffic accident event.<br>Alternatively, the assignment of Cooper could be completely automatic. For example, the situation assessment interface 70 of the user interaction layer 62 (shown in FIG. 4) could display a countdown timer for 30 seconds or other interval and indicate to Dance that Cooper will be automatically assigned if she takes no action before the timer runs out. This increased proactive version is useful for circumstances where dominant options are determined with high confidence by the system and the dispatcher 13 is busy with something else at the moment. In effect, an automatic response could be delegated under department policy to automatically assign Cooper to cover the traffic accident. |

Dance uses the situation monitoring and assessment interface to enter information about a traffic accident, get recommendations, and initiate a response.

Adjusting Plans to Re-Allocate Activities as Needed

The reassignment of officers 14 is not the responsibility of the dispatcher 13. Rather, reassignment is a complex process akin to the decisions made by a supervisor 12 of which officers 14 to assign to which tasks. Reassignment involves the same situation awareness (data fusion), planning, and estimating that goes into making recommendations to officers 14 as to where to patrol and which activities to perform, albeit with fewer resources and a focus on prioritization and optimization. Thus, reassignment must take into account the anticipated number of parking violations for all of the officers 14 on a team and the system 20 needs to plan patrol routes within a beat for the team's remaining officers 14 based upon the overall anticipated number of parking violations. This approach focuses on best utilizing the resources available following the assignment of officers 14 away from the team to respond to unplanned events and thereby minimize the impact on overall performance. The reassignments can be made dynamically to the officers 14 in the form of recommendations or can be provided to supervisors 12 for their consideration and action.

| Date/Time | Activity |
|---|---|
| 1:08 p.m. | Dance initiates the plan. A message alert appears on Cooper's mobile computing device and provides him with the information about the traffic accident. He is asked whether he accepts the assignment.<br>Cooper sees the alert and accepts the assignment. He drives to the accident. |
| 1:09 p.m. | Cooper's response is shown on the situation monitoring and assessment interface.<br>The event monitor 80 of the monitoring layer 65 gathers and records information for episodic analysis of the traffic event. The system notices that Cooper is overdue at the accident scene. However, he is still within the policy-dictated time window and is predicted to be about a minute away. The system does not send him an alert. |
| 1:09 p.m. | Meanwhile, the resource allocator 76 of the planner and recommender layer 62 reexamines the plans for the rest of the team. Before being assigned to the event, Cooper was assigned to perform parking enforcement in a business district with a relatively high number of expected citations. The optimizer of the resource allocator 76 of the planner and recommender layer 62 generates and evaluates a set of revised plans that re-assign the dropped areas among the available officers, Adams and Baker. Since a redistribution of the areas to cover will produce a more optimal plan, the coverage planner 78 of the planner and recommender layer 62 recommends that Adams change the areas that he will cover. He will pick up the busy part of Cooper's assignment and drop a less productive part of his previous assignment. |

Figure 50:
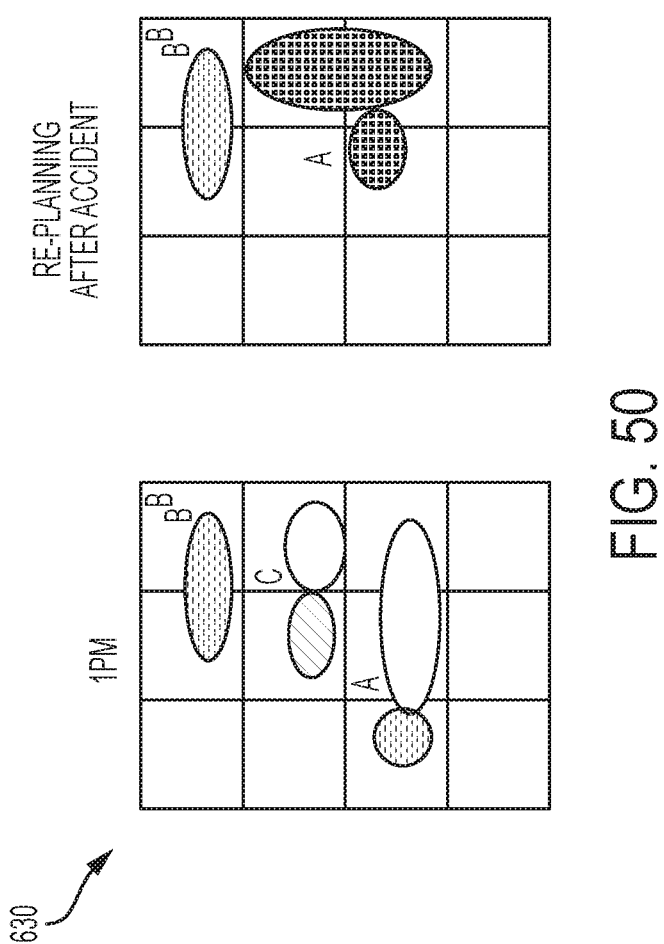
FIG. 50 is a pair of diagrams showing, by way of example, re-assignments of duty shift tasks.

FIG. 50 is a pair of diagrams 630 showing, by way of example, re-assignments of duty shift tasks. Here, at 1 p.m., when Cooper is re-assigned to the accident, the optimizer of the resource allocator 76 of the planner and recommender layer 62 reexamines the opportunities and recommends a different plan for Baker and Adams, which picks up some of Cooper's assignment and drops some of Adams' previous assignment. These changes provide a more optimal way of achieving compliance.

Monitoring Plans and Escalating a Response as Needed

Once resources have been assigned, dispatchers 13 still need to maintain awareness of whether the situation is evolving appropriately. The system 20 can monitor a preset time to respond threshold and alert a dispatcher 13 when assigned officers 14 are not arriving within the expected time to respond. The system 20 can also follow the assignment of resources and the progression of the situation and alert the dispatcher 13 whether additional resources are needed.

| Date/Time | Activity |
|---|---|
| 1:10 p.m. | Cooper arrives on the scene of the accident. A person is trapped in one of the vehicles and gasoline is leaking onto the road. Cooper recognizes the situation as potentially life-threatening.<br>He calls the dispatcher 13 for immediate escalation for fire department support, with a request for an ambulance and other support. |
| 1:10 p.m. | Dance contacts 9-1-1 for fire, police, and ambulance support for the accident. She escalates the priority of the accident to Priority 1 code red.<br>The system recognizes the situation as requiring additional support for traffic control. The closest officer is now Officer Manning, who is passing through the beat as he returns from another assignment, but is assigned to an adjacent beat. This plan requires approval of Dispatcher Stephan, who oversees Manning's beat. |
| 1:12 p.m. | Stephan, handing the nearby beat, sees the request for Manning on a Priority 1 event.<br>He approves the resource request to assign Manning to Dance. The resource allocator 76 of the planner and recommender layer 62 updates the plans with the additional assignment of Manning. The top-ranked plan shows a |

| Date/Time | Activity |
|---|---|
| | response time of 2 minutes since Manning is close by. Dance approves and puts the plan into action. |

CONCLUSION

The foregoing system 20 provides several benefits, including:
- Providing displays showing sensed and predicted nearby events in real time to individual officers 14, so that they can adjust their activities based upon the real time data.
- Providing just-in-time contextual information about past performance and service requests to officers 14.
- Communicating officer observations and data about situations back to the system 20.
- Monitoring the activities of officers 14 and others and determining how busy they are, whether they are multitasking, the priority of what they are doing, and when interrupt them or presenting information to them is reasonable.
- Adjusting and prioritizing the presentations of information to officers 14 and dispatchers 13 to prevent information overload.
- Providing long-term memory of situations and trends about city events to make predictions of enforcement opportunities, even when some data about actual events is not directly visible.
- Checking in with officers 14 about availability to commit to service request commitments.
- Enabling c-partners to answer service requests and provide other information dynamically when possible without interrupting the officers 14.
- Computing and representing availability and workload ("busyness") information as part of the feasibility and cost evaluation for competing plans.
- Predicting the outcomes of possible activities in the environment, including officer activities, citation lifecycles, emerging planned and unplanned events, and traffic flow.
- Using information from such predictions to help evaluate competing recommendations and activity assignments.
- Using predictions to compare the outcome of what people are doing to what has been recommended, which can then be used in review, to improve the model, or to focus alerts and attention.
- Providing intelligent interfaces for overseeing activities of teams and directing management attention to places where effective advice or communications can most improve performance.
- Providing recommendations to dispatchers 13 and supervisors 12 about team activities that optimize organization performance, rather than individual performances.
- Giving focus recommendations to officers 14, monitoring activities to see whether they take the advice generally, and comparing performance of officers 14 that follow recommendations to those that do not.
- Providing visualizations for combining time and location dimensions to visualize routes or paths along with the ability to view progress and event markers.
- Running simulations of city situations to predict the costs and benefits of various enforcement policies.

While the invention has been particularly shown and described as referenced to the embodiments thereof, those skilled in the art will understand that the foregoing and other changes in form and detail may be made therein without departing from the spirit and scope of the invention.

What is claimed is:

1. A method for managing coverage of parking enforcement for a neighborhood with the aid of a digital computer, comprising the steps of
    obtaining historical enforcement data and setting acceptable levels of activities that violate parking regulations for each of a plurality of neighborhoods based on the historical enforcement data;
    identifying each neighborhood in which an enforcement policy falls below the acceptable level of activities that violate parking regulations for that neighborhood;
    determining for each of a plurality of parking enforcement officers in at least one of the neighborhoods, a recommended patrol route with an estimated number of parking citations in at least one area along the recommended route based on an active representational model, the historical enforcement data, and the identified neighborhoods in which the enforcement policy falls below the acceptable level of activities that violate the parking regulations for that neighborhood;
    tracking activities of the parking enforcement officers in the neighborhood while performing enforcement activities along the route and adding the tracked activities directly to the active representational model, wherein the tracked activities comprise time spent by each of the parking enforcement officers in the neighborhood and an amount of movement by each parking enforcement officer within the neighborhood;
    adding the tracked activities to the active representational model;
    recommending revisions to the recommended route of at least one of the parking enforcement officers during patrol of the neighborhood by that officer based on the active representational model; and
    displaying, on an interface screen, a map with the recommended revisions to the recommended route of the at least one officer and further displaying the estimated number of parking citations.

2. A method according to claim 1, wherein the tracked activities comprise the time spent by each officer in the neighborhood and the amount of movement by each within the neighborhood.

3. A method according to claim 1, further comprising the steps of:
    assigning priorities to the activities in which each of the officers is contemporaneously engaged; and
    setting a priority of the enforcement of the activities.

4. A method according to claim 1, further comprising the step of:
    defining an area for coverage by the officers based upon geographic areas selected from the group comprising beats, regions, neighborhoods, and blocks.

5. A method according to claim 1, further comprising the step of:
    defining different kinds of activities that violate regulations.

6. A method according to claim 1, wherein a non-transitory computer readable storage medium stores code for executing on a computer system to perform the steps.

7. A method for managing parking policy compliance with the aid of a digital computer, comprising the steps of:
    obtaining historical enforcement data and setting acceptable levels of activities that violate parking regulations for each of a plurality of neighborhoods based on the historical enforcement data;

identifying each neighborhood in which an enforcement policy falls below the acceptable level of activities that violate parking regulations for that neighborhood;

determining for each of a plurality of parking enforcement officers in at least one of the neighborhoods, a recommended patrol route with an estimated number of parking citations in at least one area along the recommended route based on an active representational model, the historical enforcement data, and the identified neighborhoods in which the enforcement policy falls below the acceptable level activities that violate the parking regulations for that neighborhood;

tracking activities of the parking enforcement officers in the neighborhood while performing enforcement activities, wherein the tracked activities comprise time spent by each parking enforcement officer in the neighborhood and an amount of movement by each parking enforcement officer within the neighborhood;

obtaining parking enforcement data by the enforcement officers for the neighborhood;

adding the tracked activities and parking enforcement data to the active representational model;

recommending revisions to the recommended route of at least one of the parking enforcement officers during patrol of the neighborhood by that officer based on the active representational model; and displaying, on an interface screen, a map with the recommended revisions to the recommended route of the at least one parking enforcement officer and further displaying the estimated number of citations.

8. A method according to claim 7, further comprising the step of:

defining an area for patrol by the officers in the neighborhood based upon geographic areas selected from the group comprising beats, regions, neighborhoods, and blocks.

9. A method according to claim 7, further comprising the step of:

defining different kinds of activities that violate parking regulations along the recommended routes of the officers.

10. A method according to claim 7, wherein non-transitory computer readable storage medium stores code for executing on a computer system to perform the steps.

11. A method for estimating parking policy compliance with the aid of a digital computer, comprising the steps of:

obtaining historical enforcement data and setting acceptable levels of activities that violate parking regulations for each of a plurality of neighborhoods based on the historical enforcement data;

identifying each neighborhood in which an enforcement policy falls below the acceptable level of activities that violate parking regulations for that neighborhood;

determining for each of a plurality of parking enforcement officers in a at least one of the neighborhoods, a recommended patrol route with an estimated number of parking citations in at least one area along the recommended route based on an active representational model, historical parking enforcement data and the identified neighborhoods in which the enforcement policy falls below the acceptable level of activities that violate the parking regulations for that neighborhood;

tracking the issuing of parking citations by the parking enforcement officers in the neighborhood, an amount of time spent by each parking enforcement officer in the neighborhood and an amount of movement by each parking enforcement officer in the neighborhood;

adding the tracked issued parking citations, the amount of time spent, and the amount of movement to the active representational model of the city;

recommending revisions to the recommended route of at least one of the parking enforcement officers during patrol of the neighborhood by that officer based on the active representational model; and displaying, on an interface screen, a map with the recommended revisions to the recommended route of the at least one parking enforcement officer and further displaying the estimated number of citations.

12. A method according to claim 11, further comprising the step of:

collecting historical parking citation data from past parking violations and fuse the historical parking citation data in the active representational model.

13. A method according to claim 12, further comprising the step of:

fusing current parking citation data with the historical parking citation data in the active representational model.

14. A method according to claim 12, further comprising the steps of:

estimating activities that violate parking regulations for each neighborhood based on the historical parking citation data.

15. A method according to claim 11, wherein a non-transitory computer readable storage medium stores code for executing on a computer system to perform the steps.

* * * * *